United States Patent [19]

Sangveraphunsiri

[11] Patent Number: 5,530,620
[45] Date of Patent: Jun. 25, 1996

[54] COMPUTER SYSTEM WITH EXTERNALLY ACCESSIBLE UPGRADE CAPABILITY

[75] Inventor: Vic Sangveraphunsiri, San Clemente, Calif.

[73] Assignee: Advanced Logic Research, Inc., Irvine, Calif.

[21] Appl. No.: 78,089

[22] Filed: Jun. 18, 1993

Related U.S. Application Data

[63] Continuation-in-part of Ser. No. 534,888, Jun. 8, 1990, Pat. No. 5,321,827, which is a continuation-in-part of Ser. No. 388,445, Aug. 2, 1989, Pat. No. 5,297,272.

[51] Int. Cl.[6] ............................. G06F 1/16; H05K 7/10
[52] U.S. Cl. ............................. 361/686; 361/726; 70/58
[58] Field of Search .................... 400/663, 668, 400/669, 692; 364/708.1; 360/137; 439/928, 928.1; 361/680–686, 724–727, 607, 609, 615, 740, 747, 759, 801; 200/50 A, 50 R; 248/27.1, 27.3; 16/115; 312/7.1; 70/58, 163, 164, 166–169

[56] References Cited

U.S. PATENT DOCUMENTS

| | | | |
|---|---|---|---|
| 4,131,851 | 12/1978 | Martiny et al. | 361/736 X |
| 4,530,066 | 7/1985 | Ohwaki et al. | 364/708.1 |
| 4,545,023 | 10/1985 | Mizzi | 361/680 X |
| 4,821,146 | 4/1989 | Behrens et al. | 361/737 X |
| 4,851,937 | 7/1989 | Sander | 360/137 X |
| 4,980,800 | 12/1990 | Furuta | 361/727 |
| 5,020,151 | 5/1991 | Sampei et al. | 312/7.1 X |
| 5,045,960 | 9/1991 | Eding | 361/685 X |
| 5,051,868 | 9/1991 | Leverault et al. | 361/685 |
| 5,126,890 | 6/1992 | Wade et al. | 360/137 X |
| 5,136,468 | 8/1992 | Wong et al. | 361/683 |
| 5,142,446 | 8/1992 | Tanaka et al. | 361/686 |
| 5,162,979 | 11/1992 | Anzelone et al. | 361/686 |
| 5,185,692 | 2/1993 | Smith | 361/683 |
| 5,185,881 | 2/1993 | Brooks et al. | 395/575 |
| 5,192,082 | 3/1993 | Inoue et al. | |
| 5,216,904 | 6/1993 | Isaki | 70/58 |

*Primary Examiner*—Michael W. Phillips
*Attorney, Agent, or Firm*—Popham, Haik, Schnobrich & Kaufman, Ltd.

[57] ABSTRACT

A system and method for upgrading a computer is disclosed. Certain essential chips present in the original computer system are functionally, but not necessarily physically, removed from the computer system. Functions which would otherwise be performed by the original chips are instead performed by higher-performance chips on a plug-in module which is plugged into the computer system. The functional removal of the certain chips from the original computer system is achieved through simple insertion of the plug-in module. No replacement or substitution of original chips or boards is necessary. Furthermore, upgraded computer systems may be further upgraded by replacement of a first plug-in module with a second plug-in module with different performance characteristics. The upgrade capability is accessible from outside the cabinet, to avoid opening the cabinet to upgrade the system. Advantageously, means are provided for ensuring that the module cannot be inserted or removed when system power is turned on.

17 Claims, 21 Drawing Sheets

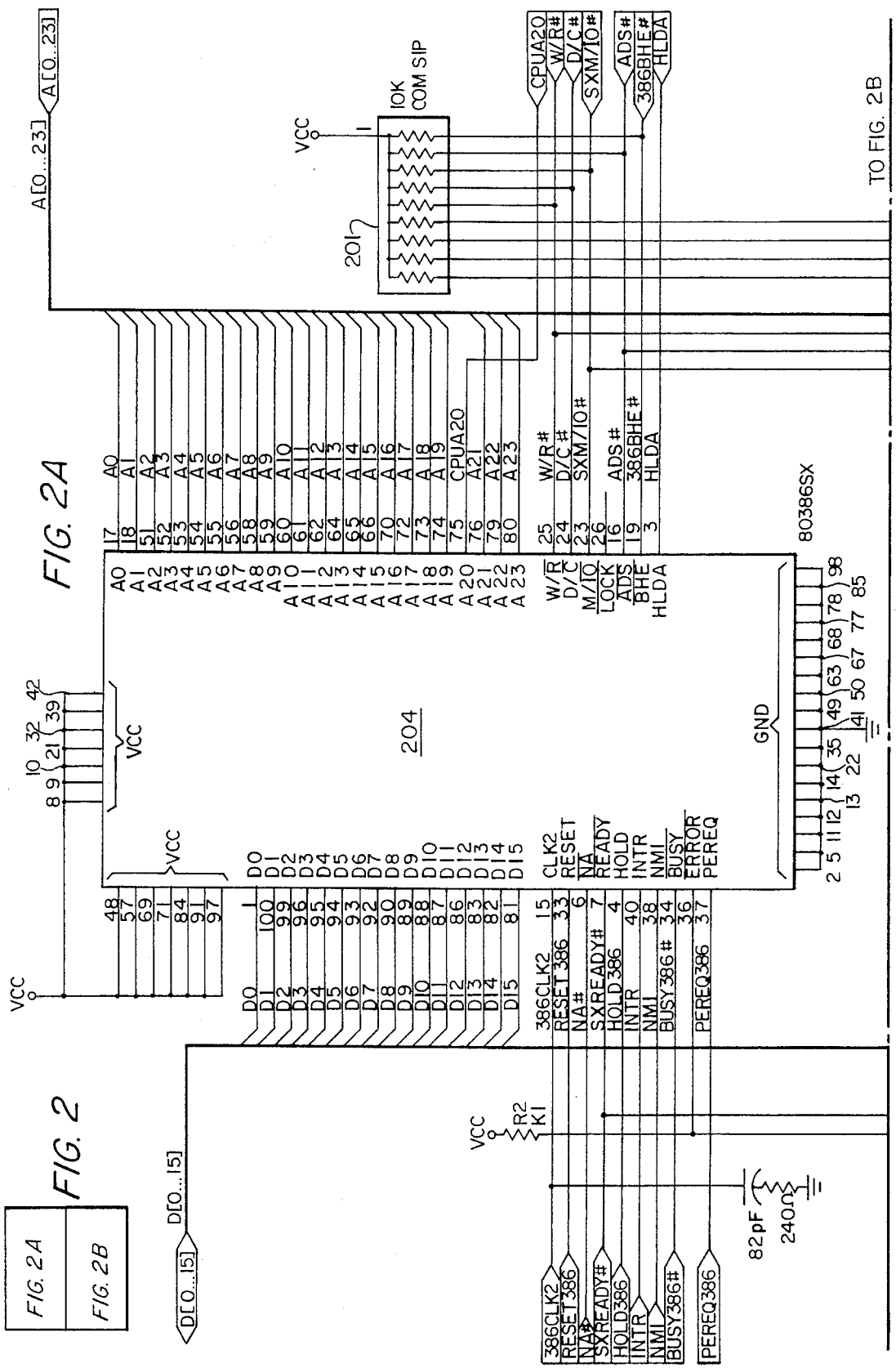

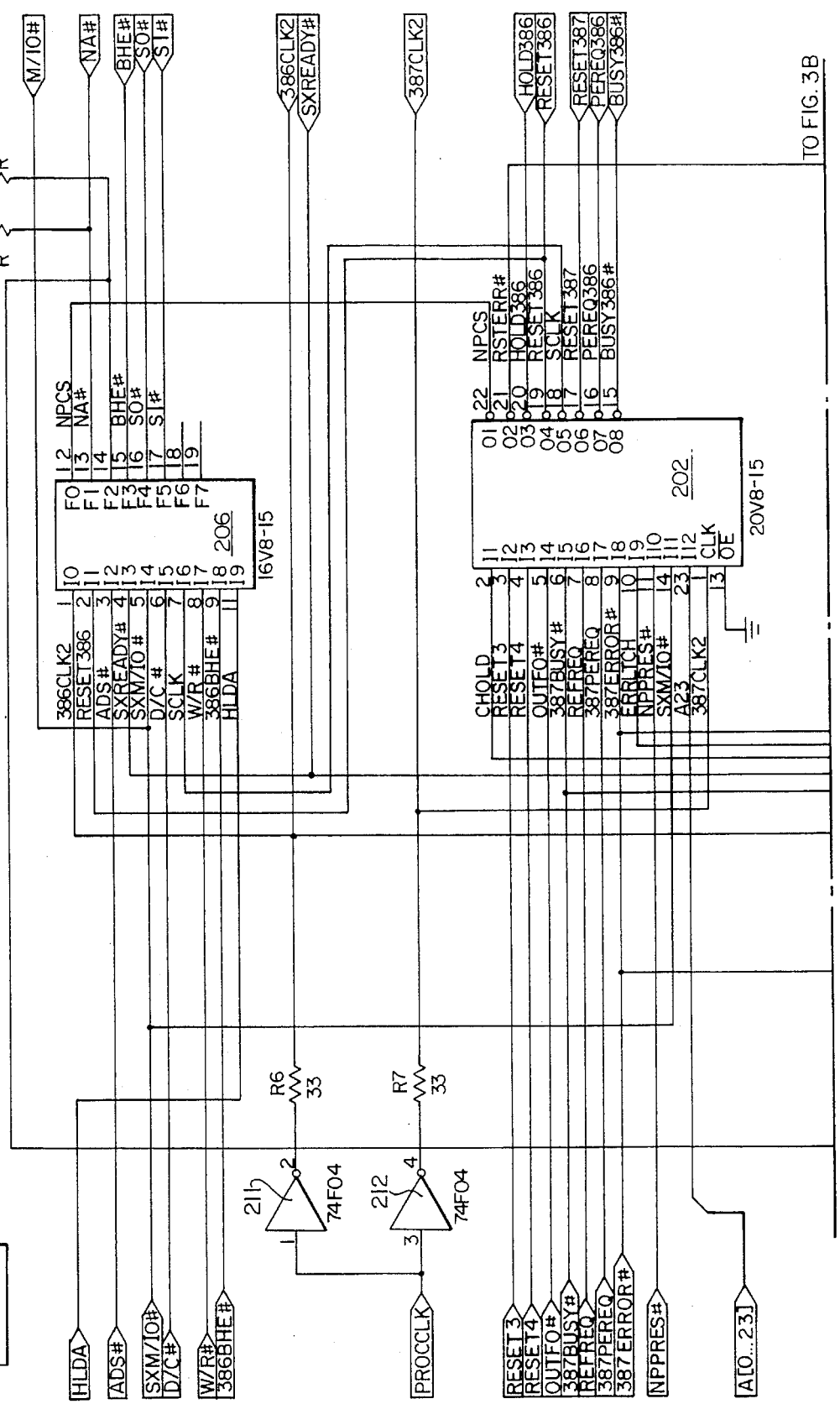

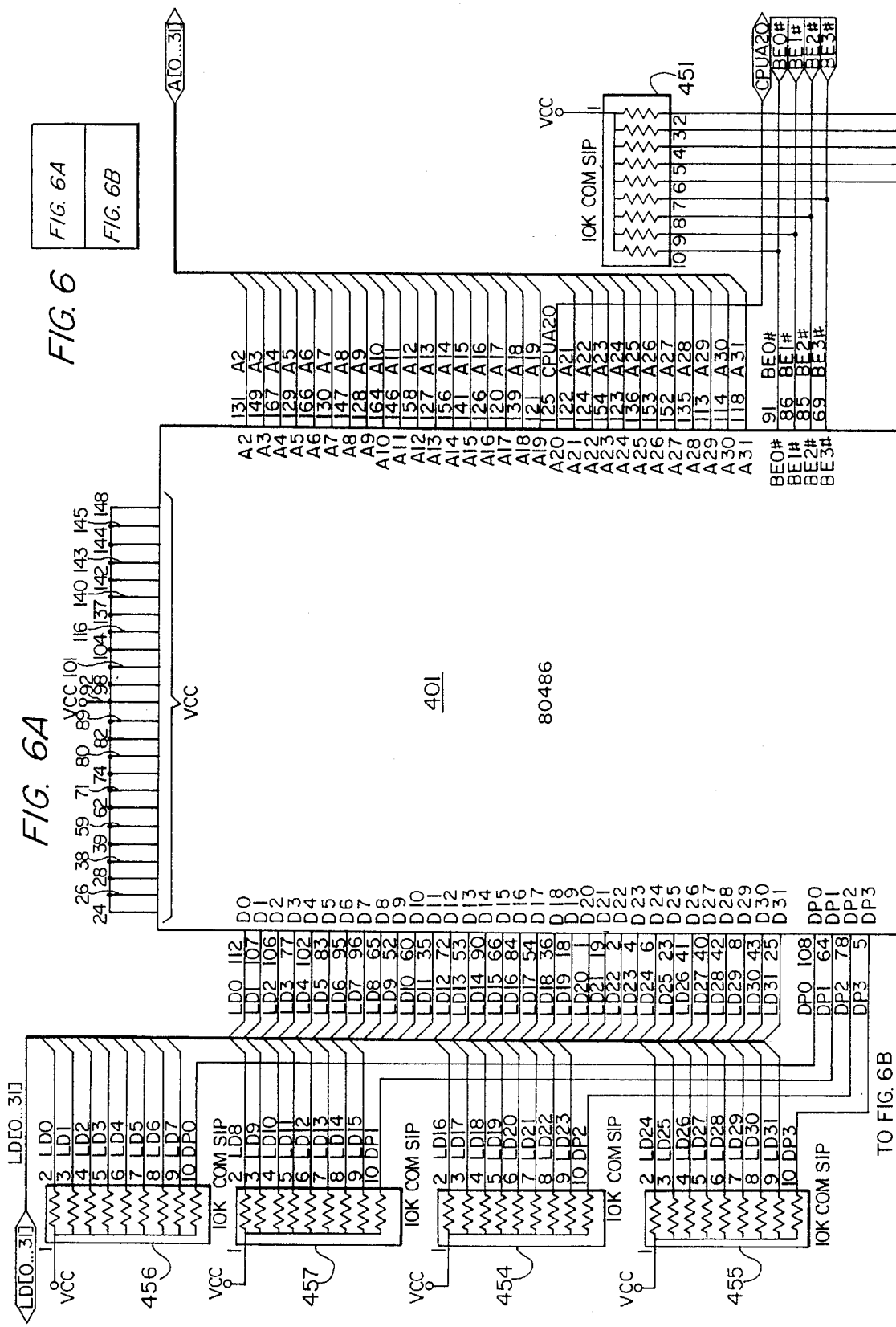

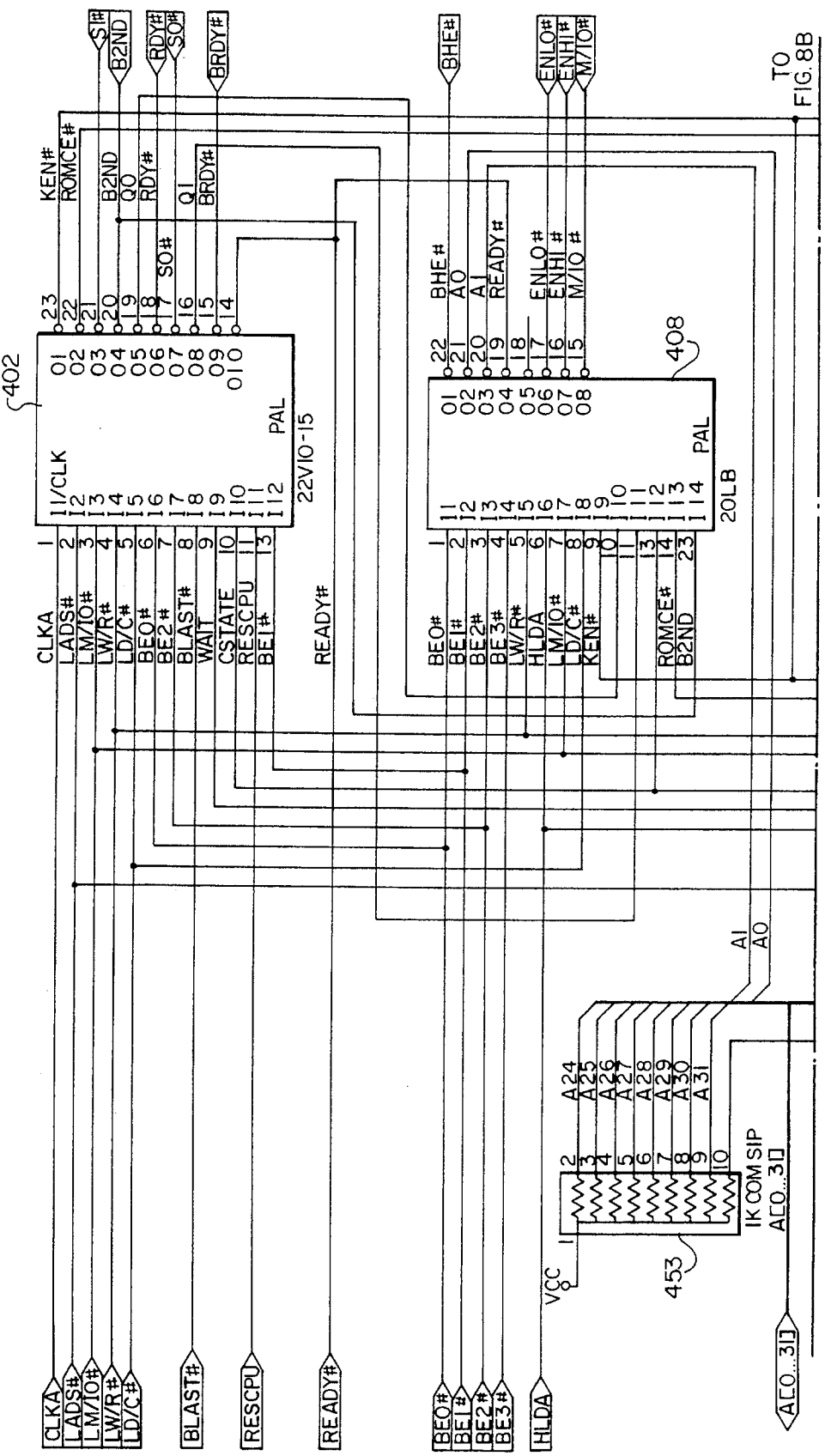

COMPUTER SYSTEM WITH EXTERNALLY ACCESSIBLE UPGRADE CAPABILITY

CROSS-REFERENCE TO RELATED APPLICATIONS

The present patent application is a continuation-in-part of U.S. Ser. No. 07/534,888, filed Jun. 8, 1990, (now U.S. Pat. No. 5,321,827, issued Jun. 14, 1994), which was a continuation-in-part of Ser. No. 07/388,445, filed Aug. 2, 1989, (now U.S. Pat. No. 5,297,272, issued Mar. 22, 1994), both of which are incorporated herein by reference in their entirety.

BACKGROUND OF THE INVENTION

1. Field of the Invention

The present invention relates to computer systems which are performance upgrades of other computer systems. More specifically, the invention relates to computer systems in which one or more important elements, such as the central processing unit, of a known computer system are replaced with elements having higher performance characteristics.

2. Related Art

It is known in the art that given computer systems may be upgraded in performance through substitution of elements. The new elements have higher performance capabilities than elements in the original system.

For example, in the field of personal computers, the IBM® AT® computer (available from International Business Machines Corporation, Armonk, N.Y.) is known. This known computer operates using an 80286 processor and an 80287 math coprocessor available from, for example, INTEL Inc. of Santa Clara, Calif. Other manufacturers have since designed computer systems which, although still compatible with the original 80286-based AT® computer, are considered in some respects to be enhancements of it.

One manufacturer, Chips & Technologies, Inc. (C&T), 3050 Zanker Road, San Jose, Calif. 95134, has developed a chip set known as the NEAT™ chip set. The NEAT™ chip set is described in data sheets entitled *"CS-8221 New Enhanced AT® (NEAT™ Data Book"*, (part/catalog no. 2-221-B 10M 3/88 Rev. 2, which, like all technical documents cited in this specification, is incorporated by reference as if reproduced in full below. See also C&T PRODUCT ALERT PA76.2/9-88, UPDATE—Sep. 21, 1988, "386SX/387SX BOARD DESIGN WITH NEAT AND CHIPS/250," and PA115/3-89, "UPDATE ON NEAT PLUS SX MODULE."

The C&T NEAT™ chip set has allowed development of AT®-compatible computer systems. Among the systems which are AT®-compatible is the 80286-based POWER-FLEX™ system from Advanced Logic Research, Inc. (ALR®), 9401 Jeronimo, Irvine, Calif. 92718. As will be better appreciated by a reading of the Detailed Description of the Preferred Embodiments of the present invention (below), this computer system may advantageously be used in conjunction with the present invention.

There are several known methods of upgrading an AT®-compatible 80286-based computer systems.

A first upgrade method involves an "add-in card" which is inserted into the AT® bus, and in which a cable is extended form the add-in card to the CPU (central processor unit) socket on the system board. In a second upgrade method, a circuit board containing a higher performance CPU is inserted into the CPU socket. Both these methods involve the physical removal of the 80286 processor from its socket.

These known methods possess several disadvantages. The removal of a chip from the original processor board is not convenient for the user or customer. In fact, physical removal of the 80286 and insertion of the inter-card-connecting cable (or second board) into the original processor's socket may even cause physical or electronic damage, if not performed properly.

Furthermore, it is generally known that increased performance may be obtained through increasing CPU clock speed. These two methods, involving insertion of a cable or board into the CPU socket, do not provide for changing the clock speed. To change clock speeds using either of these two known methods, the crystal itself must be replaced. Replacement of a crystal is both inconvenient and dangerous to components.

Both of the above-described methods may decrease reliability due to introduction of unwanted signal noise into signals entering and leaving the CPU socket. Also, boards or cables plugged directly into the CPU socket may vibrate loose, causing intermittent connections.

A third upgrade method involves placement of an add-in board into the AT® slot, but in which the 80286 processor is not removed from the system board. The system powers up with the 80286 as the CPU. After powering up, however, system control is relinquished to the processor on the new board through what is commonly known as the "master mode". The master mode involves use of the DMA controller to request control of the external AT® bus, allowing the card to be "master" of the system.

This third method possesses the drawback that true AT® system compatibility is sacrificed. True compatibility cannot be maintained because the card is functioning on an external bus, and not directly on the CPU bus.

Therefore, there is a need in the computer industry for systems and methods for upgrading known computer systems which do not involve unnecessary cost, inconvenience for the user or customer, or introduction of features which are incompatible with any industry standards adhered to by the original computer system. Further, it is desirable to provide a system and method whereby a given computer system may be upgraded without the necessity of physically removing or replacing any portion of the original computer system, so as to minimize inconvenience and possibility of electronic or physical damage. It is further desirable to achieve these goals while maintaining compatibility with industry standards and maintaining system reliability.

SUMMARY OF THE INVENTION

The present invention provides a system and method for overcoming the disadvantages of known computer upgrade systems. The present invention provides a system and method for upgrading a computer in which certain essential chips present in the original computer system are functionally, but not necessarily physically, removed from the computer system. The functions which would otherwise be performed by the original chips are instead performed by higher-performance chips on a plug-in module which is plugged into the computer system.

Advantageously, the mere insertion of the plug-in module ensures that the original chips are disabled in favor of the enhanced chips present on the plug-in module. Also advantageously, no chips from the original computer system need be removed or replaced. Of still further advantage is the full compatibility with industry standards which were adhered to by the original computer system. Another advantage is the ability to effect a change in clock speed through mere insertion of the plug-in module.

Another aspect of the present invention provides for upgrading a computer system by replacing a first plug-in module with a second plug-in module. The second plug-in module may be chosen as one having superior performance characteristics to the first, while not sacrificing full bus compatibility with circuitry on the system board. Advantageously, this aspect of the invention allows the plug-in modules to have minimal operational components other than the processor itself (such as DRAM chips), thereby minimizing the actual cost of upgrading.

Still another aspect of the present invention provides for upgrade capability which is conveniently accessible to untrained individuals from outside of the cabinet of a personal computer. Preferably, means are provided to ensure that a cartridge having an upgrade module cannot be inserted or removed when the power of the personal computer is turned on.

Thus, the present invention envisions a computer system, taken as a whole, which is an upgrade of an earlier computer system. The present invention also encompasses a plug-in module which is capable of upgrading a given computer system. Furthermore, the invention encompasses methods for upgrading a given computer system using a plug-in module which easily and quickly replaces the functions of certain essential chips in the given computer system.

Other features and advantages of the present invention will become apparent to those skilled in the an upon a reading of the following Detailed Description of the Preferred Embodiments in conjunction with the accompanying drawings, Tables and Appendices.

BRIEF DESCRIPTION OF THE DRAWINGS

The invention is better understood while reading the following Detailed Description in conjunction with a review of the accompanying drawings, in which like reference designators refer to like elements throughout, and in which:

FIG. 2 shows the connection of FIGS. 2A and 2B. FIGS. 2A and 2B, collectively referred to hereinafter as FIG. 2, are logical diagrams illustrating the 80386SX processor 204 and 80387SX co-processor 203 as implemented in a plug-in module according to a first embodiment of the invention.

FIG. 3 shows the connection of FIGS. 3A and 3B. FIGS. 3A and 3B, collectively referred to hereinafter as FIG. 3, illustrate the Genetic Array Logic (GAL®), chips and the numeric processor interrupt logic as used in the first embodiment of the plug-in module according to the present invention.

FIG. 6 shows the connection of FIGS. 6A and 6B. FIGS. 6A and 6B, collectively referred to hereinafter as FIG. 6, are logic diagrams illustrating the 80486 processor as used in a second embodiment of the invention.

FIG. 8 shows the connection of FIGS. 8A and 8B. FIGS. 8A and 8B, collectively referred to hereinafter as FIG. 8, illustrates Generic Array Logic (GAL®) chips as used in the second embodiment of the plug-in module according to the present invention.

FIG. 18 is a perspective view illustrating the position of a solenoid-controlled interlock when the power is on.

DETAILED DESCRIPTION OF THE PREFERRED EMBODIMENTS

In describing the preferred embodiments of the invention, specific terminology will be used, for the sake of clarity in describing the specific embodiments to those skilled in the art. However, the invention is not intended to be limited to the specific terms so selected, and it is understood that each specific term includes all technical equivalents which operate in a similar manner to accomplish a similar purpose. Also, particular chips, chip sets, industry standards, computer systems and other elements are presented and described in detail, so as to describe the particular embodiments presented. However, the invention is not to be limited by the particular embodiments contained herein, but should be defined only in accordance with the claims which follow and their equivalents.

Briefly, the preferred embodiments involve the use of the C&T NEAT™ chip set processor and, possibly also, a co-processor, and replacement of their functioning with either an 80386SX-based plug-in module or a 80486-based plug-in module (processor chips and documentation available from INTEL, order numbers 240187-002 and 240225-002, respectively). However, the teachings of the present invention should not be limited to these particular applications. The breadth and import of the present invention should be ascertained only in accordance with the claims.

Figure 1:
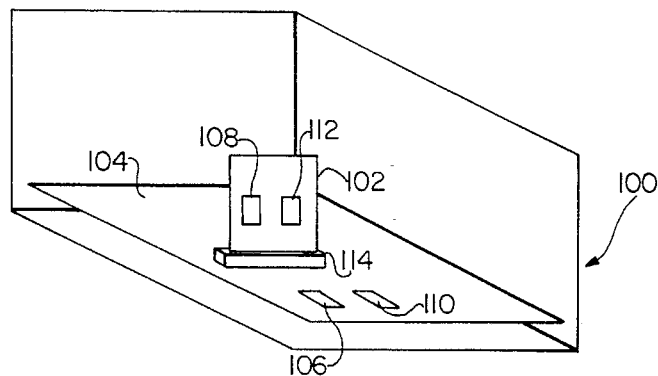
FIG. 1 is a schematic diagram illustrating the advantages of a preferred embodiment of the present invention in allowing a plug-in module 102 to assume the function of certain chips (such as 106 and 110) on the system board 104 of a computer system 100.

Referring now to FIG. 1, a computer system 100 with certain components are illustrated schematically. A system board 104 is illustrated as comprising a central processing unit (or "processor") 106 operating in conjunction with other essential chip elements 110. The essential chip elements 110 may include, for example, a math coprocessor. Before the present invention, a computer system would have comprised a processor chip, such as an 80286, and a co-processor such as an 80287. These two chips would have adhered to an industry standard, such as the IBM® AT® standard.

The present invention provides that the computer system comprising system board 104 may be upgraded without removal or replacement of any chips or boards, or addition of any substitute boards, to the system. The present invention provides for the addition of an inventive plug-in module 102 into a connector 114. The present invention provides that the mere fact that the plug-in module 102 is installed insures that the system performance will be enhanced, in accordance with the performance characteristics of the circuit elements on the plug-in module 102.

In one preferred embodiment, for example, the 80286 processor 106 on the existing system board 104 is functionally replaced by an 80386SX processor 108. Also, the 80287 co-processor 110 may be functionally replaced by an 80387SX co-processor 112. The connector 114 may be, for example, a connector, available from Burndy Corporation of Norwalk, Conn. In this manner, the simple addition of a plug-in module 102 enhances system performance, while not sacrificing the AT®-compatibility of the system as originally configured with only system board 104.

It is understood that partial functional replacement is encompassed by the present invention. That is, not every essential chip on the system board 104 need be replaced, functionally, by a corresponding enhanced circuit on the plug-in module 102. Certain sub-sets of the essential chips may be enhanced.

Also, the simple insertion of the plug-in module need not be the only means of communicating to the rest of the system that the function of certain elements of the system board 104 are being usurped. It lies within the contemplation of the present invention that hybrid upgrades, involving combinations of the plug-in module and/or replacement or modification of the system board and/or addition of a supplementary board with a cable leading to the original processor slot, and so forth. In this manner, "upgrades of upgrades" are possible. The invention is not to be limited to a system configuration containing only the elements shown in FIG. 1. Additional elements may be present and still fall within the scope of the appended claims, even if the additional elements are involved in other performance enhancement schemes.

The details of operation of the embodiments of the present invention will next be presented.

Figure 3B:
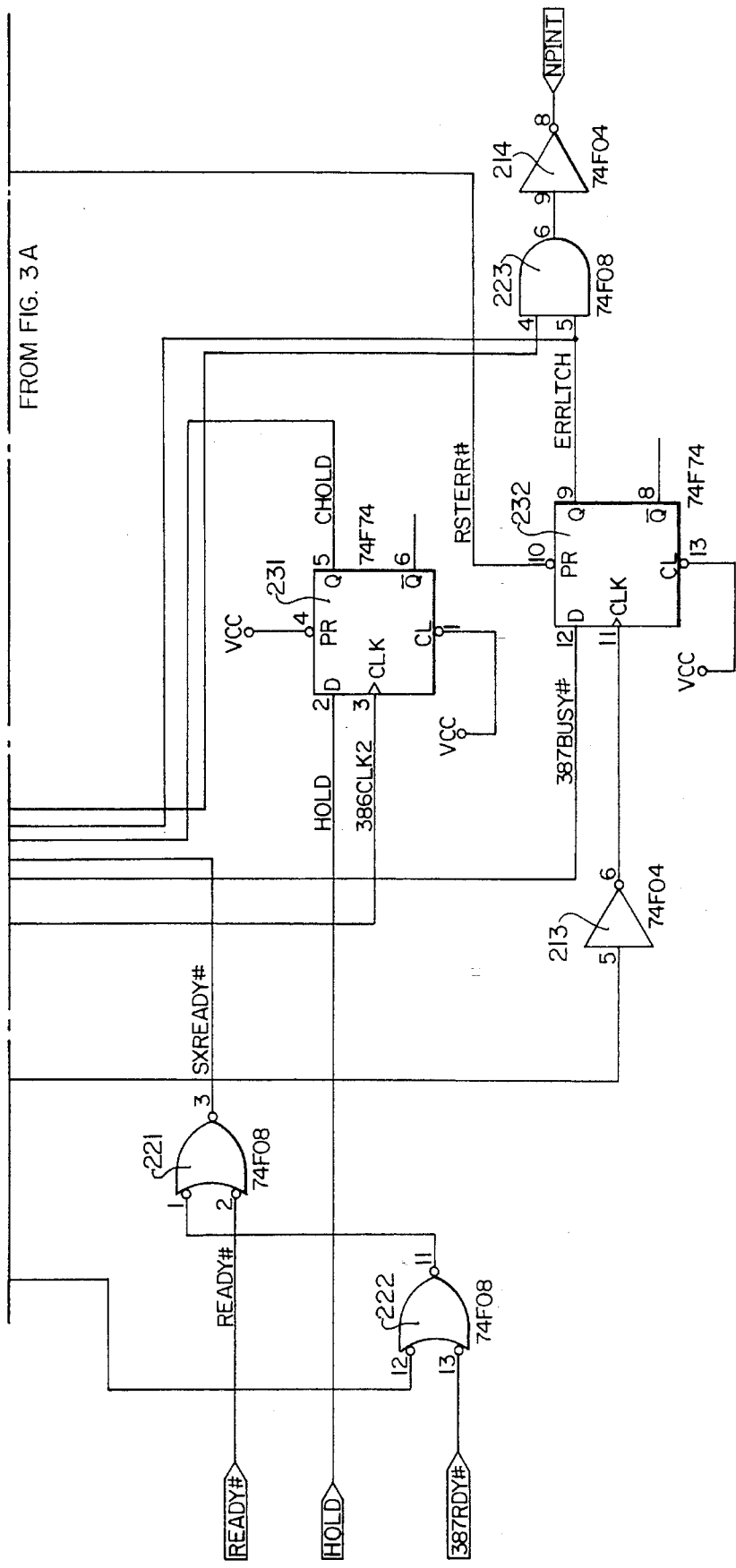

Shown in FIG. 3 are two logic devices 206 and 202. These logic devices may be implemented using a variety of circuits, but generic array logic (GAL®) and programmable array logic (PAL®) chips are preferred. In the exemplary illustrated embodiment, GAL® chips 206 and 202 are GAL® 16V8-15 and GAL® 20V8-15, respectively, available from Lattice Semiconductor Corporation, P.O. Box 2500, Portland, Oreg. 97208; 555 N. E. Moore Court, Hillsboro, Oreg. 97124. See "GAL® DATA BOOK," (Lattice, 1988). As is known in the art, certain GAL® chips, such as the V series from Lattice Semiconductor Corporation advantageously allow the outputs to be either combinatorial or registered, allowing design flexibility and minimization of IC count.

Briefly, GAL® 206 converts signals (such as status and control signals) from the 80386SX format and timing into other (e.g., status and control) signals which are readily usable by circuits expecting format and timing from an 80286 processor. This allows the rest of the computer system to be "spoofed" into believing that an 80286 processor may still be present and operating in the computer system. In particular, the computer system is still AT®-compatible.

The following is a description of the signals which are input and output to GAL® 206. A brief description of the origin, function and destination of certain signals is presented. However, most of the signals are used in a manner consonant with their use on the 80286 system board, so that those skilled in the art would readily appreciate the implementation and use of the signals on the preferred plug-in module according to the present invention.

Referring to FIG. 3, the input and output signals of GAL® 206 will first be described.

Pins 1 through 9, 11 and 12 are input signals; pins 13 through 19 are output signals.

Pin 1: 386 CLK2: An inverted form of the signal PROCCLK from the system board. In inverter 211 (FIG. 3) inverts PROCCLK to account for the fact that the 80286 processor triggers on the negative edge of its clock signal, while the 80386SX triggers on its positive edge.

Pin 2: RESET 386: A clock reset signal originating directly from the second GAL® 202, described in greater detail below.

Pin 3: ADS#: An address strobe signal generated by the 80386SX, used to indicate that a new cycle has begun, or that a new address and status signals have been presented on the bus.

Pin 4: SXREADY#: A signal, also input to the 80386SX, indicating that a cycle is over. The signal is generated by combinatorial logic in FIG. 3, illustrated as logic elements 221 and 222. Briefly, the purpose of logic elements 221 and 222 are to govern the state of the SXREADY# signal. This signal is governed by three inputs. The two gates, 221 and 222, function equivalently to a 3-input, active-low OR gate.

The first input is the READY# signal generated from the chip set on the system board. The function of this READY# is published and, therefore, readily available to those skilled in the art.

The second input is the 387RDY# signal, which is a signal output by the 80387SX chip at pin 57, signal READYO-. Its function, similarly, is published, and is therefore available to those skilled in the art.

A third input to the combinatorial logic is the signal output from pin 14 of the GAL® 206. As can be seen from the 206 logic equations (Appendix A), this signal is activated during a halt instruction or a shut-down. This signal is needed because the NEAT™ chip set would not provide a signal in these circumstances, causing the system to hang indefinitely. The system would hang, were it not for the fad that the SXREADY# signal can be activated by the signal from pin 14 of GAL® 206.

In the preferred embodiment, the function of a three-input, active-low OR gate is implemented using two two-input 74F08 NAND gates, connected in series. The output of gate 222 is input to the first input of the second gate 221. The second input of gate 221 receives the READY# signal. Gate 222 receives the 387 READY# signal and the signal from pin 14 of the 206 GAL®. The output of gate 221 constitutes the SXREADY# signal.

Pin 5: SXM/IO#; Pin 6: D/C#; and Pin 8: W/R#: These three status signals, generated by the 80386SX, define which category of the eight cycle categories is presently being executed. A definition of the cycle categories is published, and therefore available to those skilled in the art.

Pin 7: SCLK: A signal generated at pin 18 of the second GAL® 202, used to maintain the phase relationship for generating signals S0# and S1# at pins 16 and 17 of the first GAL® 206. The SCLK signal provides for a division by two of the clock signal from, in the preferred embodiment, 32 MHz to 16 MHz.

Pin 9: 386 BHE#: A Byte High Enable signal, generated by the 80386SX, governing a choice of operating on only 8 of 16 bits, for example, on devices having only 8-bit data lines.

Pin 11: HLDA: A Hold Acknowledge signal generated by the 80386SX, causes the outputs of GAL® 206 to enter a high-impedance state.

Pin 12: NPCS: This input to the first GAL® 206 is identified at pin 22 of the second GAL® 202. The signal, described below, is active only if the present cycle is a co-processor cycle and a 387 processor is installed. Ultimately, this prevents the chip set on the system board from responding when it should not respond.

The outputs of GAL® 206 will next be described.

Pin 13: NA#: This "Next Address" signal is important to an understanding of an advantage of the present invention.

As a background to understanding the importance of the NA# signal, it should be appreciated that implementing the plug-in card for the 80386SX upgrade causes a problem to arise because of the difference in the definition of the status signals output by the 80386SX which start its cycles. A certain known system translates the 80386SX status signals to an 80286 format. However, this known implementation of the status signal translation causes time to be lost, resulting in reduced system performance.

The 80386SX has an input signal, named /NA, which can be used to request the CPU place the "Next Address" onto the bus to begin the next cycle before the current cycle has completed. In the known translation scheme referred to immediately above, the /NA signal is either active all of the time, or is never active. When /NA is always active, it is necessary to employ four 74F373 latches, with latch control logic, so as to latch address and status signals to maintain them in proper time relation for the system board chip set.

This known translation scheme does not utilize the /NA signal to its fullest advantage. As appreciated by the present invention, the function of beginning the next cycle before the current cycle has completed can be used to save the time lost in translating 80386SX status signals to status signals having the 80286 format. In designs according to the present invention, the /NA signal is controlled to allow the release of the next address when the changing of the address will not adversely effect the functioning of the system board chip set. This selective control of the /NA input (here fed directly from the NA# output of first GAL® 206) is achieved by simulating the timing of the 80286 processor which only guarantees the address to be valid during limited timing periods. In this manner, the present invention provides an implementation of the status signal translation circuit using fewer IC's, while not sacrificing the speed which would otherwise be lost due to the translation process.

Pin 14: As described above, with respect to the SXREADY# input on pin 4, the output of pin 14 is fed back to a gate 222, for ultimate generation of the SXREADY# signal. The generation of the 206 GAL® output on pin 14 is determined according to the GAL® equations in Appendix A.

Pin 15: BHE#: The byte high enable signal is also generated according to the equations in Appendix A, and is sent to the system bus for governing cycles where only one of the two bytes is to be transferred.

Pin 16: S0# and Pin 17: S1#: These status bits are generated according to the GAL® equations in Appendix A, and are sent to the system board for control of the function of defining the status of new cycles.

Pins 18 and 19: These two signals are associated with the state machine, and serve the function of maintaining time relationship throughout the cycle.

As can be seen on FIG. 3, the two signals NA# from pin 13 of GAL® 206, and the signal from pin 14 of GAL® 206, are connected to respective resistors of value 1K-ohms to VCC.

The signals entering and leaving second GAL® 202 will next be described.

Pins 1 through 11, 13, 14 and 23 are inputs, and pins 15 through 22 are outputs. The inputs will first be described.

Pin 1: 387 CLK2: This signal is an inverted form of the PROCCLK signal generated on the system board. It is essentially the same signal as the corresponding pin on first GAL® 206.

Pin 2: CHOLD: The CHOLD signal, generated by the data output of a D-type flip-flop 231, allows maintenance of the proper clock relationships. As will be described below, the CHOLD signal is a delayed form of the HOLD signal generated on the system board. This signal functions as a request to the 80386SX to give a hold acknowledge, and relinquish the data bus for such functions as direct memory accesses and refresh cycles.

Pins 3 and 4: RESET3 and RESET4: These signals are generated on the system board, and, generally, serve as software-invoked reset signals to the 386, and as power-up signals to the 386 and 387, respectively.

Pin 5: OUTF0#: This signal is generated on the system board, and is involved in the write cycle of the I/O Port F0. Here, it is used as a co-processor status signal. The INTEL Application Note B3-STEP 80387 stepping information (p. 11) describes the use of this signal.

Pin 6: 387BUSY#: This signal is generated by the 80387SX, and functions in a manner known to those skilled in the art.

Pin 7: REFREQ: This signal is generated on the system board, and functions in a manner known to those skilled in the art.

Pin 8: 387PEREQ: This signal is generated by the 80387SX, and functions in a manner known to those skilled in the art.

Pin 9: 387ERROR#: This signal is generated by the 80387SX, and functions in a manner known to those skilled in the art.

Pin 10: ERRLTCH: This signal is a latched error signal which is generated at the data output of a second D-type flip-flop 232, to be described in greater detail below.

Figure 2B:
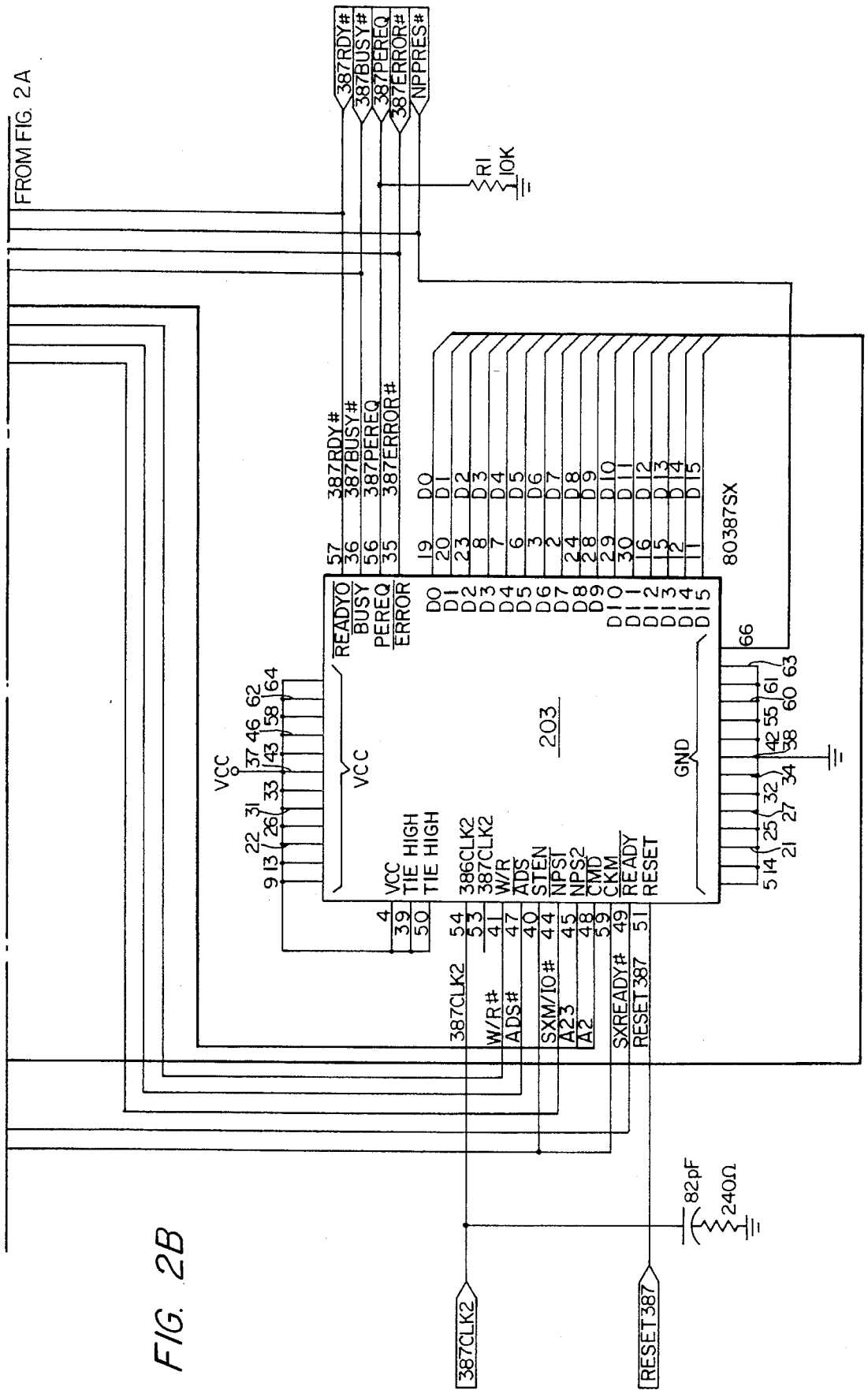

Pin 11: NPPRES#: This signal is normally pulled high by means of a 10K pull-up resistor on a single in-line package 201 (FIG. 2A). The signal is also connected to ground signal 66 on the 80387SX socket. In the preferred embodiment, this is used as a signal to inform the rest of the circuit of the presence of an 80387SX chip in the socket.

Pin 14: SXM/IO#: This signal is one of the three signals defining the present cycle as belonging to one of eight categories, described above, with respect to pin 5 of the first GAL® 206.

Pin 23: A23: This input is tied to A23.

Pin 13: GND: The output enable signal is always active (low), so that the output of the second GAL® 202 are not forced to a high-impedance state.

The outputs of second GAL® 202 will now be described.

Pin 22: NPCS: This signal prevents improper control of the 80387SX co-processor, specifically preventing the system board chips at from controlling it. The NPCS signal is directly input to pin 12 of the first GAL® 206. The NPCS signal, like all other signals output from the second GAL® 202, are generated in accordance with GAL® equations reproduced in Appendix B.

Pin 21: RSTERR#: This signal resets the second D-type flip-flop 232, and serves to reset a latched error signal relating to the co-processor interface. It is directly connected to the pre-set input pin 1 of the flip-flop 232.

Pin 20: HOLD386: This signal is input to the HOLD input of the 80386SX.

Pin 19: RESET386: This signal is input to the RESET input of the 80386SX.

Pin 18: SLCK: This clock signal is input to pin 7 of the first GAL® 206. As described above, it serves to divide by two a clock signal ultimately involved in the generation of the S0# and S1# signals output from first GAL® 206.

Pin 17: RESET387: This signal is input to the RESET input of the 80387SX.

Pin 16: PEREQ386: This signal is input to the PEREQ input of the 80386SX.

Pin 15: BUSY386#: This signal is input to the BUSY- input of the 80386SX.

Equations for generation of the above output signals from second GAL® 202 are presented in the equations of Appendix B. Those skilled in the art are readily able to understand and implement a GAL® performing the above functions, given the present description and the accompanying equations.

Referring now to the logic components 213, 223 and 214, which are connected to D-type flip-flops 231 and 232 (entry listed above), the control of the numeric processor interface for the 80387SX will now be described.

The data input of flip-flop 231 receives the HOLD signal from the system board. The HOLD input is clocked into 231 by signal 386CLK2, which is an inverted version of the clock PROCCLK, itself generated on the system board. The active-low clear input of the flip-flop 231 is tied high. Flip-flop 231 produces the CHOLD signal which is input to pin 2 of second GAL® 202.

Second flip-flop 232 receives its data input from the 387BUSY# signal generated by the 80387SX/BUSY output. The clock input of flip-flop 232 is received from the output of inverter 213. The input of inverter 213 receives its input from the 387ERROR# signal output from the /ERROR output pin 35 of the 80387SX. The clear input of the second flip-flop 232 is tied high. As described above, the pre-set input of second flip-flop 232 is driven by the RSTERR# signal generated by pin 21 of second GAL® 202. The second flip-flop 232 generates a data output signal ERRLTCH which drives two inputs. The first input has already been described above, the pin 10 input to second GAL® 202. The second input of NAND gate 223. The first input of gate 223 is the 387ERROR# signal which is generated by the output pins /ERROR on the 80387SX. The output of NAND gate 223 drives the input of inverter 214. The output of inverter 214 produces signal NPINT (numeric processor interrupt), which is sent to the system board, tied to the output of a tri-state buffer 324 (FIG. 5B).

Speaking conceptually, the flip-flop and logic arrangement just described causes a numeric processor interrupt immediately if there is an error detected, because of the direct connection of the 387ERROR# signal to the input of NAND gate 223. Also, an interrupt is generated if the 387BUSY# signal is clocked into the flip-flop 232 by the rising edge of the inverted 387ERROR# signal as it becomes active. As described above, the latch 232 is pre-set by the RSTERR# signal, generated at pin 21 of second GAL® 202.

Next, the clock selection arrangement and the connector for the preferred plug-in module for the 80386SX upgrade. These features are illustrated in FIG. 4.

Figure 4:
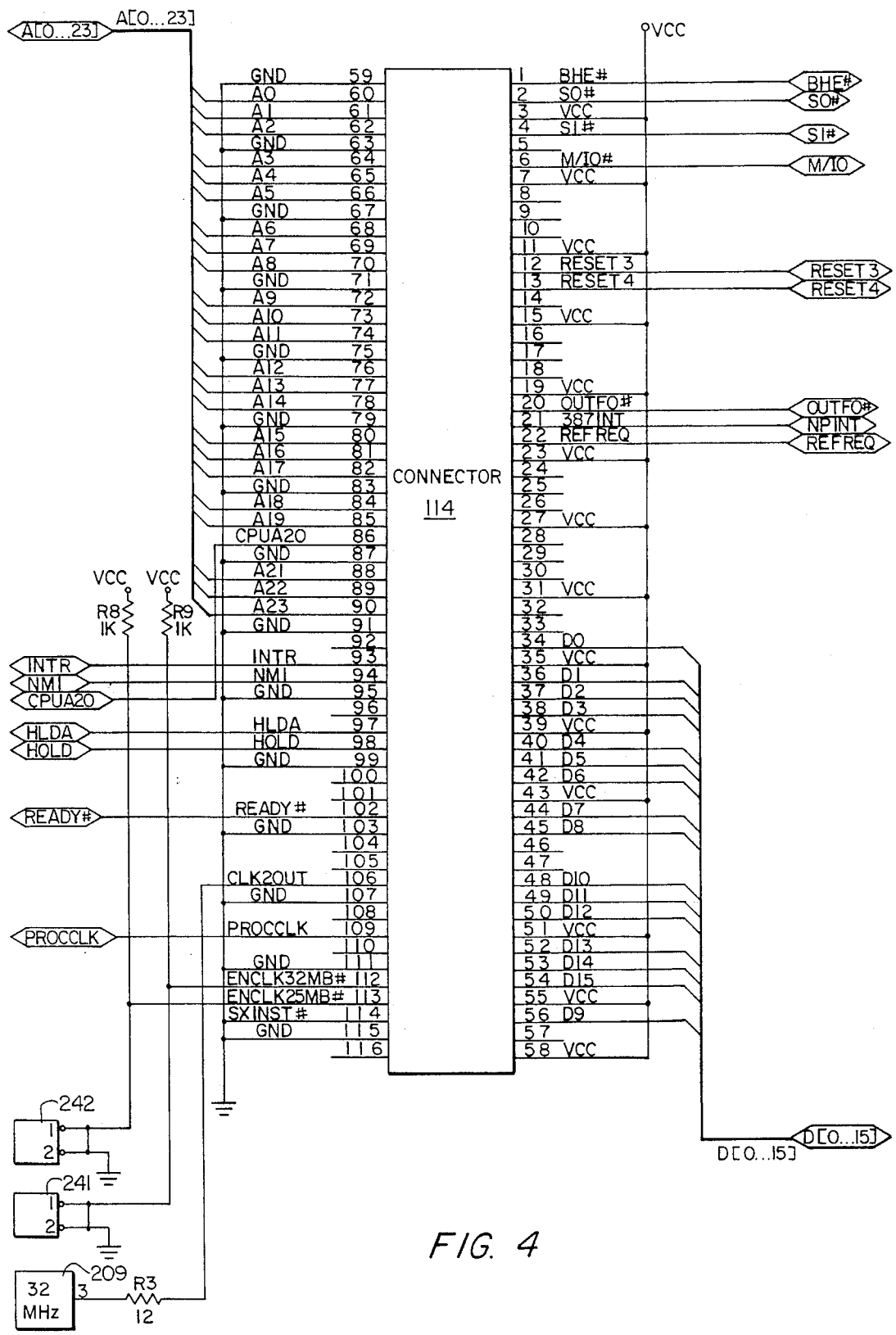
FIG. 4 illustrates a connector 114 and pan of the clock selection logic from the first embodiment of the plug-in module according to the present invention.

Referring now to FIG. 4, a commonly employed 32 MHz high-frequency crystal oscillator is shown at location 209. The 32 MHz clock oscillator at 209 produces the CLK2OUT signal which drives pin 106 of the plug-in module's connector 114. Preferably, a 12-ohm resistor is inserted in series to provide proper loading characteristics.

A connection of signals from the 80386SX plug-in module and the system board is made through the connector which is shown as 114 in FIG. 4. Also, Table I presents the connector pin connections in conjunction with the schematic signal names and source/destination names of the signals as they are generated or received on the plug-in and system boards. Those skilled in the art, upon inspection of the figures and associated tables, are able to implement the preferred embodiment of the enhanced computer system according to the present invention.

Pins 112 and 113 of connector 114 receive the ENCLK32MB# and ENCLK25MB# signals, respectively. In the preferred embodiment, each of these two signal lines are tied directly to ground during operation. Jumpers 241 and 242 are not needed, operationally, but are used during the development phase for flexibility.

In the preferred embodiment, when the signals are low (tied to ground), the corresponding clock, either 32 MHz or 25 MHz, is disabled. These signals are used on the system board to enable a desired clock. For example, the 80286 processor functions on a 12.5 MHz clock which is derived from the 25 MHz clock enabled by the ENCLK25MB# signal. Conversely, when an 80386SX processor from the plug-in module is active, then a 16 MHz clock derived from a 32 MHz clock is enabled by the ENCLK32MB# signal. The preferred circuitry by which the proper clock signal is selected is described in this specification in detail, in the section relating to the system board circuitry illustrated in FIG. 5B.

Referring now to FIG. 2, the 80386SX processor and the 80387SX co-processor are illustrated in a preferred configuration. Table II and Table III recite the pin connections which are shown in FIG. 2. Generally, the signals are used in a manner known to those skilled in the art. The accompanying drawings, Table II and Table III, and the accompanying text allow those skilled in the art to implement the plug-in module and the enhanced computer system according to the present invention.

Referring more specifically to FIG. 2, it is seen that the following connections are made. The active-low ERROR input signal on pin 36 of the 80386SX processor is tied to VCC through a 1K resistor. Similarly, the STEN and CKM inputs of the 80387SX co-processor are also tied high to VCC, also through the 1K resistor.

The CLK2 input of the 80386SX processor receives the 386CLK2 signal from the output of inverter 211 (FIG. 3), driven through a 33-ohm series resistor. The 386 CLK2 signal is the inverted version of the PROCCLK signal generated on the system board.

Similarly, the 386CLK2 input on pin 54 of the 80387SX co-processor receives the 387CLK2 signal which was generated by inverter 212 (FIG. 3), which signal is also driven through a 33-ohm series resistor. This 387CLK2 signal is the inverted form of the PROCCLK clock signal generated on the system board.

The two signals, 386CLK2 and 387CLK2, are advantageously filtered to remove noise from the clock signal. Such filters are advantageously implemented using a series combination of an 82 picofarad capacitor and a 240-ohm resistor to ground. Separate capacitor-resistor filters should be used for the two clock signals (386CLK2 and 387CLK2).

It is advantageous to pull up certain signals to insure that they are at required levels. It is preferable to implement the pull up function using a single in-line package (SIP) of 10K resistors with one common end tied to VCC. The signals which are individually tied to respective 10K resistors include the following:

W/R# output from the W/R- signal on pin 25 of the 80386SX processor;

The D/C# signal output from the D/C- signal on pin 24 of the 80386SX processor;

The SXM/IO# signal output from the M/IO- pin 23 of the 80386SX processor;

The ADS# signal output from the ADS- output pin 16 of the 80386SX processor;

The 386BHE# signal output from the BHE- pin 19 of the 80386SX processor;

The 387RDY# signal output from the READY0- output pin 57 of the 80387SX co-processor;

The 387BUSY# signal output from the BUSY- output pin 36 of the 80387SX co processor;

The 387ERROR# signal output from the PEREQ output pin 56 of the 80387SX co-processor; and The NPRES# which is treated as effectively being an output from the normally grounded input pin 66 of the 80387SX co-processor (used as an input to pin 11 of second GAL® 202 (FIG. 3) to report the presence of an 80387SX processor in the co-processor socket 203 on the plug-in module).

The 387PEREQ signal normally output from the PEREQ output pin 56 of the 80387SX co-processor is tied low through a 10K resistor to ground, so as to put the signal in a known low state when the 80387SX co-processor chip is not inserted. The default low state of this 387PEREQ signal is designed to insure AT® compatibility.

The connections between the 80386SX processor and the 80387SX co-processor will next be presented.

The W/R- output pin 25 of the 80386SX processor generates the W/R# signal which is input to the W/R- pin 41 of the 80387SX co-processor. The M/IO- output pin 23 generates the SXM/IO# signal which is input to the NPS1 input pin 44 of the 80387SX co-processor. The ADS- output pin 16 of the 80386SX processor generates the ADS# signal which is input to the ADS- input pin 47 of the 80387SX co-processor.

Any other connections of the input or output pins of the 80386SX processor or the 80387SX co-processor may be found through inspection of FIG. 2 and/or Tables II and III.

Figure 5A:
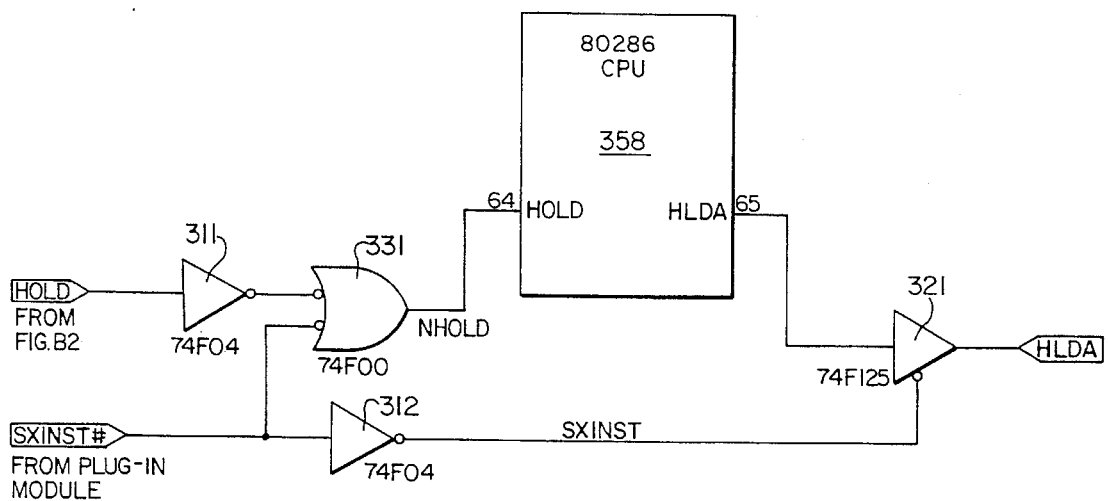
FIG. 5A illustrates a preferred implementation of a logic configuration on the system board, for allowing the 80286 processor to be functionally removed from the computer system when a plug-in module according to the present invention is installed.
Figure 5B:
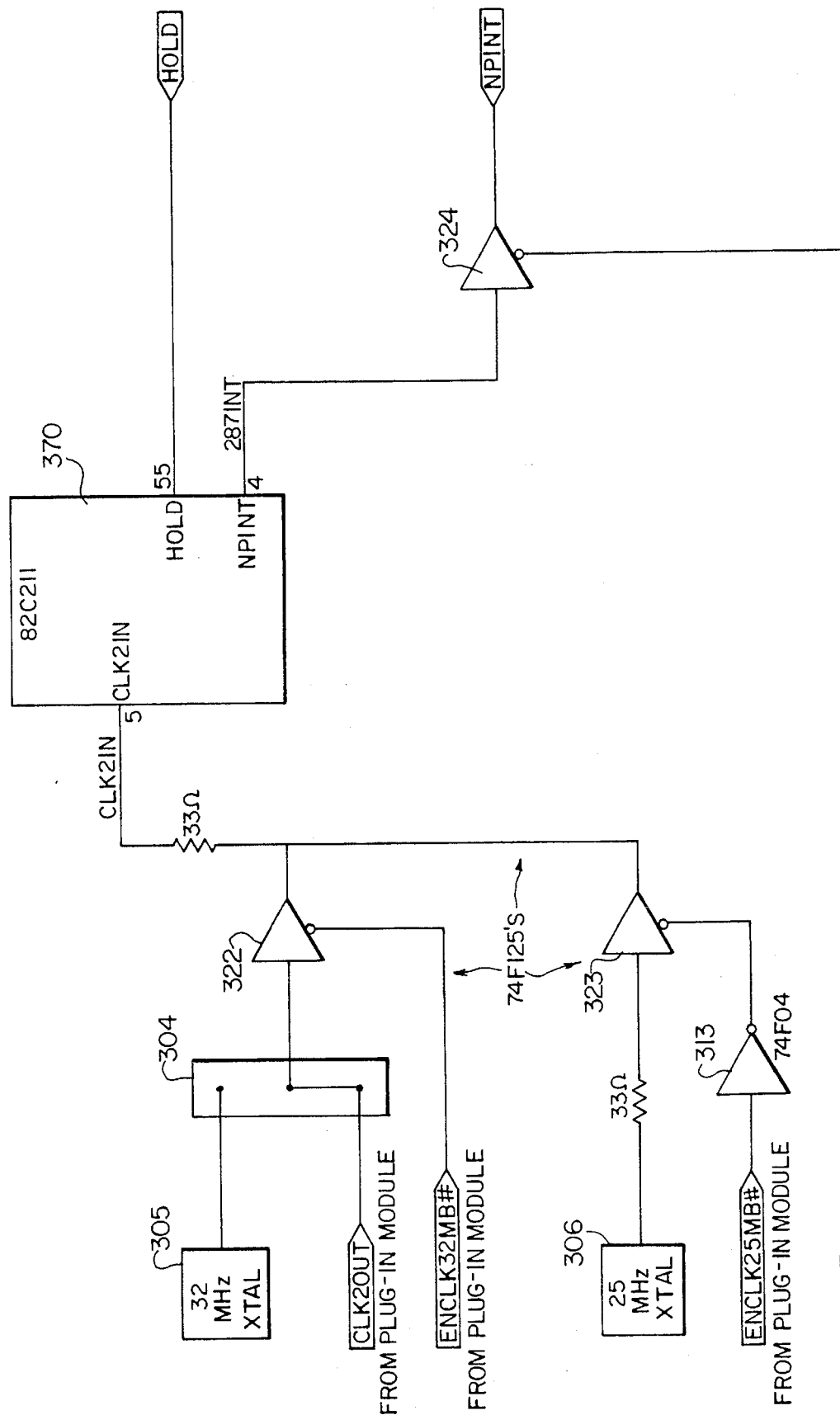
FIG. 5B illustrates a preferred implementation of another portion of the system board's clock selection logic, and numeric processor interrupt control logic.

Referring now to FIGS. 5A and 5B, the portions of the circuitry of the system board, which are of special interest to the present invention, will next be described.

FIG. 5A illustrates a preferred mechanism in which the 80286 processor on the system board is placed in a hold state, so as to allow the 80386SX processor on the plug-in module to take control of the system.

FIG. 5A illustrates the 80286 processor as element 358. Inverter 311 (preferably a 74F04), NAND gate 331 (preferably a 74F00), inverter 312 (preferably a 74F04) and tri-state buffer 321 (preferably a 74F125) are illustrated in the following configuration. The HOLD signal output from HOLD output pin 55 of the NEAT™ 82C211 (FIG. 5B) is input to inverter 311. The inverted HOLD signal from inverter 311 is input to the active-low input of gate 331. The other input of gate 331 is governed by the SXINST# signal generated on the plug-in module, when inserted into connector 114. As shown in FIG. 4, the SXINST# indicates to gate 331 (FIG. 5A) when the 80386SX plug-in module is installed. When the 80386SX plug-in module is installed, pin 114 of connector 114 is grounded, so that the second input of gate 331 is driven low, into its active state.

The output of gate 331, signal NHOLD, drives the HOLD input pin 64 of the 80286 processor.

In this manner, either an activated SXINST# signal from the plugged-in 80386SX module (when installed), or the HOLD signal from the 82C211 chip, can force the 80286 processor into a hold state. Placing the 80286 processor into the hold state effectively removes it from the system.

As described more generally above, the effective removal of the 80286 processor from the system board by the simple insertion of a plug-in module is a central feature of the present invention. Using a very small number of logic gates, as shown in FIG. 5A, the functional removal of the 80286 processor (without necessitating its physical removal from the system board) constitutes a significant advance in the art.

The placement into the hold state of the 80286 processor causes the HLDA output signal on pin 65 to become active. The activation of the HLDA signal should be masked, to prevent any circuits receiving it from believing that no processor at all was in control of the system. In fact, according to the teachings of the present invention, the functional disablement of the 80286 processor on the system board is accompanied by the simple insertion of another processor, such as an 80386SX, on a separate plug-in module.

The presence of the 80386SX processor masks the activated HLDA signal from the 80286 processor on the system board in the following manner.

Referring again to FIG. 5A, the SXINST# signal generated near the plug-in board connector 114 as a result of the plug-in module's insertion is fed to inverter 312. Inverter 312 produces an active-high SXINST signal to indicate that the 80386SX plug-in module is installed. When the SXINST signal is active (high), it disables the output of a tri-state buffer 321, whose input is the HLDA signal. In this manner, when the 80386SX plug-in module is installed, the HLDA signal output from 321 is governed by the HLDA output pin 3 of the 80386SX processor (FIG. 2). By virtue of the bus connection in which the HLDA signal from the 80386SX and the HLDA signal, which may be output from buffer 321, the disablement of buffer 321 relinquishes control of the hold acknowledge function to the new (80386SX) module.

On the other hand, when the 80386SX module is not installed, the SXINST signal (FIG. 5A) is low, allowing the HLDA signal output from the 80286 processor on the system board to control the system-wide HLDA signal shown at the far fight of FIG. 5A.

FIG. 5B illustrates the preferred method of generating clocks for the system, and the method for generation of the numeric processor interrupt signal (NPINT). In particular, when the 80386SX plug-in module is installed into connector 114, the numeric processor interrupt signal NPINT is governed from that module, as described above, with respect to FIG. 3.

Generally, the 80387SX co-processor on the plug-in module is completely isolated from the chip set on the system board, with the exception of the interrupt (the interrupt is generated for numeric co-processing errors).

In known techniques to support an 80387SX co-processor, substantially more circuitry is required, and there still remains a question as to whether the known solution yields a machine which is fully AT® compatible.

Referring now to FIG. 5B, the 82C211 is shown with timing and logic elements to achieve the timing and interrupt functions described above. The third input of the jumper 304 is driven by The CLK2OUT signal is generated on the plug-in module. A middle conductor on the jumper 304 functions as the output of the jumper, so that the jumper effectively functions as a selector, choosing either the 32 MHz crystal locally generated (for developmental testing) not, or (operationally) the CLK2OUT clock generated on the plug-in module by the 32 MHz crystal oscillator 209 (FIG. 4). The middle (output) pin of jumper 304, connected during operation to the clock from the plug-in module, drives the input of a non-inverting tri-state buffer 322 (preferably a 74F125). The output of buffer 322 is connected in common to the output of another tri-state buffer 323. At any given time, at most one of these two buffers is activated so as to control their common output.

A crystal oscillator 306 with 25 MHz frequency drives the input of second tri-state buffer 323, preferably through a 33-ohm series resistor. An inverter 313 (preferably a 74F04) receives the ENCLK25MB# signal generated on the 80386SX plugged-in module. The 313 inverter enables the local 25 MHz signal to reach the output of tri-state buffer 323 when the system is to operate with a 12.5 MHz clock.

The output node of the two tri-state buffers 322 and 323 drives the CLK2IN input pin 5 of the 82C211 preferably through a 33-ohm series resistor.

In the above-described manner, the preferred circuity selectively chooses between a 25 MHz oscillator (306) local to the system board (when no plug-in module is present), a 32 MHz oscillator (305) also local to the system board (used, e.g., during development), or the 32 MHz clock signal generated on the plug-in board (advantageously used during operation when the plug-in module is installed.

Referring to FIG. 5B, the NPINT output pin 4 of the 82C211 generates the 287INT signal. For reasons analogous to those discussed above, with respect to the HLDA hold acknowledge signal generated by the 80286 processor, it is desirable to remove the 287INT signal from the system when the 80386SX plug-in module is installed. The functional removal of the 287INT signal is achieved using a tri-state buffer 324, to whose input the 287INT signal from the 82C211 is fed. The SXINST signal (generated on FIG. 5A) is high when the 80386SX plug-in module is installed, thereby disabling tri-state buffer 324. Control of the NPINT net connected to the output of the tri-state buffer 324 is thus surrendered to the inverter 214 (FIG. 3B), described above.

As described above, the flip-flops 231 and 232, and gates 213, 222 and 214 contribute to control the co-processor interface, handling error conditions and re-clocking the signals as needed for proper functioning when the 80386SX plug-in module is installed.

In addition to the systems described above, the present invention also provides a method for upgrading a computer system having a system board including a first processor, the first processor having a first input which, when activated, causes the first processor to be disabled, the method comprising retaining the first processor on the system board; retaining the system board in the computer system; and installing a plug-in module into the computer system, the plug-in module comprising a second processor, having at least certain performance characteristics different than performance characteristics of the first processor, and an installation announcement circuit for generating an installation announcement signal when the plug-in module is installed in the computer system, in which method the installation of the plug-in module into the computer system causes functional disablement of the first processor.

As stated near the beginning of this Detailed Description, the present invention also provides an embodiment of a plug-in module having an 80486 microprocessor. The 80486 microprocessor is available from INTEL Corporation under the trademarks i486™ and 486™. The i486™ microprocessor is described in the publication entitled i486™ MICROPROCESSOR (April, 1989), available from INTEL Corporation, 3065 Bowers Avenue, Santa Clara, Calif. 95051, as order number 240440-001, which is incorporated herein by reference. Those skilled in the art will readily appreciate the use of the 80486 microprocessor in the present embodiment, given the accompanying drawings, textual description, Tables and Appendices. The interconnection of the microprocessor and other circuit elements is apparent from either the drawing figures, or the Tables and Appendices. Except as noted specifically below, the chips and signals in this specification are used in a manner known to those skilled in the art.

The following discussion thus presents a brief description of the various signals commonly employed by those skilled in the art, but focuses on the translation of the signals between the 80486 format and the 80286 format. As in the first embodiment described above, with respect to the 80386SX microprocessor, it is the translation of signals, and the not the signals themselves, which is a primary focus of the present invention.

A module containing the 80486 may be used simply to upgrade the basic 80286 system. This upgrade is similar to the first embodiment, in which a plug-in module with an 80386SX is added to a "base" computer system having an 80286 on the system board.

However, as presented in the above discussion of FIG. 1, "upgrades of upgrades" are possible. Specifically, the invention provides for removal of a first (e.g., 80386SX) plug-in module and replacement with a second (e.g., 80486) plug-in module. In this manner, the "base" (80386SX) computer system is upgraded to a higher-performance (80486) system without any reference to a processor on the system board. In this scenario, there need not be any (e.g., 80286) processor on the system board at any time, inasmuch as it is inactive in both the "base" 80386SX computer system and the upgraded 80486 computer system.

Referring now to FIG. 6, the 80486 central processor unit (CPU) 401 is illustrated. A 32-bit address bus is provided, including signals A2–A31. (Quasi-address bits A0 and A1 are generated by GAL® 408, described below, with reference to FIG. 8.)

In the IBM® computer family, address bit A20, here labeled with signal name CPUA20, has a use related to a compatibility problem of the XT™ and AT® architectures. The compatibility problem relates to the fact that there is only one megabyte of address space for the 8088 microprocessor in the XT™. The AT® computers (and AT®-compatibles) use a gating arrangement on the A20 address line to provide address "wrap-around" when appropriate. The ability of the present invention to support this compatibility is discussed in greater detail below, with respect to FIG. 11.

Referring again to FIG. 6, signals BE0#, BE1#, BE2# and BE3# are the byte enable signals specifying one or more of the four data bytes on the 32-bit data bus. (The pound sign "#" indicates a signal which is designated as active in its low state.) These byte enable signals allow interfacing the 32-bit 80486 CPU with the 16-bit NEAT™ chip set on the system board.

The three signals LM/IO#, LD/C# and LW/R# which are output from corresponding pins with designators not having the leading "L", are the primary bus definition signals. They relate to memory/input-output, data/control, and write/read lines, respectively. These bus cycle definition signals are used in the GALs® in FIGS. 8 and 11 to translate between 80486 and 80286 cycle formats.

The LADS# output from the ADS# pin is the address status which functions as a data strobe, indicating that a new cycle is taking place.

The BLAST# signal is the burst last signal which indicates that there is no need to wait for an ADS# during burst mode fetching operations.

The HLDA signal acknowledges a request that the CPU give up control of the bus for such operations as DMA and memory refresh.

The PCD signal is the page cache disable signal which reflects the status of certain attribute bits related to the 8K cache memory within the 80486 CPU.

The FERR# signal is a floating point error signal used for compatibility with systems requiring reporting of such errors.

The 32 pins connected to the local data bus LD0 through LD31 are bi-directional, and used in a manner known to those skilled in the art.

Data parity pins DP0, DP1, DP2 and DP3 are connected to their inactive states, as they are not used in the present embodiment.

Figure 7:
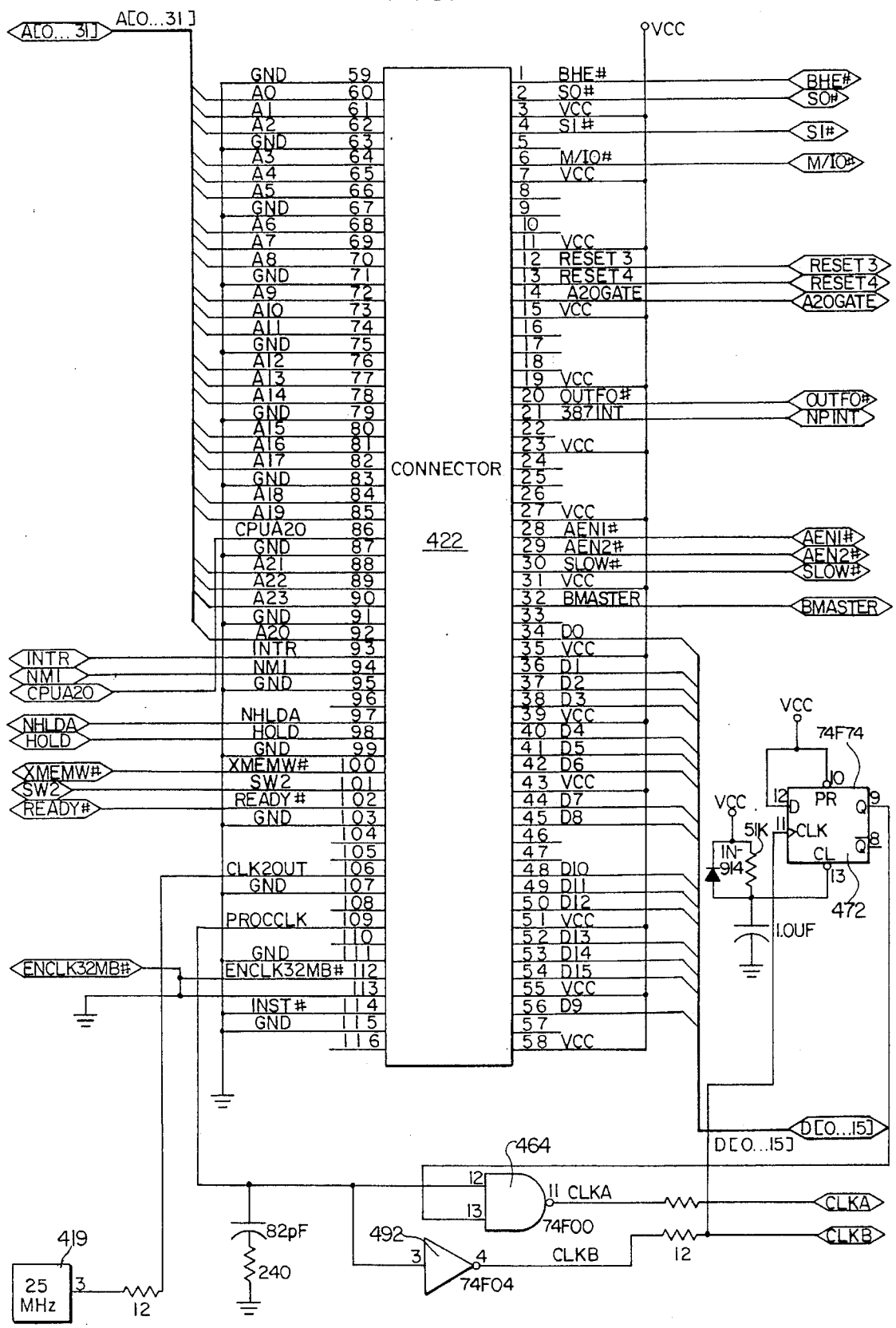
FIG. 7 illustrates a connector 422 and certain clock gating logic in a second embodiment of the plug-in module according to the present invention.

The CLK input receives the CLKA clock signal generated on FIG. 7. This clock signal is ultimately derived from the 25 Mhz crystal 419 (FIG. 7) which is on the plug-in module. In the present embodiment, the 25 Mhz clock is used on both the plug-in module (with the 80486 CPU) as well as on the system board (with the NEAT™ chip set). On the 80486 plug-in module, the 25 Mhz clock is viewed as a "1x" clock signal, whereas on the system board, the NEAT™ chip set views it as a "2x" clock signal. In this manner, the present embodiment allows a faster (25 MHz) CPU to work with a slower (16 MHz) chip set on the system board.

The RDY# signal is the (non-burst) ready signal whose active state indicates that the current bus cycle has been completed. This signal is output from GAL® 402 (FIG. 8A).

The BRDY# is the burst ready input which performs the same function in a burst cycle as the RDY# signal (above) performs during a non-burst cycle.

The RESET input of the CPU receives a RESCPU signal for resetting the CPU. The RESCPU signal is generated by GAL® 412 (FIG. 8B), in turn generated from reset signals from the system board.

The INTR interrupt is the (maskable) interrupt request input from the system board.

The NMI is the non-maskable interrupt signal input from the system board.

Figure 8B:
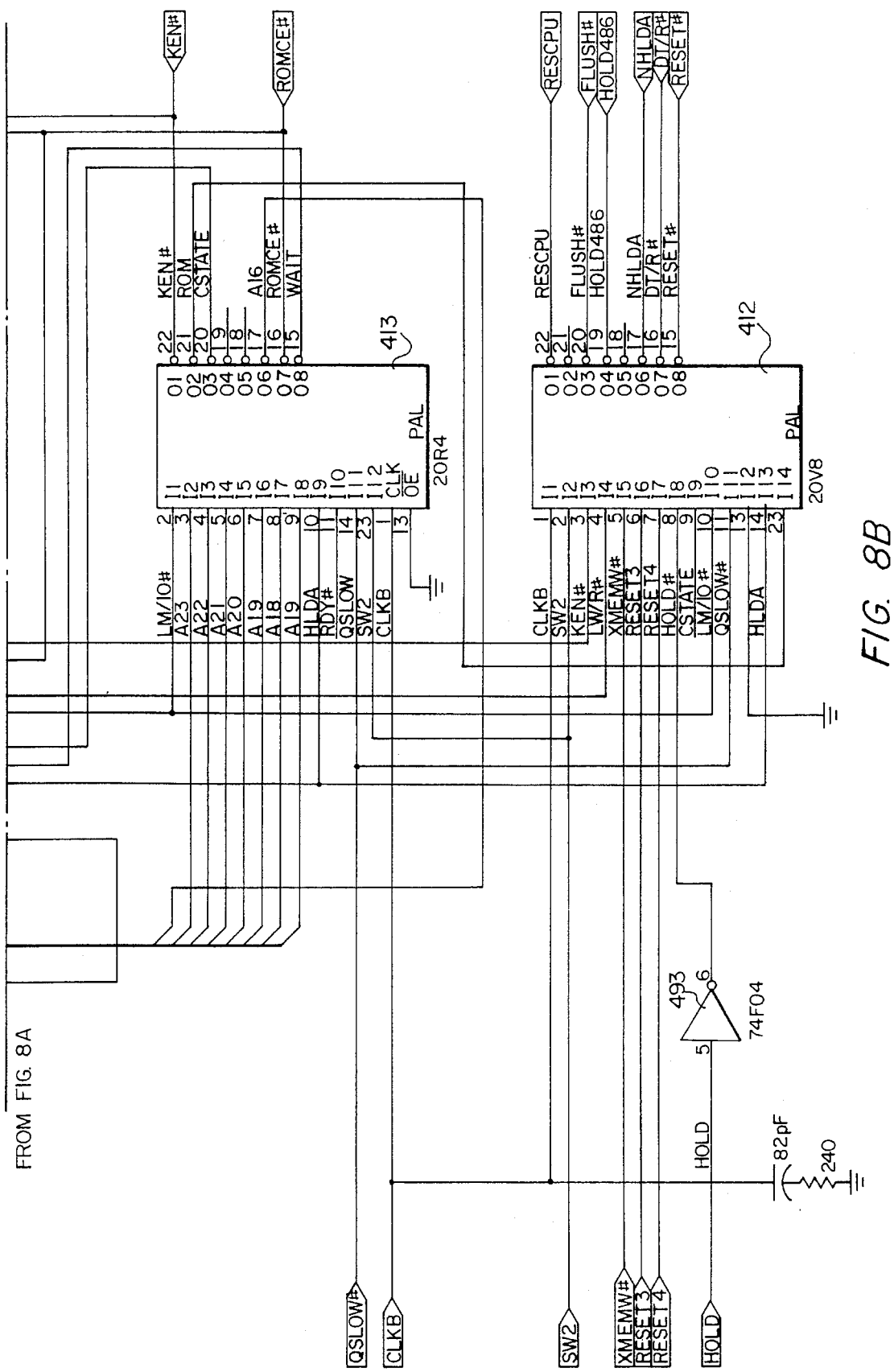

The HOLD input receives the HOLD486 signal which is input from GAL® 412 (FIG. 8B). This bus HOLD request input causes the 80486 to relinquish control of its buses to some other device.

The BOFF#, AHOLD, and EADS# inputs are maintained in their inactive states, as they are not used in the present embodiment.

The KEN# is the cache enable input which determines whether the current cycle is cacheable. The KEN# is generated by GAL® 413 (HG. 8B) according to a formula disclosed in Appendix E. As is known to those skilled in the art, when the cache is enabled, the CPU's internal cache memory may receive dam.

The FLUSH# signal is the cache flush signal generated by GAL® 412 (FIG. 8B) which causes the CPU to flush its entire internal cache memory. The signal is employed to maintain cache coherency.

The IGNNE# is the input causing the CPU to ignore a numeric error in an error handling technique known to those skilled in the art.

The BS 16# and BS8# signals are maintained in their inactive states, as they are not used in the present embodiment.

Figure 11:
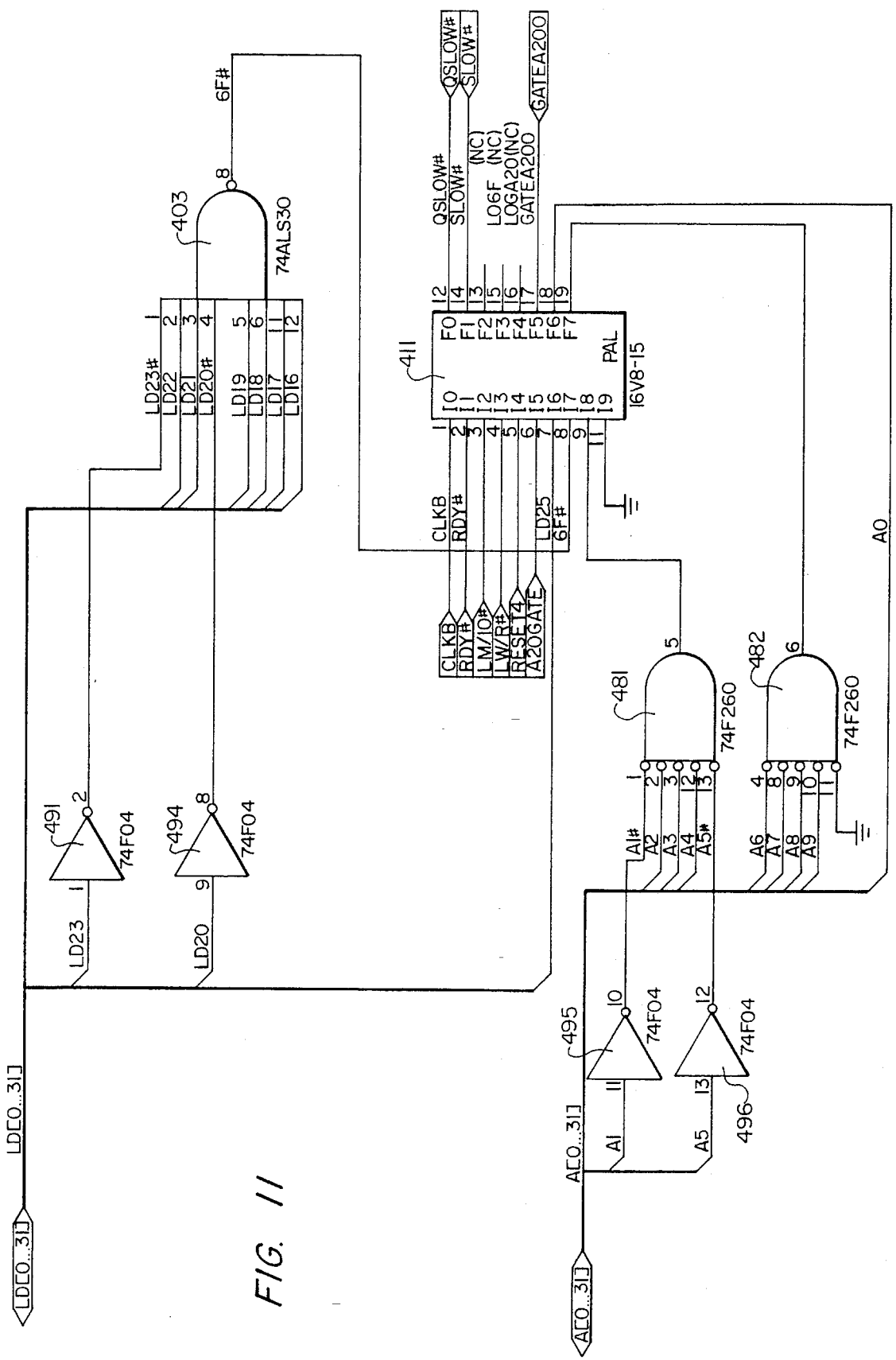
FIG. 11 is a diagram illustrating circuitry for support of the "gate A20" and "clock slow" functions.

The A20M# input receives the GATEA200 signal generated by GAL® 411 (FIG. 11 ). This signal is in return generated from the A20GATE signal from the system board. When the A20M# is activated, the CPU masks bit A20 before referencing the cache memory or external memory. This allows emulation of the address wraparound of the 8086 CPU of the Xt™.

Of course, the VCC and ground connections for the 80486 CPU are illustrated in FIG. 6 as being properly connected for normal CPU operation.

Several components other than the CPU 401 are illustrated in FIG. 6. Pull-up resistor packs 451, 452, 454, 455,456, and 457 are illustrated. They may be implemented using single in-line packages (SIP) having nine pins for connection to nine different input signals and one pin for connecting them via respective internal resistors to the supply voltage, VCC. SIP 451 provides pull-up to the following signals: byte enable signals BE0# through BE3#; bus cycle definition signals LM/IO#, LD/CD# and LW/R#; address status output LADS#; and floating point error output FERR#. SIP 452 pulls up ready input RDY#; burst ready input BRDY#; cache enable signal KEN#; cache flush signal FLUSH#; ignore error signal IGNNE#; as well as pulling signals BOFF#, EADS#, BS16#, and BSS# to their inactive states.

Local data bus signals LD0 through LD31, as well as data parity inputs DP0 through DP3 are connected to VCC through respective pull-up resistors in SIPs 454, 455, 456, and 457.

To smooth the clock signal CLKA, it is connected via an 82 picofarad (Pf) capacitor and series 240-ohm resistor to ground. Also, the AHOLD input is maintained in its inactive low state by being tied to ground through a 33-ohm resistor.

Referring now to FIG. 7, the connector 422 is illustrated along with circuitry for producing the 25 MHz system clock. Connector 422 may be identical to that used with the 80386SX plug-in module, illustrated in FIG. 4. In the present (80486) plug-in module, the connections of the signals passing through connector 422 are listed in Table IV. A difference in nomenclature is found at pin 114. In the embodiment illustrated in FIG. 7, the signal name is INST#, rather than the SXINST# name employed in the first (80386SX) embodiment shown in FIG. 4. The change in nomenclature is for purposes of more broadly describing its function. The actual function of the signal in the context of the present invention is not changed.

Also illustrated in FIG. 7 is a crystal oscillator 419 which may be a 25 MHz crystal oscillator known to those skilled in the art. It may be implemented using an NCT 070 C 25.0 available from SARONIX, 2091 Business Center Drive, Suite 100, Irvine, Calif. 92715. Oscillator 419 outputs a 25 MHz clock signal through a 12-ohm series resistor to the output as signal CLK2OUT on connector pin 106. This signal is provided to the system board via the connector 422.

At connector pin 109, processor clock PROCCLK is returned from the system board. PROCCLK is input to a first input of NAND gate 464 and the input of an inverter 492. Also, for smoothing purposes, a series combination of an 82 picofarad capacitor and a 240-ohm resistor to ground is provided to the PROCCLK signal. NAND gate 464 and inverter 492 provide clock outputs CLKA and CLKB through respective series-connected 12-ohm resistors. These clock signals are substantially identical in phase during operation, but are provided separately for fan-out purposes.

During startup, a gating signal is applied to the second input (pin 13) of NAND gate 464, so that for a given period of time after power-up, no clock is present on signal CLKA. The gating signal received at the second input of NAND gate 464 is provided by the non-inverting output of a D-type flip-flop 472.

As illustrated, flip-flop 472 receives a clock input CLKB from invertor 492. The active-low preset input of the flip-flop is connected to VCC. The data input is also connected to VCC. The active-low clear input to the flip-flop 472 is provided in the following manner. Between the clear input and VCC is provided a parallel combination of a 1N914 diode and a 51 K-ohm resistor, the diode not normally conducting. Between the clear input and ground is a one microfarad capacitor.

Upon power up, the zero voltage across the capacitor is momentarily maintained at the Clear input of the flip-flop, until such time as the capacitor is charged through the 51 K-ohm resistor. Typically, a charging period of approximately 250 milliseconds must expire before the logic threshold of the Clear input allows the high data input of the flip-flop to reach the flip-flop's output. The flip-flop's non-inverting output is connected to the gating input of the NAND gate 464.

In operation, the second input of the NAND gate is low until a period of time has elapsed which is determined by the R-C time constant of the circuit just described. CLKA is thus gated immediately after power up so that power to the CPU is stabilized before active edges of CLKA reach it. Thereafter, the CLKA signal tracks the un-gated CLKB signal. To avoid undesired clocking in the CLKA signal, the gating signal output from the flip-flop changes only synchronously, because the clock input of the flip-flop receives CLKB.

Referring now to FIG. 8, four GALs® 402, 408, 413, and 412 are illustrated. Briefly, these GALs® perform the function of translating signals so as to make the 80486-based signals on the plug-in module compatible with the 80286-based signals on the system board. The GAL® equations for GALs® 402, 408, 413, and 412 are presented in Appendices C, D, E, and F, respectively. Of course, different GAL® equations, and different implementations of the compatibility translation process, lie within the contemplation of the present invention.

First, a very general explanation of the functions of the various GALs® in FIG. 8 will be presented. Thereafter, operational specifics will be detailed.

Briefly, GAL® 402 translates 80486 status signals (LM/IO#, LW/R#, LADS#, BE0™, BE2#) into 80286 status signals (SO#, S1#) to be used on the system board. The signal CSTATE (generated by GAL® 413) is used to synchronize the translated outputs to the 12.5 MHz ("half speed") 80286 chip set. GAL® 402 also provides three state outputs (B2ND, Q0, Q1) used internally and externally to track the state of the cycle in progress. Furthermore, GAL® 402 generates the RDY# and BRDY# signals which indicate to the 80486 that the cycle is complete.

Briefly, GAL® 408 translates the four byte enable signals of the 80486 into 80286 BHE#, A1, and A0 signals. This conversion is necessary to allow the 80486 32-bit data bus to communicate with the 80286 16-bit data bus. In addition, GAL® 408 uses the B2ND signal from GAL® 402 and the 80486 byte enable signals to generate output control for four bi-directional buffers (FIG. 9) which transmit data from the 16-bit system board to the 32-bit 80486 CPU.

Briefly, GAL® 413 is primarily an address decoder. Addresses A16–A23 are input to GAL® 413. These addresses are decoded to provide the KEN#, ROM and ROMCE# outputs. These signals are used to enable the 80486 cache memory, decode ROM and video on memory write cycles, provide cache coherency, and decode the system BIOS address for memory ready cycles. In addition GAL® 413 provides a 12.5 MHz signal (CSTATE) which is used to synchronize the 25 MHz 80486 translation logic to the 12.5 MHz system board.

Briefly, GAL® 412 uses the system board signals RESET3 and RESET4 to generate RESCPU to be sent to the 80486 RESET input, and reset to the math coprocessor error circuit. GAL® 412 also generates the FLUSH# signal to the 80486. The FLUSH# signal, when activated, causes the 80486 to invalidate its entire internal cache. This is done to simulate a slow speed mode and to maintain cache coherency during DMA memory write cycles and memory write cycles to system or video BIOS ranges. A new hold acknowledge signal (HLDA) is generated by gating the HLDA from the 80486 with the hold request signal generated by the system board. The resultant signal causes the HLDA signal to be removed immediately when the system board removes the hold request signal.

The four GALs® in FIG. 8 may advantageously be implemented using, respectively, 22V10-15, 20L8, 20R4, and 20V8 GALs®, available from Lattice Semiconductor Corporation, whose address is provided above.

Referring now to specific GALs®, the functions of GAL® 402 center around the generation of "READY" signals for the CPU. GAL® 402 equations are provided in Appendix C. Specific signal inputs and outputs are as follows.

Pin 1 :CLKA: This signal is the clock signal generated a certain time after powerup by NAND gate 464 (FIG. 7).

Pin 2:LADS#: This is the address status signal generated by the CPU (FIG. 1 ).

Pin 3:LM/IO#; PIN 4; LM/R#; PIN 5:LD/C#: These bus cycle definition signals are generated by the CPU (FIG. 6).

Pin 6: BE0#; Pin 7: BE2#: These two byte enable signals are generated by the CPU (FIG. 6).

Pin 8: BLAST#: The burst last signal is generated by the CPU (FIG. 6).

Pin 9: WAIT: This signal is generated by GAL® 413 (FIG. 8B), and is used for SLOW mode.

Pin 10: CSTATE: This signal is generated by GAL® 413 for a state signal representation, and is used for keeping the 80486 CPU in phase with the 80286 system board one-half speed clock.

Pin 11: RESCPU: This reset CPU signal is generated by GAL® 412 (described below).

Pin 13: BE1#: This byte enable signal is generated by the CPU (FIG. 6).

Pin 14: READY#: This input signal is generated on the system board and indicates completion of a bus cycle.

Figure 10:
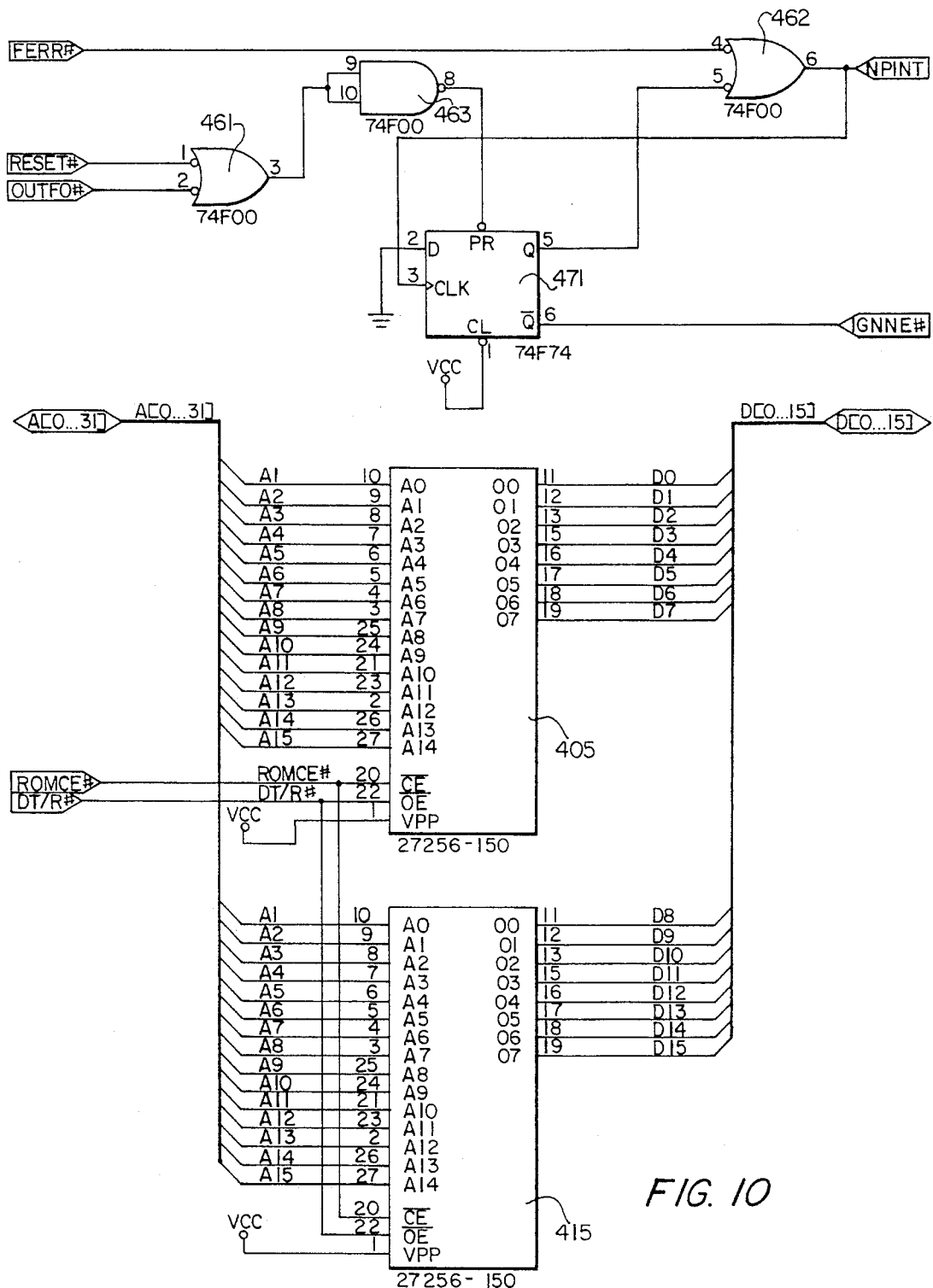
FIG. 10 is a logic diagram illustrating support circuitry for the coprocessor built into the 80486 CPU, as well as EPROMs in which is resident the BIOS which functionally replaces the BIOS on the system board.

Pin 22: ROMCE#: This input signal is generated by GAL® 413 and functions as a chip enable signal for the BIOS ROMS 405 and 415 (FIG. 10). When active, this signal allows mapping of ROM BIOS memory space onto this module's ROMs. Memory locations F0000 through FFFFF and FF0000 through FFFFFF are thus not mapped to the system board. The inclusion on the 80486 plug-in module of ROM BIOS avoids the need of replacing BIOS chips on the system board.

Pin 23: KEN#: This cache enable signal is generated by GAL® 413, and indicates that the present cycle is cacheable.

The outputs of GAL® 402 will next be described.

Pin 15: BRDY#: This burst ready signal is input to the CPU (FIG. 6).

Pin 16: O1: This state representation bit is used in GALs® 402 and 408 to track the status of the current bus translation cycle.

Pin 17: S0#: A status bit for use on the system board.

Pin 18: RDY#: A ready bit which is input to the CPU (FIG. 6).

Pin 19: O0: This state representation bit is used in GALs® 402 and 408 to track the status of the current bus translation cycle.

Pin 20: B2ND: This flag keeps track of a series of two 16-bit fetches, determining whether the first or second 16-bit of a 32-bit word are presently being fetched. It is also used to latch the first 16 bits of a 32-bit cycle into buffers 418 and 414.

Pin 21: S1#: A status signal used on the system board.

Figure 9:
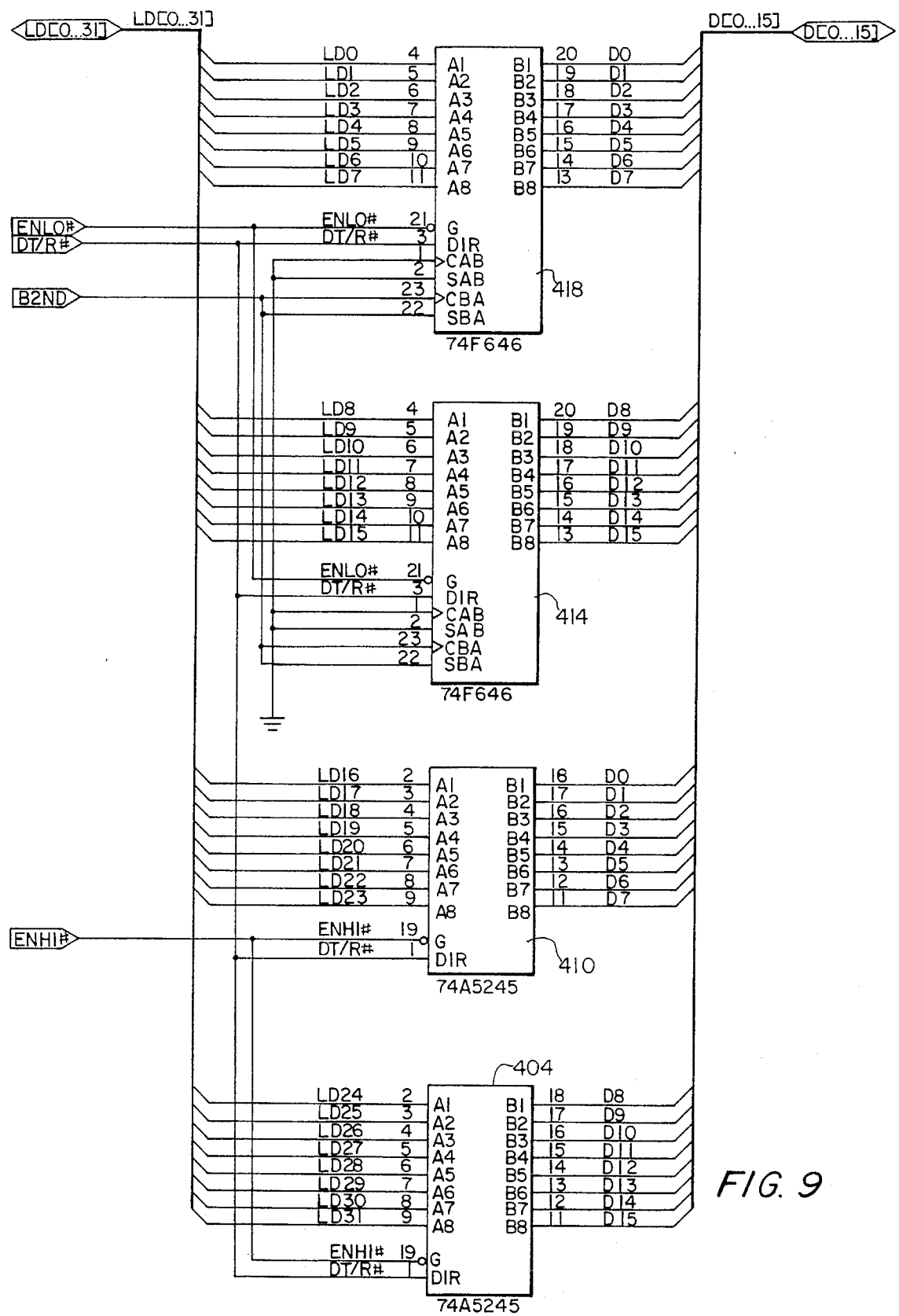
FIG. 9 illustrates bi-directional buffers used to interface the 32-bit data bus of the processor to the 16-bit data bus of the 80286 processor.

GAL® 408 handles byte translation for the 32-to-16 bit data interface, including the bi-directional buffers which are included in FIG. 9. Equations for GAL® 408 are provided in Appendix D. Specific inputs and outputs of GAL® 408 are as follows.

Pin 1: BE0#; Pin 2: BE1#; Pin 3: BE2#; and Pin 4: BE3#: These byte enable signals are generated by the CPU (FIG. 6).

Pin 5: LW/R#: This bus cycle definition bit is generated by the CPU (FIG. 6).

Pin 6: HLDA: This hold acknowledge signal is generated by the CPU (FIG. 6).

Pin 7: LM/IO#; Pin 8: LD/C#: These bus cycle definition bits are generated by the CPU (FIG. 6).

Pin 9: KEN#: This cache enable signal is generated by GAL® 413, and has been described above.

Pins 10 and 11: Q0 and Q1 are representation bit is used in GALs® 402 and 408 to track the status of the current bus translation cycle.

Pin 13: CSTATE: This signal is generated by GAL® 413 to keep track of the state of the clock (whether it is a "1X" clock or a "2X" clock) and has been described above.

Pin 14: ROMCE#: This ROM BIOS chip enable is generated by GAL® 413, and has been described above.

Pin 23: B2ND: This signal is generated by GAL® 402 to keep track of whether a first or second 16-bit fetch of a full 32-bit fetch is being performed.

Pin 22: BHE#: The byte high enable signal indicates to the system board that the upper 8 bits of a 16 bit word are designated.

Pin 21: A0; Pin 20: A1: These quasi-address bits, with BHE#, translate the 80486 byte enable signals BE0–BE2 into equivalent 80286 signals. A1 defines which 16 bits of a 32-bit access are designated, while A0 designates the lower 8 bits of a 16 bit word.

Pin 19: READY#: This signal from the system board NEAT$^{TM}$ chip set indicates completion of the cycle, and is used in generation of the local RDY# signal.

Pin 17: ENLO#;Pin 16: ENHI#: These control bits enable the lower and upper bits of the data interface shown in FIG. 9.

Pin 15: M/IO#: This signal is a re-creation of the bus cycle definition signal for memory/input-output, which signal is sent to the system board.

GAL® 413 handles the address decoding for cache coherency and for ROM BIOS cycles. The logic equations for GAL® 413 are provided in Appendix E. Inputs and outputs to GAL® 413 are as follows.

Pin 2: LM/IO#: This bus cycle definition bit is generated by the CPU (FIG. 6).

Pins 3, 4, 5, 6, 7, 8, 9: A23, A22, A21, A20, A19, A18, A17: These are the CPU address bits used mainly for a decoding function for the KEN#, ROM, and ROMCE# outputs.

Pin 10: HLDA: This hold acknowledge signal is generated by the CPU (FIG. 6), and has been described above.

Pin 11: RDY#: This signal is generated by GAL® 402, described above.

Pin 14: QSLOW#: This signal, relating to the "SLOW MODE", is generated by GAL® 411 (FIG. 6), to be described below.

Pin 23: SW2: This signal is generated on the system board, and is used to assist control of the cache enable. It defines an area of memory as being cacheable.

Pin 1: CLKB: This clock signal is generated on FIG. 7, as described above.

Pin 13: OE#: This output enable signal is maintained in its active low state.

Pin 22: KEN#: This cache enable signal is input to the CPU (FIG. 6) as well as various other GALs®, and is active when the current cycle indicates an address which is cacheable.

Pin 21: ROM: This signal ensures that the ROM BIOS region of memory is read and not written, so as to preserve cache coherency.

Pin 20: CSTATE: This signal is used in GALs® 402 and 408 for keeping the and 80286 clocks in proper phase relationship.

Pins 18, 19: These signals are used for state definition, and are not used in the present embodiment.

Pin 17: A16: This is bit A16 of the address bus.

Pin 16: ROMCE#: This is the ROM chip enable for the ROM BIOS (FIG. 10) enabling the ROMs on proper READ cycles.

Pin 15: WAIT: This signal is used during the "SLOW MODE" and is input to GAL® 402, described above.

GAL® 412 performs functions related to resetting the CPU, flushing the cache memory so as to main cache coherency, and controlling the direction of the bi-directional data buffers in FIG. 9. The GAL® equations for GAL® 412 are provided in Appendix F. The particular signals input and output from GAL® 412 are provided as follows.

Pin 1: CLKB: This 25 MHz clock is that generated on FIG. 7, described above.

Pin 2: SW2: This signal is generated on the system board and has been described above, with respect to GAL® 413.

Pin 3: KEN#: This cache enable signal is generated by GAL® 413, as described above.

Pin 4: LW/R#: This bus cycle definition bit is generated by the CPU (FIG. 6), and has been described above.

Pin 5: XMEMW#: This signal is generated on the system board, and passes through connector 422 (FIG. 7).

Pins 6, 7: RESET3, RESET4: These signals are generated on the system board, and pass through connector 422 (C2).

Pin 8: HOLD#: This active-low hold request signal is the logical inversion of the HOLD signal generated from the system board. An inverter 493 (FIG. 8B) on the plug-in unit performs this inversion.

Pin 9: CSTATE: This signal is generated by GAL® 413, as described above.

Pin 10: LM/IO#: This bus cycle definition bit is generated by the CPU (C1).

Pin 11: QSLOW#: This signal is generated by GAL® 411 (FIG. 11) and is used in avoiding race conditions.

Pin 13 is maintained in its low state.

Pin 14: HOLDA: This HOLD acknowledge signal is generated by the CPU (FIG. 6).

Pin 23: ROM: This signal, generated by GAL®413, is used to flush the 80486 internal cache memory following memory write cycles to video or system BIOS, for maintenance of cache coherency.

Pin 22: RESCPU: This RESET CPU signal is input to the Reset input of the CPU (FIG. 6).

Pin 21: not used.

Pin 20: FLUSH#: This signal is connected to the Flush input of the CPU (FIG. 6) so as to flush the cache memory for cache coherency.

Pin 19: HOLD486: This signal is connected to the Hold input of the CPU (FIG. 6), causing the CPU to relinquish control of the bus.

Pin 17: NHLDA: This new hold acknowledge signal is sent to the system board via connector 422 (FIG. 7).

Pin 16: DT/R#: This signal is connected to the "direction" inputs of bi-directional buffers 418, 414, 410, and 404 (FIG. 7) for governing the direction of data transfers.

Pin 15: RESET#: This reset signal is input to circuitry in FIG. 10, relating to generation of numeric processor interrupt signal to the system board and the IGNNE# to the 80486 to ignore an error condition.

Also illustrated in FIG. 8A is a SIP of 1K-ohm resistors which pull up various signals to VCC. SIP 453 provides pull-up for address lines A24 through A31, as well as the LADS# signal from the address status output of the CPU (FIG. 6).

Figure 6B:
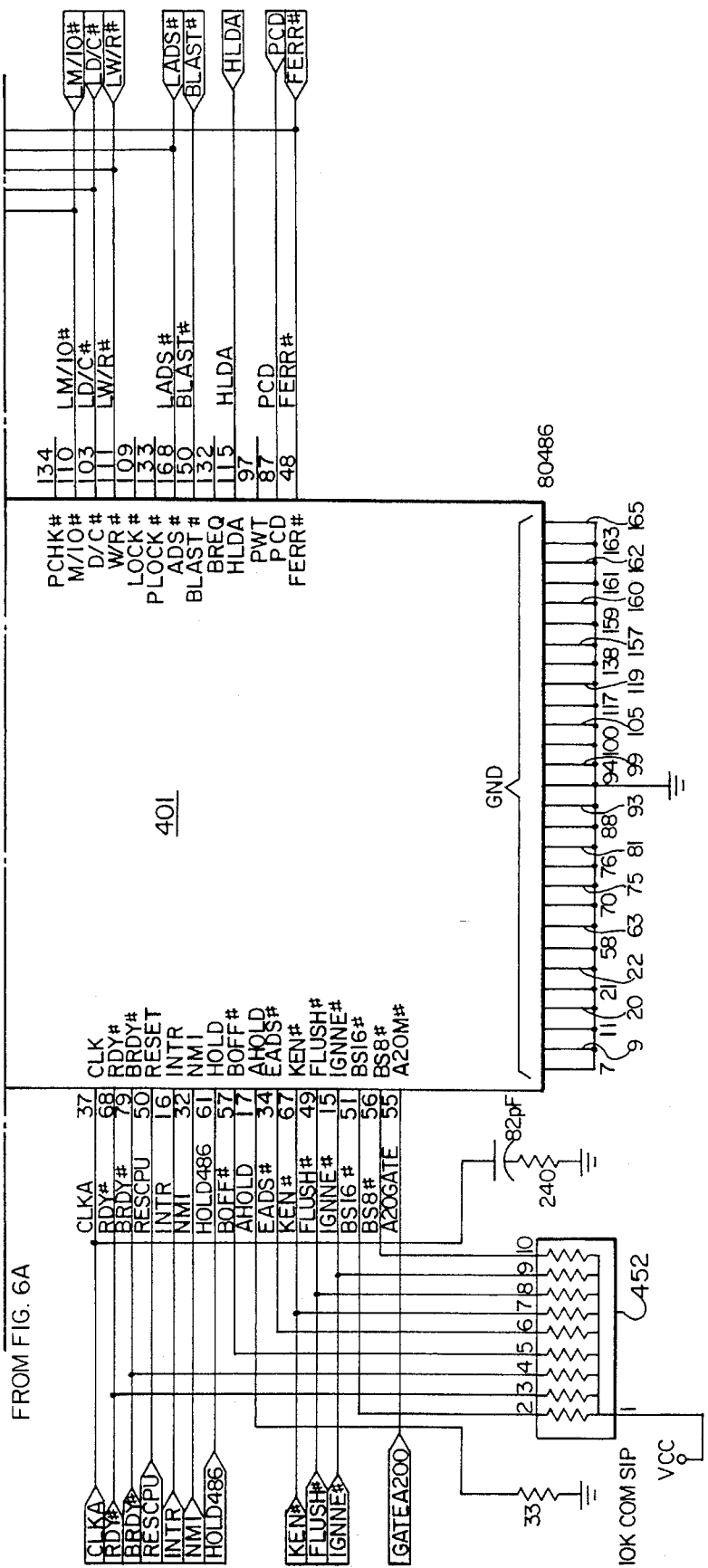

Also illustrated in FIG. 8B is a series combination of an 82 picofarad capacitor and a 240-ohm resistor. The series combination is connected between the clock signal CLKB and ground, so as to provide smoothing of the clock signal. A similar smoothing arrangement for CLKA is illustrated in FIG. 6B.

Referring now to FIG. 9, four 8-bit buffers are illustrated. The buffers are bi-directional buffers, each handling four consecutively higher-order bytes of the data bus. Buffer 418 handles the lowest byte; buffer 414, the second lowest byte; buffer 410, the third-lowest byte; and buffer 404, the high-order byte. The low-order buffers 418 and 414 are advantageously implemented using 74F646 buffers, whereas high-order buffers 410 and 414 may be implemented using 74AS245 buffers. These buffers are available from, for example, SIGNETICS of Sunnyvale, Calif., or TEXAS INSTRUMENTS of Dallas, Tex.

The buffers are bi-directional and provide communication between the local, 32-bit 80486 data bus including signals LD0 through LD31 (on the left side of FIG. 9), and the 16-bit data bus from the system board (on the fight side of C4). The 80286 data bits D0–D15 are connected both to the two low-order buffers 418 and 414, as well as to high-order-buffers 410 and 404. This arrangement allows controlled communication of data between the 32-bit 80486 bus and the 16-bit 80286 bus.

The signals ENLO# and ENHI# are input to the G inputs of the low and high order buffer pairs 418/414 and 410/404, respectively. The signal ENLO# thus enables communication between the 80286 data bus and the low-order 16 bits of the 80486 data bus. Conversely, the ENHI# control signal allows communication between the 80286 data bus and the high-order 16 bits of the 80486 data bus. The ENLO# and the ENHI# control signal are generated by GAL® 408 (FIG. 8A) in accordance with equations provided in Appendix D.

The direction of data transmission is determined by the control signal labeled DT/R#. The DT/R# signal is generated by GAL® 412 (FIG. 8B) in accordance with a GAL® equation provided in Appendix F. The DT/R# signal is input from the GAL® to the Direction input of each of the four data buffers 418, 414, 410, and 404.

The CBA and SBA inputs of the 74F646 buffers 418 and 414 are connected to the B2ND control signal output by GAL® 402 (FIG. 8A). This signal determines whether the first 16 bit fetch or the second 16 bit fetch of a 32-bit fetch is presently occurring on the data bus. B2ND transitions at the end of the first 16-bit read of a 32-bit read cycle. This transition causes data to be latched into the 74F646 latches 418 and 414 to be presented to the data inputs of the 80486.

The CAB and SAB inputs of the buffers 418 and 414 are connected to ground.

During operation, a WRITE function is achieved by causing the data to flow from the CPU side of the buffers (LD0–LD31) to the system board side of the buffers (D0–D15). In both 16-bit and 32-bit transfers, only one of the lower or upper pairs of buffers is enabled at one time, so that data from either LD0–LD15 or LD16–LD31 reaches the 80286 data bus. The opposite pair of buffers is floated to a high-impedance state. In the second half of a 32-bit transfer, the lower-order buffers and the higher-order buffers are then reversed in function, so that the opposite pair of buffers passes data through to the 16-bit 80286 bus.

During a READ operation, the data flows from the 80286 data bus D0–D15 through one or both of buffer pairs 418/414 or 410/404, depending on whether a 16-bit or a 32-bit transfer is occurring. The lower-order buffers 418 and 414 latch data from the 80286 bus D0–D15 during one half of a Read cycle. During the other half of the Read cycle, the data in buffers 418 and 414 remains latched, while new data is allowed to flow through high-order buffers 410 and 404. At the end of the second half of the cycle, therefore, the four buffer chips present a full 32-bit data word to the 80486 data bus LD0–LD31. The signals RDY# and BRDY# (GAL® 402, FIG. 8A) are generated during 32-bit transfers after all 32 bits are ready for the 80486 CPU during Read cycles. These signals allow data to be read into the CPU.

Referring now to FIG. 10, logic elements are illustrated which support the coprocessor which is built into the 80486 CPU. The circuit comprises three 74F00 gates 461, 462, and 463, with a D-type flip-flop 471.

The first 74F00 gate 461 (functioning as an OR gate with active-low inputs) receives the RESET# signal from GAL® 412 (FIG. 8B) and the OUTF0# signal from the system board (through connector 422, FIG. 7). The output of gate 461 is received at the inputs to NAND gate 463. NAND gate 463 inverts the signal.

Gate 462 (functioning as an OR gate with active-low inputs) receives at its first input the FERR# signal from the CPU (FIG. 6B). The second input of gate 462 is received from the non-inverted output of the flip-flop 471, to be described below. Gate 462 provides the numeric processor interrupt signal NPINT to the system board through connector 422 (FIG. 7) as well as to the clock input of flip-flop 471.

Flip-flop 471 has its data input connected to ground, its clock input connected to the output of gate 462. Its clear input is disabled by being connected to VCC, while its preset input is provided by NAND gate 463. The inverted output of the flip-flop is the IGNNE# control signal which is provided to the CPU's "ignore numeric processor error interrupt" pin.

In operation, the flip-flop 471 is preset by either of the RESET# or OUTF0# signals which pass through gates 461 and 463. After being preset, the non-inverting output provided to gate 462 is high, and the inverted output IGNNE# is low. At this time, the NPINT output of gate 462 is inactive (low). However, when the FERR# signal undergoes a transition from high to low, the output of gate 462 goes from its low state to its high state, thus clocking in the low input at the flip-flop to its output. This causes reversal of the outputs of the flip-flop so that the second input of gate 462 is now low, thus forcing gate 462 to remain high. The inverted output IGNNE# causes the CPU to stop ignoring numeric processor errors.

Referring now to the lower portion of FIG. 10, two 27256-150 Erasable Programmable Read Only Memories (EPROMs) 405 and 415 are illustrated. The Chip Enable inputs of these EPROMs are driven by the ROMCE# signal generated by GAL®413 (FIG. 8B). The direction control bit DT/R# (from GAL® 412 in FIG. 8B) is input to the output enable inputs of the EPROMs; this ensures that the outputs of the ROM BIOS control the 80286 data bus only during Read cycles. The VPP inputs of the EPROMs are connected to VCC.

The outputs of the EPROMs float to a high-impedance state when the BIOS addresses are not being accessed. Address inputs A1–A15 are connected to the A0–A14 inputs, respectively, of each of the two EPROM chips. The data outputs of the EPROMs are connected to the lower and upper bytes of the 80286 data bus. Quasi-address signal A1 is actually generated by GAL® 408 (FIG. 8A). This special connection allows the BIOS to present the appropriate 16 bits of a 32-bit fetch cycle to the data bus.

The EPROMs 405 and 415 are mapped into the 80486's memory space to replace the system board BIOS. If the system BIOS changes, the end user need not concern himself with replacing system board BIOS chips simply because he is using the 80486 plug-in module according to the present invention. Rather, the new BIOS is provided on the plug-in module itself. In this manner, full compatibility is achieved without compromise in ease of user installation of the plug-in module. This allows use of the full utility of the features of the 80486 CPU.

Referring now to FIG. 11, there is illustrated discrete logic and a GAL® 411. This circuitry is used to track the GATE A20 function which is provided by the NEAT™ chip set on the system board.

The inverters 491 and 494, along with the 8-input NAND gate 403 provide a data decoding function to generate signal 6F#. In the third byte of the data bus, local data bits LD20 and LD23 are inverted by respective inverters 494 and 491 before being input with the other non-inverted local data bits to the 8-input NAND gate 403. When the address 6F appears on the local data bus, signal 6F# becomes active (low). The 6F# signal is used to track the status of the NEAT™ chip set's internal "gate A20" function. The 6F# signal is input to GAL® 411, described below.

Similarly, inverters 495 and 496 operate with 74F260 gates 481 and 482 (operating as active-low-input AND gates) to provide an address decoding function. Address bits A1 and A5 are inverted by respective 74F04 inverters 495 and 496 before they are input to the first and fifth inputs of gate 481. Non-inverted address bits A2, A3, and A4 are input to the remaining inputs of gate 481. Non-inverted address bits A6, A7, A8, A9 are input to gate 482. The remaining input of gate 482 is connected to ground, and has no logical effect. The outputs of gates 481 and 482, as well as address bit A0, are input to GAL® 411, to be described immediately below. A0 and A1 are not "address" bits, but rather are generated by GAL® 408 (FIG. 8A).

Briefly, GAL® 411 provides the logic necessary to track the NEAT™ chip set's internal "fast" GATEA20 feature. As known to those skilled in the art, eating of the address bit A20 is used in allowing the compatibility of AT® systems to XT™ systems. (XT™-compatible systems are limited in that the primary address wrapped around after one megabyte, a feature which is not present in AT®-compatible systems and which must be accounted for to provide full compatibility.) By decoding the I/O address ports 22 and 23 and the data pattern 6F, the GAL® is able to exactly follow the internal state of the NEAT™ chip set's fast GATEA20 mode. This tracking is necessary to maintain cache coherency in the 80486 internal cache when the fast GATEA20 feature is used. In addition, GAL® 411 is allows the QSLOW output to change only at the end of a cycle, preventing the FLUSH pin of the 80486 from changing in the middle of a cycle.

More specifically, GAL® 411 functions according to logic equations which are presented in Appendix G.

Specific signals input to and output from GAL® 411 include the following.

Pin 1: CLKB: This is the 25 MHz clock generated on FIG. 7.

Pin 2: RDY#: This ready signal is generated by GAL® 402 (FIG. 8A).

Pins 3, 4: LM/IO#, LW/R#: These bus cycle definition bits are generated by the CPU (FIG. 6).

Pin 5: RESET4: This reset signal is generated on the system board.

Pin 6: A20GATE: This gating signal is generated on the system board.

Pin 7: LD25: Local data bit 25.

Pin 8: 6F#: This signal is generated by the data decoding circuitry comprising gates 491, 494, and 403.

Pin 9: This pin receives the output of gate 481, a decoding of address bits A1–A5.

Pin 11: This pin is connected to ground.

Pin 19: This pin is connected to the output of gate 482, resulting from a decoding of address bits A6–A9.

Pin 18: AO: This quasi-address bit is generated by GAL® 408 (FIG. 8A).

Pin 12: OSLOW#: This signal is a clocked version of the SLOW signal and is involved with synchronization during change of speeds. The QSLOW# signal is input to GAL®s 413 and 412 (FIG. 8B).

Pin 14: SLOW#: This is an un-clocked version of the QSLOW# signal, described above.

Pin 17: GATEA200: This signal is input to the CPU (FIG. 6), allowing the CPU to implement the "GATEA20" function.

The particular embodiments of FIGS. 2 through 4, and of FIGS. 6 through 11, have now been fully described.

As described above, "upgrades of upgrades" are possible. That is, a system with a first (e.g., 80386SX) plug-in module may be replaced with a second (e.g., 80486) plug-in module, thereby upgrading the "base" 80386SX system at minimal cost.

Another advantage of the present invention is that both plug-in modules present to the system board bus characteristics which are compatible with the NEAT™ chip set and other operational components. Such other operational components may comprise dynamic random access memories (DRAMs), which are costly memory chips often used as CPU memory. The plug-in module translation circuitry makes the processors on each plug-in module fully compatible with the operational components on the system board, so that the operational components need not be present on the plug-in modules themselves. The ability of plug-in module processors according to the present invention to make full use of operational components already on the system board thus lowers the cost of each plug-in module.

Lower-cost plug-in modules lower the effective cost of upgrading any computer system, regardless of whether the upgrade is the addition of a first plug-in module to a system board or whether a given plug-in module is replaced by a subsequent plug-in module. Cost savings are thus achieved by minimizing unnecessary duplication of operational components on the plug-in modules themselves. For example, costly and space-consuming DRAM chips need not be present on the plug-in modules. As understood within this specification, the operational components whose needless duplication is avoided need not be on the same board into which the plug-in module is inserted. The operational components whose duplication on the plug-in modules is avoided, may be present anywhere in the "base" computer system, which here means the portions outside the upgrade plug-in module.

Only that portion of the system which is desired to be upgraded (such as the CPU) needs to be replaced. Only translation circuitry (such as that implemented using the GALs® described above) need accompany the CPU on the plug-in module. The inclusion of minimal circuitry on the plug-in module results in this substantial saving of cost and physical space.

The facility of upgrading computer systems according to the present invention is further enabled through use of connectors which may be edge card connectors. Suitable edge card connectors may not even require screws or other attachment mechanisms which make installation more difficult. The reduced size of plug-in modules according to the present invention allows the physical aspect of upgrading to be easy for the end user.

Thus, the invention provides a method of upgrading a computer system having a system board and an earlier plug-in module including a first processor. The system board has operational components for use in conjunction with one or more types of processors. The system board further includes a system board bus having system board bus characteristics which are compatible with a set of desired processor bus characteristics which allow the operational components to operate. The method comprises removing the earlier plug-in module while retaining the system board in the computer system and installing an upgrade plug-in module into the computer system. The upgrade plug-in module includes a second processor having at least certain performance characteristics different than performance characteristics of the first processor, for performing functions otherwise performed by the first processor. The earlier plug-in module and the upgrade plug-in module present to the system board bus respective sets of upgrade module bus characteristics which are compatible with the desired processor bus characteristics.

The invention also provides a computer system capable of being upgraded as described above, an upgraded computer system, a computer system having plug-in modules selectably useable into a system board, and one or more plug-in modules for upgrading computer systems, each invention operating in accordance with principles described above.

The invention provides the above features and advantages in an embodiment of a personal computer which is easy for an untrained person to use.

Figure 12:
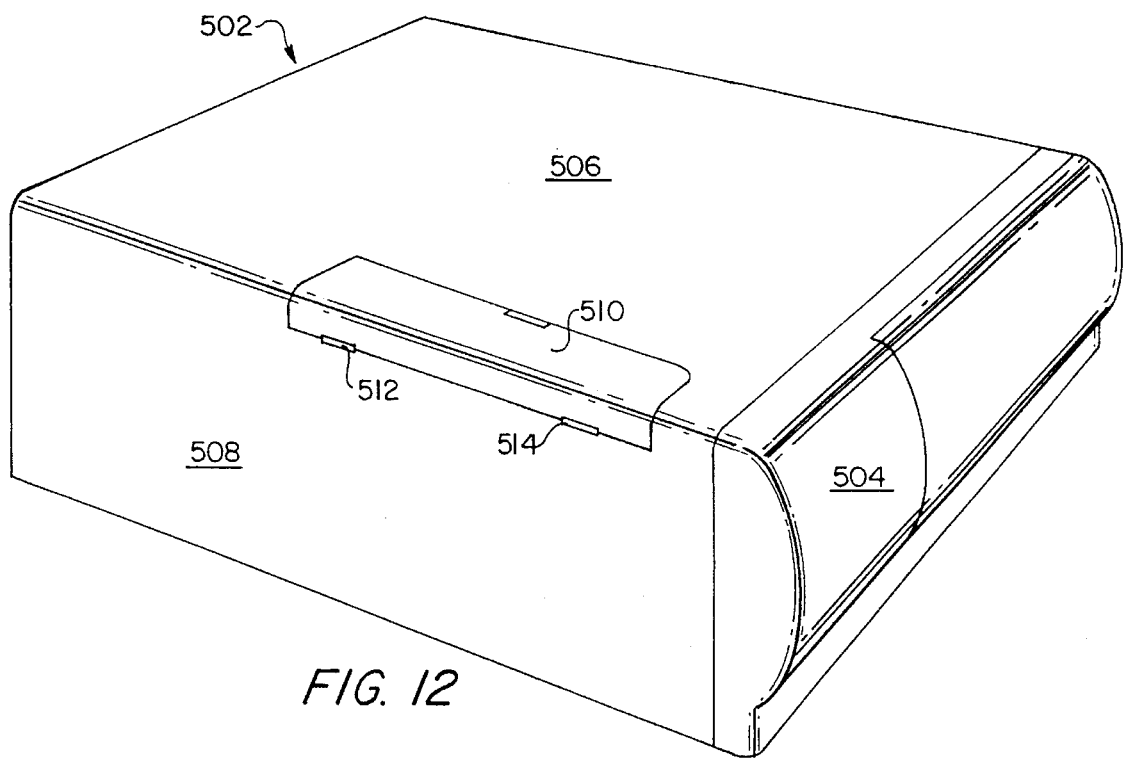
FIG. 12 illustrates a personal computer (PC) cabinet especially suitable for use with the present invention, including an access door through which a cartridge may be inserted or removed.

Referring now to FIG. 12, a cabinet 502 of a personal computer is illustrated in perspective. The cabinet 502 has a front face 504, a top face 506, and a left side face 508. On the top face 506, at the edge joining left face 508, an access door 510 is provided with co-axial hinges 512, 514 by which access door 510 may be opened and closed. It is through access door 510 that a cartridge according to the present invention (described below), preferably having an upgrade processor as described above, may be inserted and removed into the personal computer's cabinet 502.

Figure 13:
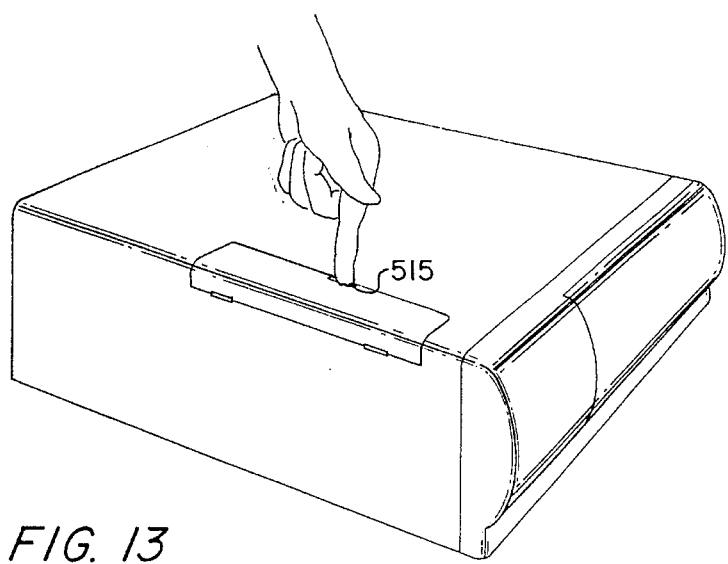
FIG. 13 illustrates a manner in which the access door may be opened.

Referring to FIG. 13, an individual's hand is shown manipulating a handle 515 on the access door 510, to open it.

Figure 14:
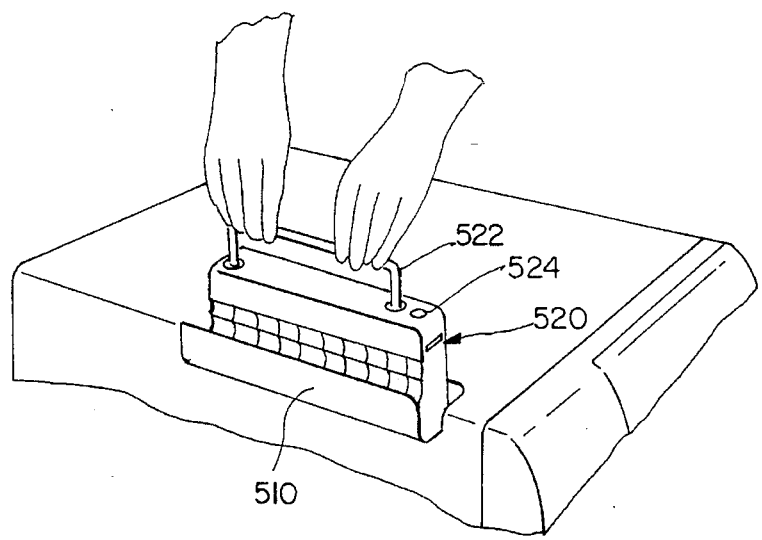
FIG. 14 illustrates insertion of a cartridge according to the present invention through an open access door.

FIG. 14 illustrates the access door 510 in its open position. The individual is illustrated inserting a cartridge 520 according to the present invention. Preferably, the cartridge 520 is provided with a suitable handle 522 to allow the individual to easily grasp the cartridge for insertion and removal from the cabinet 502. Preferably, the handle slides into the cartridge to allow it to be stored compactly.

Figure 15:
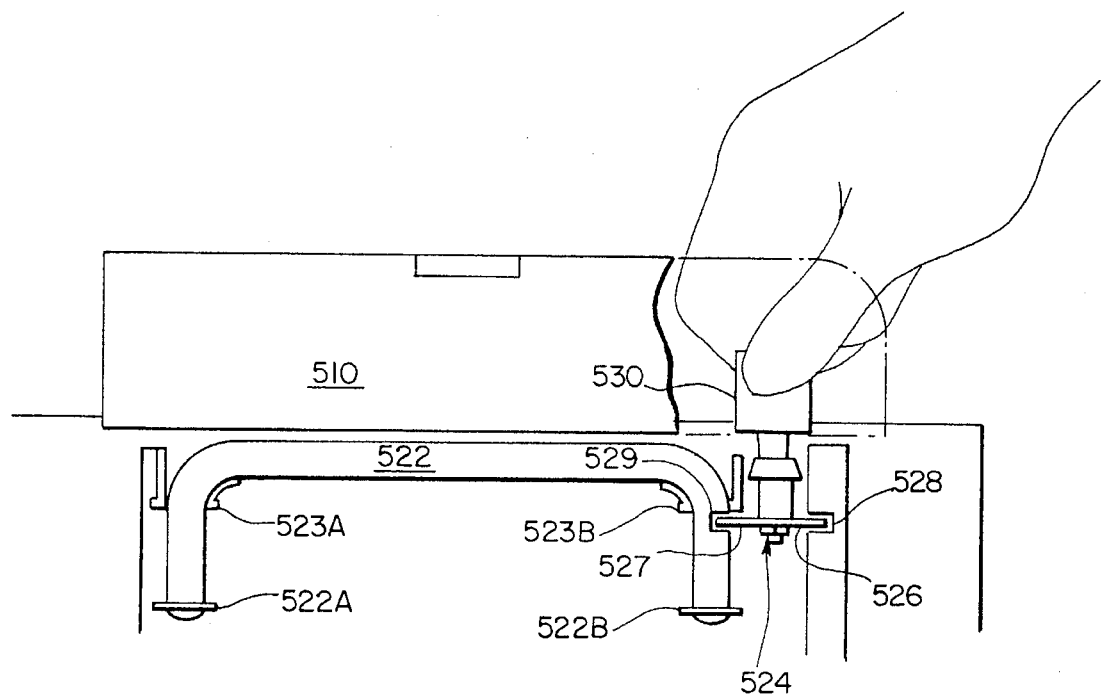
FIG. 15 illustrates a partial cutaway side view showing the manner in which a cartridge may be locked into place in the PC.

Referring to the partial cutaway side view in FIG. 15, the cartridge is preferably provided with a lock mechanism 524 which allows the user to lock the cartridge in place. The individual is shown turning the lock mechanism 524 so that a projection 526 of the lock mechanism is inserted into a slot 528 inside the PC cabinet. When the projection 526 is inserted in slot 528, the cartridge 520 cannot be removed from the cabinet. The user may re-insert the key 530 so as to remove the projection 526 from the slot 528, so that the cartridge 520 may be removed.

A second projection 527 may be provided, substantially opposite to projection 526. When the lock mechanism is in its locked position, projection 527 is inserted into a slot 529 provided in the cartridge's handle, preventing the handle from being pulled out of the cartridge. In the illustrated embodiment, projections 526 and 527 are opposite ends of the same piece, which may be generally oval-shaped when viewed from above. This allows both locking processes (526 to 528, and 527 to 529) to occur simultaneously. However, it is envisioned that only one of the locking processes may be provided, or that two locking processes may be provided separately.

Also illustrated in FIG. 15 are projections 522A, 522B at respective ends of handle 522. These projections are larger than aperture edges 523A, 523B. Handle 522 can thus slide downward, into the interior of the cartridge, when the individual releases it. This makes the handle occupy less space, when not extended by the user during insertion and removal of the cartridge.

Figure 16:
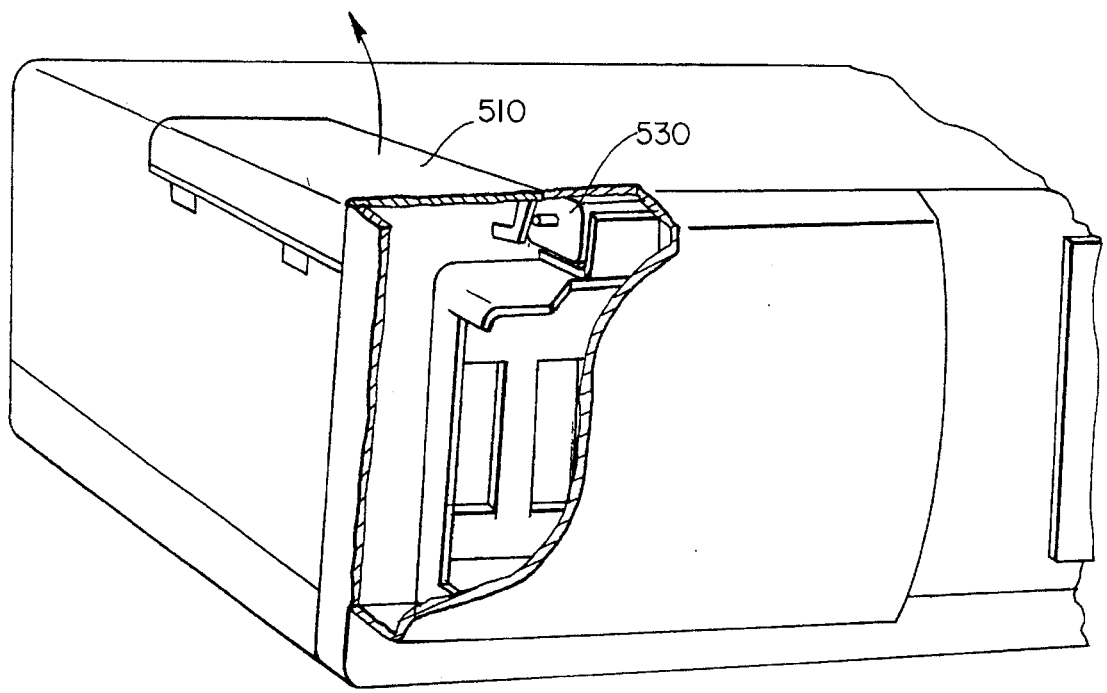
FIG. 16 is a perspective view illustrating the position of a solenoid-controlled interlock when the power is off.

After a cartridge is inserted to the position shown in FIG. 16, the access door 510 is closed, so that the system again appear as in FIGS. 12 and 13.

It is understood that the embodiment shown in FIGS. 12–15 is exemplary, and not limiting. The invention is not limited to personal computers, and is not limited to those which have an access door on the left side of the top face of the cabinet. Although this location provides an advantage of convenience for the user in not having to move his monitor to upgrade his system, other locations for the access door lie within the contemplation of the present invention, such as described below.

However, the illustrated location of the access door allows the cartridge to plug directly into the cache local ("C/L") bus slot on the system board of the EVOLUTION™ personal computer being marketed by ADVANCED LOGIC RESEARCH INC™. By choosing this location, rather than, for example, the front portion of the cabinet top, fewer modifications need to be made to a pre-existing system to receive the cartridge.

More generally, the location at which the cartridge may be inserted into the cabinet may be chosen for any of a variety of reasons known to those skilled in the art, such as convenience to the user, cost-effectiveness, reliability, practicality, and the like.

Advantageously, the invention provides a means of ensuring that, when the computer is powered on, the cartridge may not be inserted or removed. In this case, the cartridge be inserted or removed only when the computer system (or the portion thereof into which the cartridge is to be inserted) is powered off. As will be appreciated by those skilled in the art, this is safety feature helps to prevent damage to delicate electronic components which might otherwise occur if the cartridge were plugged into the system while it is powered on.

FIGS. 16–19 illustrate an interlock mechanism which ensures the cartridge cannot be inserted or removed when power is provided to the system (or at least the portion of the system into which the cartridge is inserted).

Figure 17:
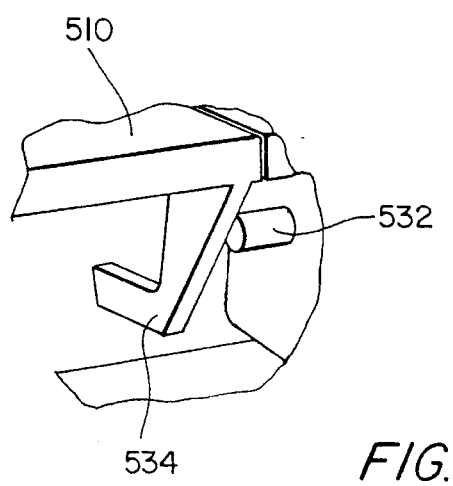
FIG. 17 illustrates a portion of FIG. 16, enlarged to show an important feature thereof.

FIGS. 16 and 17 illustrate a solenoid-controlled interlock mechanism according to a preferred embodiment. A solenoid 530 and a pin 523, driven by the solenoid, are illustrated. A latch arm 534 is provided on the inner surface of the access door 510. When the computer power is turned off, solenoid 530 is de-activated, so that pin 532 is in its retracted position. In this retracted position, the solenoid pin 532 cannot engage the latch arm 534. Thus, when power to the computer is turned off, access door 510 is free to open and close, because pin 532 does not act as a barrier to interfere with the motion of latch arms 534.

Figure 18:
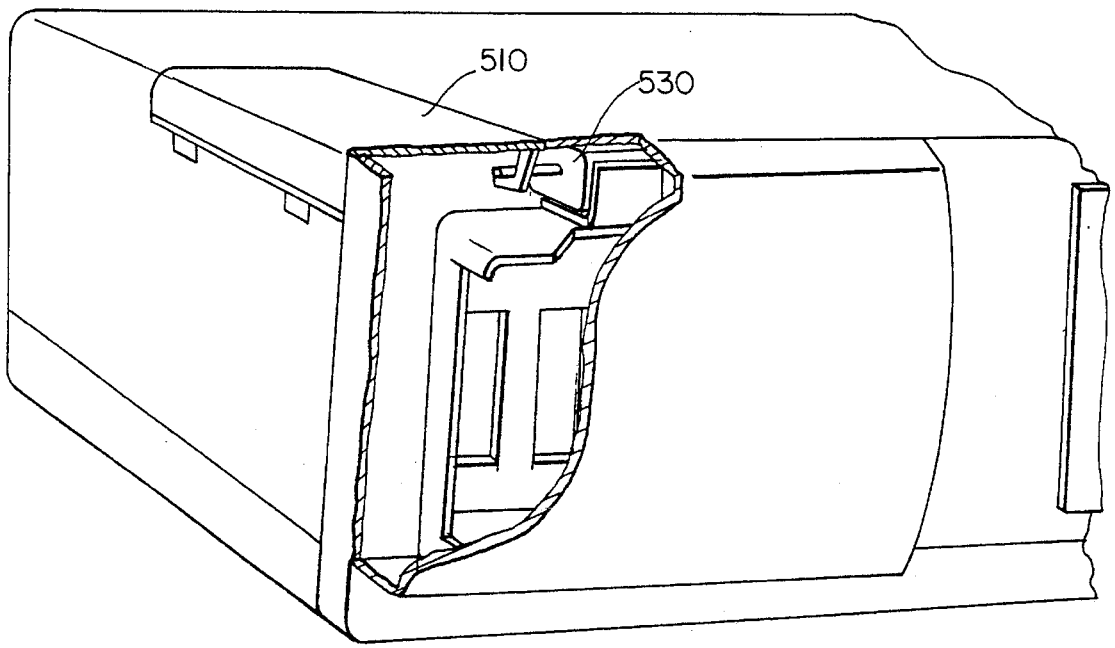
Figure 19:
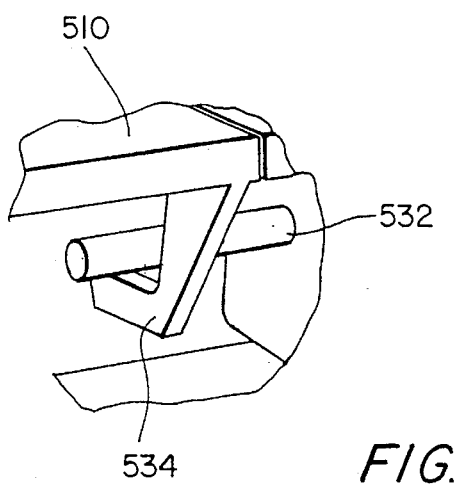
FIG. 19 illustrates a portion of FIG. 18, enlarged to show an important feature thereof.

However, when computer power is on, pin 532 is extended by solenoid 530, as illustrated most clearly in FIGS. 18–19. When pin 532 is extended, it engages latch arm 534 and acts as a barrier, so that access door 510 cannot be opened. By provided power to solenoid 530 whenever the computer (or the power on of the computer into which the cartridge is to be inserted) is turned on, the cartridge cannot be inserted or removed, because access door 510 is effectively locked shut.

The details of the electrical control of the solenoid are omitted, because those skilled in the art are readily able to implement the invention given the present description. For example, it is recognized that a solenoid may be connected between suitable power and ground or other power-related buses, with any suitable current limiting means.

In most conventional personal computers, there is a single switch which provides power to all portions of the computer system. In this first configuration, the solenoid would be directly responsive to the provided power.

However, it is recognized that more complex computer systems may have more than one power switch controlling power to respective portions of the overall computer system. In this second configuration, the solenoid could be made responsive to only those power switches which provided power to portions of the computer system which would be adversely affected by insertion or removal of the cartridge with power on. The first configuration described above may be considered to be merely a special instance of the second configuration.

On another subject, in some situations, the access door may be opened when the power is again turned on. Because of these undesirable situations, it is preferred that the pin 532 be constructed and arranged so that it blocks motion of the cartridge itself, and not merely of the access door. By blocking the motion of the cartridge itself, the cartridge cannot be inserted or removed even if the access door in inadvertently left open when the computer is turned on.

Moreover, assuming the cartridge is inserted, the lock and key arrangement 524/530 provides advantages of safety as well as security, so that the cartridge cannot be stolen by anyone not having the proper key.

Figure 20:
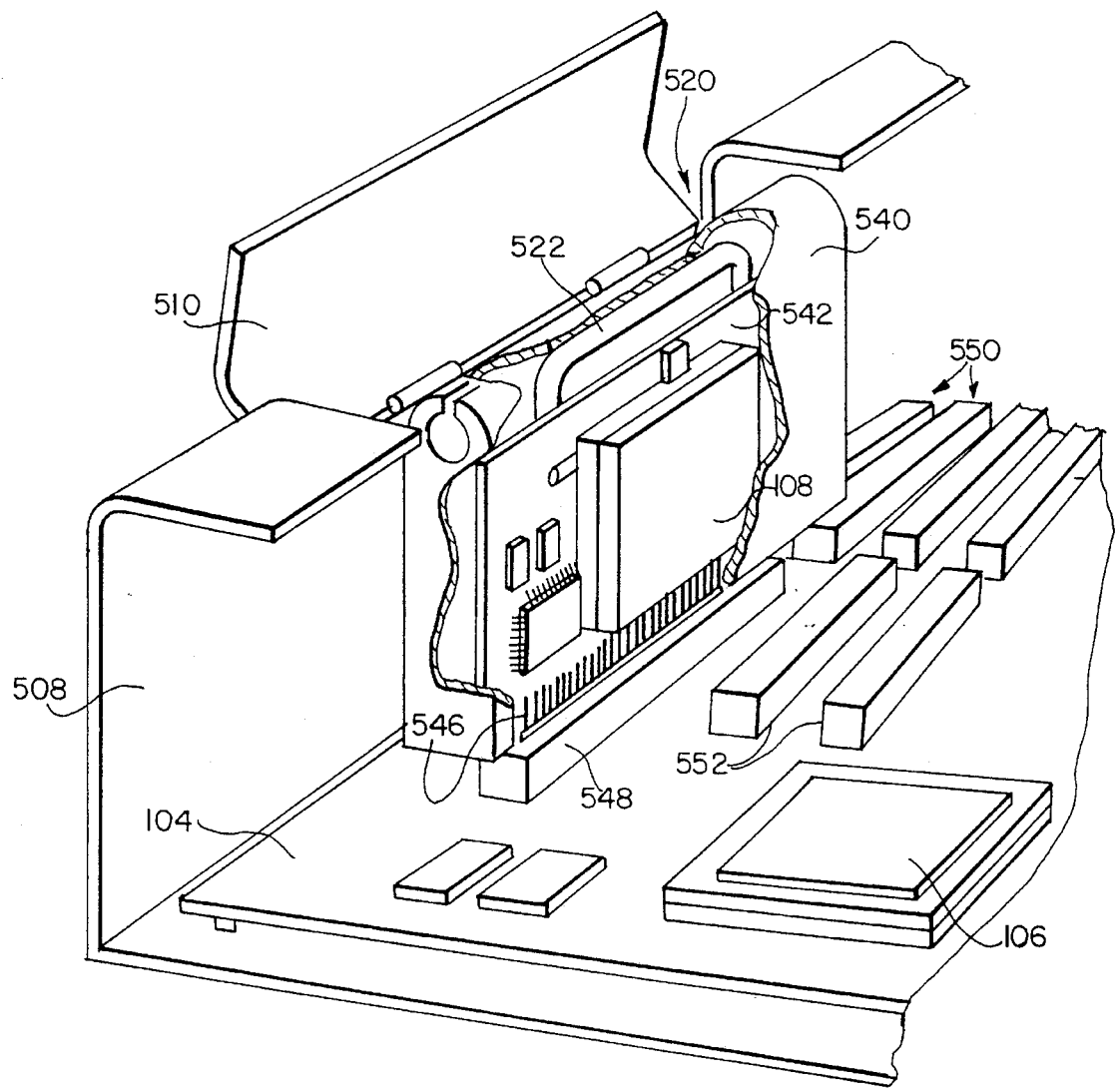
FIG. 20 illustrates in perspective cutaway view, the structure of an exemplary cartridge inserted into the cache local (C/L) bus on the system board of a particular, exemplary personal computer, with various elements removed for purposes of illustration.

Referring now to FIG. 20, a cartridge is illustrated in perspective, partial cutaway view, inserted into a personal computer in a particular preferred embodiment.

The cartridge 520 comprises an exterior cover 540 which surrounds a circuit board 542. The circuit board 542 has an edge connector 546 which locks into the cache local bus slot 548 on the system board 104. An upgrade processor 108, such as an INTEL™ PENTIUM™, is mounted on the circuit board 542. The upgrade processor 108 corresponds to the upgrade processor previously discussed with reference to FIG. 1. That is, upgrade processor 108 may assume functions otherwise performed by the base computer system's processor 106 (which may be, for example, an INTEL™ i486™).

The illustrated cartridge's upgrade processor may advantageously take control of the base computer system whenever it is installed, in substantially the same manner as previously discussed embodiments, It will be appreciated that different particular ways of disabling the processor 106 in the base computer system, based on its pin definitions. Because the emphasis in FIG. 20 is on the physical and electromechanical aspects of the invention, the electronic means by which the upgrade processor takes control of the system is not further discussed here.

Also illustrated on system board 104 are a plurality of ISA/EISA expansion slots 550 and a plurality of VEISA bus slots 552. In the illustrated embodiment, the cache local bus slot is co-linear with the outermost ISA/EISA slot, closest to the left side face of the cabinet. This co-linearity allows a single card, having two edge connectors along its lower edge, to be inserted into the slot, promoting flexibility in usage of system resources and upgrade capability. This flexibility is described in greater detail below.

As briefly discussed above, by choosing the cache local bus 548 as a location for inserting the upgrade circuit board 542, minimal re-arrangement of circuitry on system board 104 is required to design the system with this external upgrade capability when starting with a system not having external upgrade capability. However, the invention should not be limited to the particular location and manner of physical joining that is illustrated in FIG. 20.

To distinguish among possible different cards which may be inserted into the cache local connector 548 (and possibly also into a co-linear ISA/EISA slot), the circuit board 542 according to the preferred embodiment include four mode identification bits. The bits are provided to the respective pins on edge connector 546 and connector 548 on the system board. Binary values of signals on those respective pins are read by the system so as to identify the nature of the module and allow it to adapt to its presence.

For example, in a particular preferred embodiment, four mode ID bits are provided, having values from 0000 through 1111.

In an exemplary embodiment, when the mode identification is 0000, the cartridge is identified as a simple cache memory card occupying only cache local bus slot 548, and not the ISA/EISA slot which is co-linear with slot 548.

When the mode identification is 0001, a so-called "tri-combo" card is identified, having a video controller, cache memory, and network interface. The tri-combo card occupies both the cache local bus slot 548 and a co-linear 10 the ISA/EISA expansion slots.

When the mode identification is 0010, a PENTIUM processor is on the card along with cache memory and network interface, necessitating use of slots 548 and a co-linear slot 550.

When the mode identification is 0011, the so-called "tri-combo G" card is identified, having another type of video controller, cache memory and a network interface.

When the mode identification is 0100, 0101, 0101, 0110, or 0111, an upgrade cartridge according to the present invention is identified. Various embodiments of the module are respectively identified by the different mode identifications, based largely on the type of processor 108 which is on the upgrade cartridge circuit board 542, and on the amount of cache memory which is present on the circuit board.

A mode identification 0100 indicates an INTEL™ i486™ upgrade cartridge without a 32-bit chip set cache. A mode identification 0101 identifies an INTEL™i486™ with the 32-bit chip set cache. A mode identification 0110 identifies an INTEL™PENTIUM™ processor but no 32-bit chip set cache. Finally, a mode identification of 0111 identifies a cartridge circuit board having the INTEL™ PENTIUM™ microprocessor and a 32-bit chip set cache.

A mode identification of 1111 indicates that no module is installed in the system at all. All remaining mode identifications not specifically described above may be used to identify upgrade cartridges having still other components or combinations of components. Of course, it is understood that the foregoing means of identifying the particular cartridge which is installed, is exemplary and not limiting.

The invention's access door, constituting an easily reachable way of upgrading a computer system, has an advantage over the embodiment illustrated in FIG. 1. In the embodiment illustrated in FIG. 1, a user would have to remove most of the personal computer's cabinet 502 to upgrade the system. Normally, this involves removing the monitor from atop the cabinet, removing several screws from the rear portion of the cabinet, and carefully lifting the large cabinet cover from the bottom portion of the computer chassis. When the cabinet cover is removed, all the cables and electronic components are exposed to possible physical and static shock damage which may be inflicted by a user when inserting a module 102 into the "naked" system board in FIG. 1.

However, as will be readily appreciated by those skilled in the art upon a review of FIGS. 12–15, the invention provides additional safety and convenience in allowing the cartridge 520 having contained therein a printed circuit board such as element 102 (FIG. 1) in a configuration which allows upgrade of the processor without removing the cabinet cover.

Those skilled in the art will readily appreciate that the use of the illustrated upgrade cartridges also allows an unskilled user to upgrade a computer system without having to manually open the cabinet and reconfigure the system using internal switches and the like. Rather, the invention provides truly convenient and automatic upgrade capability.

Still further, the invention provides the safety interlock feature to ensure that, even the limited access provided by access door 510 is controlled, when power to the system is turned on. As still another advantage, a single processor, which may be an expensive processor, can be carried from computer to computer, and shared among users of the different computers. This is "shared processor" technology. That is, if a given processor is prohibitively expensive for a company or government agency to purchase for each of its employees, the present invention allows purchase of a single cartridge having the expensive processor. Then, as any particular individual needed to use that expensive processor, that particular individual could use that cartridge by removing it from whichever other person had the cartridge to begin with. In this manner, a company or agency may reduce overall costs while maintaining the ability for a large number of people to share the high-performance processor.

Moreover, the cartridge protects the electronic module (such as element 102 in FIG. 1) from damage. By enclosing the printed circuit card within the cartridge, danger of damage to the electronic components is substantially reduced, because the user never directly touches the printed circuit board within the cartridge.

Figure 21:
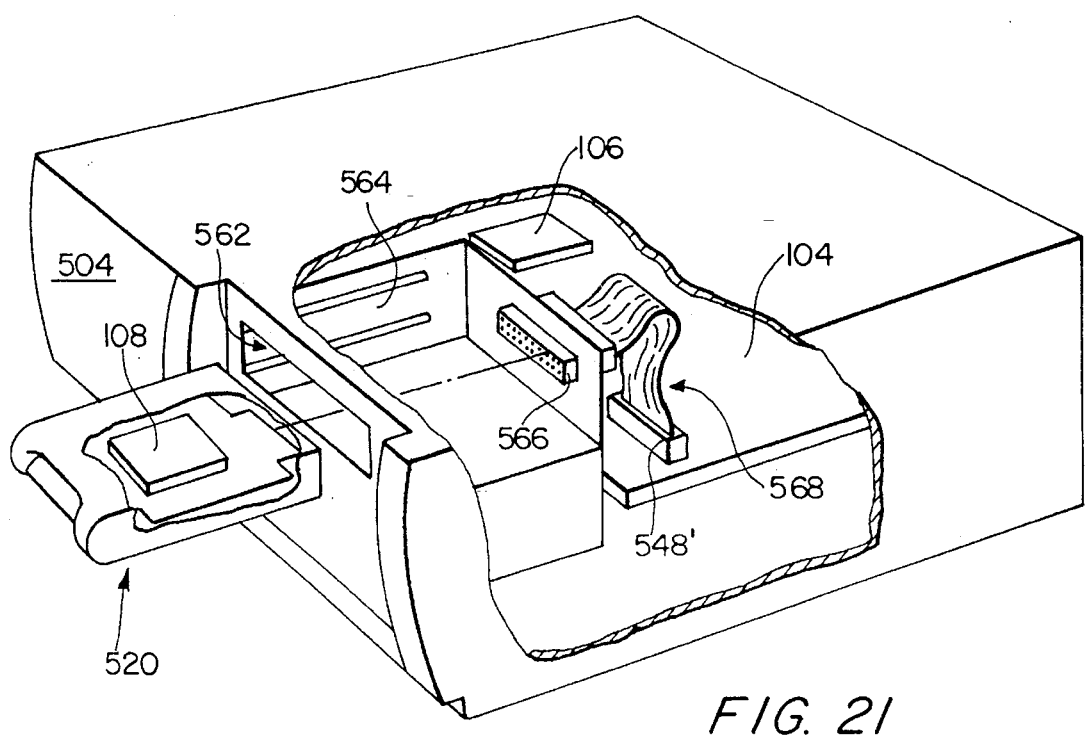
FIG. 21 illustrates another implementation of the present invention, in which a cartridge is inserted into an adaptor in a standard 5.25-inch disk drive bay.
Figure 22:
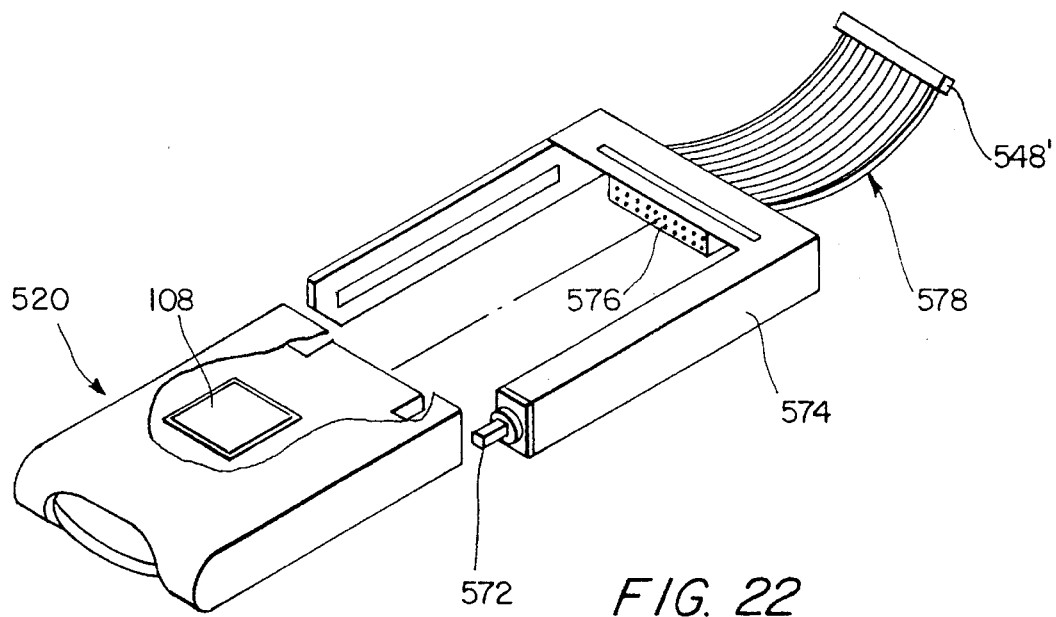
FIG. 22 illustrates the upgrade cartridge, positioned relative to an adaptor, which adaptor may be for the 5.25-inch disk drive bay or a Winchester hard drive location, for example.

An alternative embodiment of the plug-in cartridge is illustrated in FIGS. 21 and 22.

In FIG. 21, a cartridge 520 is shown, poised for insertion into a bay 562 customarily reserved for a 5.25-inch floppy disk drive. To receive the cartridge 520, an adaptor 564 is provided in the disk drive bay. Also, a rear connector 566 is provided for receiving the edge connector on the cartridge.

Extending rearward and downward to system board 104 is a cable 568. Cable 568 provides communication between the cartridge/connector 520/566 and the electronic components on system board 104. A connector 548' is provided on the system board to receive the cable, and may resemble connector 548 (FIG. 20).

The embodiment of FIG. 21 has the advantage that, to insert a cartridge, the user does not even have to move the monitor or any other equipment. He can merely insert a cartridge. The FIG. 21 embodiment may be provided with a suitable access door, with or without a solenoid-controlled safety interlock mechanism as described above.

Referring to FIG. 22, the cartridge 520, adaptor 574, as well as a connector 576 and cable 578, are shown in an exploded view. FIG. 22 illustrates how the cartridge may slip easily into the disk drive bay. A particular embodiment provides that the adaptor 574 be placed in a half-height Winchester disk drive slot, as opposed to the 5.25-inch floppy disk drive slot shown in FIG. 21. Again, the invention should be limited to particular embodiments shown in the drawings.

As a feature which may be used in conjunction with the various embodiments, a key lock 572 is shown in FIG. 22. Key lock 572 may operate in substantially the same manner as the key lock assembly 524/530 (FIG. 15), preventing unauthorized removal of the cartridge 520.

The embodiments of FIGS. 21 and 22 have many of the same advantages as that described with reference to FIGS. 12–20. Moreover, the embodiments of FIGS. 21 and 22 have the additional advantage of even greater convenience for the user. Insertion and removal of a cartridge may be likened to insertion or removal of floppy disks, with which even relatively unskilled users are generally comfortable and familiar.

TABLE I

Concordance For Signals For 80386SX Plug-In

| Connector Pin | Signal Name | Plug-in Module Connection |
|---|---|---|
| 1 | BHE# | GAL ® 206-15 |
| 2 | S0# | GAL ® 206-16 |
| 3 | VCC | VCC |
| 4 | S1# | GAL ® 206-17 |
| 5 | — | — |
| 6 | M/IO# | 80386SX-23 (M/IO-); GAL ® 206-5 |
| 7 | VCC | VCC |
| 8 | — | — |
| 9 | — | — |
| 10 | — | — |
| 11 | VCC | VCC |
| 12 | RESET3 | GAL ® 202-3 |
| 13 | RESET4 | GAL ® 202-4 |
| 14 | — | — |
| 15 | VCC | VCC |
| 16 | — | — |
| 17 | — | — |
| 18 | — | — |
| 19 | VCC | VCC |
| 20 | OUTF0# | GAL ® 202-5 |
| 21 | 387INT | INVERTER 214 (NPINT) |
| 22 | REFREQ | GAL ® 202-7 |
| 23 | VCC | VCC |
| 24 | — | — |
| 25 | — | — |
| 26 | — | — |
| 27 | VCC | VCC |
| 28 | — | — |
| 29 | — | — |
| 30 | — | — |
| 31 | VCC | VCC |
| 32 | — | — |
| 33 | — | — |
| 34 | D0 | (DATA) |
| 35 | VCC | VCC |
| 36 | D1 | (DATA) |
| 37 | D2 | (DATA) |
| 38 | D3 | (DATA) |
| 39 | VCC | VCC |
| 40 | D4 | (DATA) |
| 41 | D5 | (DATA) |
| 42 | D6 | (DATA) |
| 43 | VCC | VCC |
| 44 | D7 | (DATA) |
| 45 | D8 | (DATA) |
| 46 | — | — |
| 47 | — | — |
| 48 | D10 | (DATA) |
| 49 | D11 | (DATA) |
| 50 | D12 | (DATA) |
| 51 | VCC | VCC |
| 52 | D13 | (DATA) |
| 53 | D14 | (DATA) |
| 54 | D15 | (DATA) |
| 55 | VCC | VCC |
| 56 | D9 | (DATA) |
| 57 | — | — |
| 58 | VCC | VCC |
| 59 | GND | GND |
| 60 | A0 | (ADDRESS) |
| 61 | A1 | (ADDRESS) |
| 62 | A2 | (ADDRESS) |
| 63 | GND | GND |
| 64 | A3 | (ADDRESS) |
| 65 | A4 | (ADDRESS) |
| 66 | A5 | (ADDRESS) |
| 67 | GND | GND |
| 68 | A6 | (ADDRESS) |
| 69 | A7 | (ADDRESS) |
| 70 | A8 | (ADDRESS) |
| 71 | GND | GND |
| 72 | A9 | (ADDRESS) |
| 73 | A10 | (ADDRESS) |
| 74 | A11 | (ADDRESS) |
| 75 | GND | GND |
| 76 | A12 | (ADDRESS) |
| 77 | A13 | (ADDRESS) |
| 78 | A14 | (ADDRESS) |
| 79 | GND | GND |
| 80 | A15 | (ADDRESS) |
| 81 | A16 | (ADDRESS) |
| 82 | A17 | (ADDRESS) |
| 83 | GND | GND |
| 84 | A18 | (ADDRESS) |
| 85 | A19 | (ADDRESS) |
| 86 | CPUA20 | 80386SX-A20 (ADDRESS 20) |
| 87 | GND | GND |
| 88 | A21 | (ADDRESS) |
| 89 | A22 | (ADDRESS) |
| 90 | A23 | (ADDRESS) |
| 91 | GND | GND |
| 92 | — | — |
| 93 | INTR | 80386SX-40 (INTR) |
| 94 | NMI | 80386SX-38 (NMI) |
| 95 | GND | GND |
| 96 | — | — |
| 97 | HLDA | 80386SX-3 (HLDA) |
| 98 | HOLD | FLIP-FLOP 231-2 (D IN) |
| 99 | GND | GND |
| 100 | — | — |
| 101 | — | — |
| 102 | READY# | GATE 221-2 (2ND INPUT) |
| 103 | GND | GND |
| 104 | — | — |
| 105 | — | — |
| 106 | CLK2OUT | 32 MHz XTAL OSC 209 (through RESISTOR) |
| 107 | GND | GND |
| 108 | — | — |
| 109 | PROCCLK | INVERTERS 211, 212 INPUTS |
| 110 | — | — |
| 111 | GND | — |
| 112 | ENCLK32MB# | JUMPER 241-1 (to GND) |
| 113 | ENCLK25MB# | JUMPER 242-1 (to GND) |
| 114 | SXINST# | GND |
| 115 | GND | GND |
| 116 | — | — |

TABLE II

80386SX Pin Connections

| 80386SX Pin : Label | Signal | Source/Dest |
|---|---|---|
| 1 : D0 | D0 | (DATA) |
| 2 : GND | GND | GND |
| 3 : HLDA | HLDA | CONNECTOR PIN 97 |
| 4 : HOLD | HOLD386 | GAL ® 202-20 |
| 5 : GND | GND | GND |
| 6 : NA- | NA# | GAL ® 206-13 |
| 7 : READY- | SXREADY# | GATE 221-3 (OUTPUT) |
| 8 : VCC | VCC | VCC |
| 9 : VCC | VCC | VCC |
| 10 : VCC | VCC | VCC |
| 11 : GND | GND | GND |
| 12 : GND | GND | GND |

TABLE II-continued

80386SX Pin Connections

| 80386SX Pin : Label | Signal | Source/Dest |
|---|---|---|
| 13 : GND | GND | GND |
| 14 : GND | GND | GND |
| 15 : CLK2 | 386CLK2 | INVERTER 211 OUTPUT |
| 16 : ADS- | ADS# | PULLED UP; 80386SX-47 (ADS-); GAL ® 206-3 |
| 17 : A0 | A0 | (ADDRESS) |
| 18 : A1 | A1 | (ADDRESS) |
| 19 : BHE- | 386BHE# | PULLED; GAL ® 206-9 |
| 21 : VCC | VCC | VCC |
| 22 : GND | GND | GND |
| 23 : M/IO- | SXH/IO# | PULLED UP; GAL ® 206-5; GAL ® 202-14; 80387SX-44 (NPS1-) |
| 24 : D/C- | D/C# | PULLED UP; GAL ® 206-6 |
| 25 : W/R- | W/R# | PULLED UP; GAL ® 206-8; 80387SX-41 (W/R-) |
| 26 : LOCK- | — | — |
| 32 : VCC | VCC | VCC |
| 33 : RESET | RESET386 | GAL ® 202-19 |
| 34 : BUSY- | BUSY386# | GAL ® 202-15 |
| 35 : GND | GND | GND |
| 36 : ERROR- | — | VCC (THRU RESISTOR) |
| 37 : PEREQ | PEREQ386 | GAL ® 202-16 |
| 38 : NMI | NMI | CONNECTOR PIN 94 |
| 39 : VCC | VCC | VCC |
| 40 : INTR | INTR | CONNECTOR PIN 93 |
| 41 : GND | GND | GND |
| 42 : VCC | VCC | VCC |
| 48 : VCC | VCC | VCC |
| 49 : GND | GND | GND |
| 50 : GND | GND | GND |
| 51 : A2 | A2 | (ADDRESS) |
| 52 : A3 | A3 | (ADDRESS) |
| 53 : A4 | A4 | (ADDRESS) |
| 54 : A5 | A5 | (ADDRESS) |
| 55 : A6 | A6 | (ADDRESS) |
| 56 : A7 | A7 | (ADDRESS) |
| 57 : VCC | VCC | VCC |
| 58 : A8 | A8 | (ADDRESS) |
| 59 : A9 | A9 | (ADDRESS) |
| 60 : A10 | A10 | (ADDRESS) |
| 61 : A11 | A11 | (ADDRESS) |
| 62 : A12 | A12 | (ADDRESS) |
| 63 : GND | GND | GND |
| 64 : A13 | A13 | (ADDRESS) |
| 65 : A14 | A14 | (ADDRESS) |
| 66 : A15 | A15 | (ADDRESS) |
| 67 : GND | GND | GND |
| 68 : GND | GND | GND |
| 69 : VCC | VCC | VCC |
| 70 : A16 | A16 | (ADDRESS) |
| 71 : VCC | VCC | VCC |
| 72 : A17 | A17 | (ADDRESS) |
| 73 : A18 | A18 | (ADDRESS) |
| 74 : A19 | A19 | (ADDRESS) |
| 75 : A20 | CPUA20 | (ADDRESS BIT 20) |
| 76 : A21 | A21 | (ADDRESS) |
| 77 : GND | GND | GND |
| 78 : GND | GND | GND |
| 79 : A22 | A22 | (ADDRESS) |
| 80 : A23 | A23 | (ADDRESS) |
| 81 : D15 | D15 | (DATA) |
| 82 : D14 | D14 | (DATA) |
| 83 : D13 | D13 | (DATA) |
| 84 : VCC | VCC | VCC |
| 85 : GND | GND | GND |
| 86 : D12 | D12 | (DATA) |
| 87 : D11 | D11 | (DATA) |
| 88 : D10 | D10 | (DATA) |
| 89 : D9 | D9 | (DATA) |
| 90 : D8 | D8 | (DATA) |
| 91 : VCC | VCC | VCC |
| 92 : D7 | D7 | (DATA) |
| 93 : D6 | D6 | (DATA) |
| 94 : D5 | D5 | (DATA) |
| 95 : D4 | D4 | (DATA) |
| 96 : D3 | D3 | (DATA) |
| 97 : VCC | VCC | VCC |
| 98 : GND | GND | GND |
| 99 : D2 | D2 | (DATA) |
| 100 : D1 | D1 | (DATA) |

TABLE III

80387SX Pin Connections

| 80387SX Pin : Label | Signal | Source/Dest |
|---|---|---|
| 2 : D7 | D7 | (DATA) |
| 3 : D6 | D6 | (DATA) |
| 4 : VCC | VCC | VCC |
| 5 : GND | — | GND |
| 6 : D5 | D5 | (DATA) |
| 7 : D4 | D4 | (DATA) |
| 8 : D3 | D3 | (DATA) |
| 9 : VCC | VCC | VCC |
| 11 : D15 | D15 | (DATA) |
| 12 : D14 | D14 | (DATA) |
| 13 : VCC | VCC | VCC |
| 14 : GND | GND | GND |
| 15 : D13 | D13 | (DATA) |
| 16 : D12 | D12 | (DATA) |
| 19 : D0 | D0 | (DATA) |
| 20 : D1 | D1 | (DATA) |
| 21 : GND | GND | GND |
| 22 : VCC | VCC | VCC |
| 23 : D2 | D2 | (DATA) |
| 24 : D8 | D8 | (DATA) |
| 25 : GND | GND | GND |
| 26 : VCC | VCC | VCC |
| 27 : GND | GND | GND |
| 28 : D9 | D9 | (DATA) |
| 29 : D10 | D10 | (DATA) |
| 30 : D11 | D11 | (DATA) |
| 31 : VCC | VCC | VCC |
| 32 : GND | GND | GND |
| 33 : VCC | VCC | VCC |
| 34 : GND | GND | GND |
| 35 : ERROR- | 387ERROR# | PULLED UP; GAL ® 202-9; GATE 223-4 (FIRST INPUT); GATE 213-5 (INPUT) |
| 36 : BUSY- | 387BUSY# | PULLED UP; GAL ® 202-6; FLIP-FLOP 232-12 (D INPUT) |
| 37 : VCC | VCC | VCC |
| 38 : GND | GND | GND |
| 39 : TIE HIGH | VCC | VCC |
| 40 : STEN | — | PULLED HIGH |
| 41 : W/R | W/R# | 80386SX-25 (W/R-) |
| 42 : GND | GND | GND |
| 43 : VCC | VCC | VCC |
| 44 : NPS1- | SXM/IO# | 80386SX-23 (M/IO-) |
| 45 : NPS2 | A23 | ADDRESS BIT 23 |
| 46 : VCC | VCC | VCC |
| 47 : ADS- | ADS# | 80386SX-16 (ADS-) |
| 48 : CMD- | A2 | ADDRESS BIT 2 |
| 49 : READY- | SXREADY# | GATE 221-3 (OUTPUT) |
| 50 : TIE HIGH | VCC | VCC |
| 51 : RESET | RESET387 | GAL ® 202-17 |
| 53 : 387CLK2 | — | — |
| 54 : 386CLK2 | 387CLK2 | INVERTER 212-4 (OUTPUT) |
| 55 : GND | GND | GND |

TABLE III-continued

80387SX Pin Connections

| 80387SX Pin : Label | Signal | Source/Dest |
|---|---|---|
| 56 : PEREQ | 387PEREQ | TO GND THRU 1K RESISTOR; GAL ® 202-8 |
| 57 : READY0- | 387RDY# | PULLED UP; GATE 222-13 (2ND INPUT) |
| 58 : VCC | VCC | VCC |
| 59 : CKM | — | PULLED HIGH |
| 60 : GND | GND | GND |
| 61 : GND | GND | GND |
| 62 : VCC | VCC | VCC |
| 63 : GND | GND | GND |
| 64 : VCC | VCC | VCC |
| 66 : GND | NPRES# | PULLED UP; GAL ® 202-11 |

TABLE IV

Concordance for Signals for 80486 Plug-In Module

| Connector Pin | Signal Name | Plug-in Module Connection |
|---|---|---|
| 1 | BHE# | GAL ® 408-22 |
| 2 | S0# | GAL ® 402-17 |
| 3 | VCC | VCC |
| 4 | S1# | GAL ® 402-21 |
| 5 | — | — |
| 6 | M/IO# | GAL ® 408-15 |
| 7 | VCC | VCC |
| 8 | — | — |
| 9 | — | — |
| 10 | — | — |
| 11 | VCC | VCC |
| 12 | RESET3 | GAL ® 412-6 |
| 13 | RESET4 | GAL ® 412-7 |
| 14 | A20GATE | GAL ® 411-6 |
| 15 | VCC | VCC |
| 16 | — | — |
| 17 | — | — |
| 18 | — | — |
| 19 | VCC | VCC |
| 20 | OUTF0# | Gate 461-2 |
| 21 | 387INT (NPINT) | Gate 462-6 |
| 22 | — | — |
| 23 | VCC | VCC |
| 24 | — | — |
| 25 | — | — |
| 26 | — | — |
| 27 | VCC | VCC |
| 28 | AEN1# | — |
| 29 | AEN2# | — |
| 30 | SLOW# | GAL ® 411-14 |
| 31 | VCC | VCC |
| 32 | BMASTER | — |
| 33 | — | — |
| 34 | D0 | Buffer 405-11; GAL ® 418-20; GAL ® 410-18 |
| 35 | VCC | VCC |
| 36 | D1 | Buffer 405-12; GAL ® 418-19; GAL ® 410-17 |
| 37 | D2 | Buffer 405-13; GAL ® 418-18; GAL ® 410-16 |
| 38 | D3 | Buffer 405-15; GAL ® 418-17; GAL ® 410-15 |
| 39 | VCC | VCC |
| 40 | D4 | Buffer 405-16; GAL ® 418-16; GAL ® 410-14 |
| 41 | D5 | Buffer 405-17; GAL ® 418-15; GAL ® 2410-13 |
| 42 | D6 | Buffer 405-18; GAL ® 418-14; GAL ® 410-12 |
| 43 | VCC | VCC |
| 44 | D7 | Buffer 405-19; GAL ® 418-13; GAL ® 410-11 |
| 45 | D8 | Buffer 415-11; GAL ® 414-20; GAL ® 404-18 |
| 46 | — | — |
| 47 | — | — |
| 48 | D10 | Buffer 415-13; GAL ® 414-18; GAL ® 404-16 |
| 49 | D11 | Buffer 415-15; GAL ® 414-17; GAL ® 404-15 |
| 50 | D12 | Buffer 415-16; GAL ® 414-16; GAL ® 404-14 |
| 51 | VCC | VCC |
| 52 | D13 | Buffer 415-17; GAL ® 414-15; GAL ® 404-13 |
| 53 | D14 | Buffer 415-18; GAL ® 414-14; GAL ® 404-12 |
| 54 | D15 | Buffer 415-19; GAL ® 414-13; GAL ® 404-11 |
| 55 | VCC | VCC |
| 56 | D9 | Buffer 415-12; GAL ® 414-19; GAL ® 404-17 |
| 57 | — | — |
| 58 | VCC | VCC |
| 59 | GND | GND |
| 60 | A0 | GAL ® 408-21 |
| 61 | A1 | Inverter 495-11; GAL ® 408-20; ROMs 405 & 415-10 |
| 62 | A2 | Gate 481-2; 80486-131; ROMs 405-9 & 415-9 |
| 63 | GND | GND |
| 64 | A3 | Gate 481-3; 80486-149; ROMs 405 & 415-8 |
| 65 | A4 | Gate 481-12; 80486-167; ROMs 405 & 415-7 |
| 66 | A5 | Inverter 495-13; 80486-129; ROMs 405 & 415-6 |
| 67 | GND | GND |
| 68 | A6 | Gate 482-4; 80486-166; ROMs 405 & 415-5 |
| 69 | A7 | Gate 482-8; 80486-130; ROMs 405-4; 415-4 |
| 70 | A8 | Gate 482-9; 80486-147; ROMs 405 & 415-3 |
| 71 | GND | GND |
| 72 | A9 | Gate 482-10; 80486-128 ROMs 405 & 415-25 |
| 73 | A10 | 80486-164; ROMs 405 & 415-24 |
| 74 | A11 | 80486-146; ROMs 405-23 & 415-21 |
| 75 | GND | GND |
| 76 | A12 | 80486-158; ROMs 405-2 & 415-23 |
| 77 | A13 | 80486-127; ROMs 405 & 415-2 |
| 78 | A14 | 80486-156; |

TABLE IV-continued

Concordance for Signals for 80486 Plug-In Module

| Connector Pin | Signal Name | Plug-in Module Connection |
|---|---|---|
| | | ROMs 405-27 & 415-26 |
| 79 | GND | GND |
| 80 | A15 | 80486-141 |
| | | ROMs 405-27 & 415-27 |
| 81 | A16 | 80486-126 |
| 82 | A17 | 80486-120; GAL ® 413-9 |
| 83 | GND | GND |
| 84 | A18 | 80486-139; GAL ® 413-8 |
| 85 | A19 | 80486-121; GAL ® 413-7 |
| 86 | CPUA20 | 80486-125 |
| 87 | GND | GND |
| 88 | A21 | 80486-122; GAL ® 413-5 |
| 89 | A22 | 80486-124; GAL ® 413-4 |
| 90 | A23 | 80486-154; GAL ® 413-3 |
| 91 | GND | GND |
| 92 | A20 | GAL ® 413-6 |
| 93 | INTR | 80486-16 |
| 94 | NMI | 80486-32 |
| 95 | GND | GND |
| 96 | — | — |
| 97 | NHLDA | GAL ® 412-17 |
| 98 | HOLD | Inverter 493-5 |
| 99 | GND | GND |
| 100 | XMEMW# | GAL ® 412-5 |
| 101 | SW2 | GAL ® 412-2; GAL ® 413-23 |
| 102 | READY# | GAL ® 408-19; (& GAL ® 402-14) |
| 103 | GND | GND |
| 104 | — | — |
| 105 | — | — |
| 106 | CLK20UT | 25 MHZ XTAL 419-3 (through 12-ohm R) |
| 107 | GND | GND |
| 108 | — | — |
| 109 | PROCCLK | Gate 464-12; Inverter 492-3; through R-C to GND |
| 110 | — | — |
| 111 | GND | GND |
| 112 | ENCLK32MB# | GND |
| 113 | GND | GND |
| 114 | INST# | GND |
| 115 | GND | GND |
| 116 | — | — |

TABLE V

80486 Pin Connections

| 80486 Pin:Label | Signal Name | Source/Destination |
|---|---|---|
| 112:D0 | LD0 | (Local Data) |
| 107:D1 | LD1 | (Local Data) |
| 106:D2 | LD2 | (Local Data) |
| 77:D3 | LD3 | (Local Data) |
| 102:D4 | LD4 | (Local Data) |
| 83:D5 | LD5 | (Local Data) |
| 95:D6 | LD6 | (Local Data) |
| 96:D7 | LD7 | (Local Data) |
| 65:D8 | LD8 | (Local Data) |
| 52:D9 | LD9 | (Local Data) |
| 60:D10 | LD10 | (Local Data) |
| 35:D11 | LD11 | (Local Data) |
| 72:D12 | LD12 | (Local Data) |
| 53:D13 | LD13 | (Local Data) |
| 90:D14 | LD14 | (Local Data) |
| 66:D15 | LD15 | (Local Data) |
| 84:D16 | LD16 | (Local Data) |
| 54:D17 | LD17 | (Local Data) |
| 36:D18 | LD18 | (Local Data) |
| 18:D19 | LD19 | (Local Data) |

TABLE V-continued

80486 Pin Connections

| 80486 Pin:Label | Signal Name | Source/Destination |
|---|---|---|
| 1:D20 | LD20 | (Local Data) |
| 19:D21 | LD21 | (Local Data) |
| 2:D22 | LD22 | (Local Data) |
| 4:D23 | LD23 | (Local Data) |
| 6:D24 | LD24 | (Local Data) |
| 23:D25 | LD25 | (Local Data) |
| 41:D26 | LD26 | (Local Data) |
| 40:D27 | LD27 | (Local Data) |
| 42:D28 | LD28 | (Local Data) |
| 8:D29 | LD29 | (Local Data) |
| 43:D30 | LD30 | (Local Data) |
| 25:D31 | LD31 | (Local Data) |
| 108:DP0 | DP0 | SIP 456-10; (to VCC) |
| 64:DP1 | DP1 | SIP 457-10; (to VCC) |
| 78:DP2 | DP2 | SIP 454-10; (to VCC) |
| 5:DP3 | DP3 | SIP 455-10; (to VCC) |
| 37:CLK | CLKA | Gate 464-11 |
| 68:RDY# | RDY# | GAL ® 402-18 |
| 79:BRDY# | BRDY# | GAL ® 402-15 |
| 50:RESET | RESCPU | GAL ® 412-22 |
| 16:INTR | INTR | Connector 422-93 |
| 32:NMI | NMI | Connector 422-94 |
| 61:HOLD | HOLD486 | GAL ® 412-19 |
| 57:BOFF# | BOFF# | SIP 452-5 (to VCC) |
| 17:AHOLD | AHOLD | To GND through 33-ohm R |
| 34:EADS# | EADS# | SIP 452-6 (to VCC) |
| 67:KEN# | KEN# | GAL ® 413-22; SIP 452-7 (to VCC) |
| 49:FLUSH# | FLUSH# | GAL ® 412-20; SIP 452-8 (to VCC) |
| 15:IGNNE# | IGNNE# | FLIP-FLOP 471-6 (Q-); SIP 452-9 (to VCC) |
| 51:BS16# | BS16# | SIP 452-2 (to VCC) |
| 56:BS8# | BS8# | SIP 452-10 (to VCC) |
| 55:A20M# | A20GATE | GAL ® 411-17 |
| 131:A2 | A2 | (Address) |
| 149:A3 | A3 | (Address) |
| 167:A4 | A4 | (Address) |
| 129:A5 | A5 | (Address) |
| 166:A6 | A6 | (Address) |
| 130:A7 | A7 | (Address) |
| 147:A8 | A8 | (Address) |
| 128:A9 | A9 | (Address) |
| 164:A10 | A10 | (Address) |
| 146:A11 | A11 | (Address) |
| 158:A12 | A12 | (Address) |
| 127:A13 | A13 | (Address) |
| 156:A14 | A14 | (Address) |
| 141:A15 | A15 | (Address) |
| 126:A16 | A16 | (Address) |
| 120:A17 | A17 | (Address) |
| 139:A18 | A18 | (Address) |
| 121:A19 | A19 | (Address) |
| 125:A20 | CPUA20 | (Address) |
| 122:A21 | A21 | (Address) |
| 124:A22 | A22 | (Address) |
| 154:A23 | A23 | (Address) |
| 123:A24 | A24 | (Address) |
| 136:A25 | A25 | (Address) |
| 153:A26 | A26 | (Address) |
| 152:A27 | A27 | (Address) |
| 135:A28 | A28 | (Address) |
| 113:A29 | A29 | (Address) |
| 114:A30 | A30 | (Address) |
| 118:A31 | A31 | (Address) |
| 91:BE0# | BE0# | GAL ® 402-6; GAL ® 408-1 |
| 86:BE1# | BE1# | GAL ® 402-13; GAL ® 408-2 |
| 85:BE2# | BE2# | GAL ® 402-7; GAL ® 408-2 |
| 69:BE3# | BE3# | GAL ® 408-4 |
| 134:PCHK# | — | — |
| 110:M/IO# | LM/IO# | GAL ® 402-3; GAL ® 408-7; GAL ® 413-2; GAL ® 412-10; GAL ® 411-3 |
| 103:D/C# | LD/C# | GAL ® 402-5; GAL ® 408-8 |

TABLE V-continued

80486 Pin Connections

| 80486 Pin:Label | Signal Name | Source/Destination |
|---|---|---|
| 111:W/R# | LW/R# | GAL ® 402-4; GAL ® 408-5; GAL ® 412-4; GAL ® 411-4 |
| 109:LOCK# | — | — |
| 133:PLOCK# | — | — |
| 168:ADS# | LADS# | GAL ® 402-2 |
| 150:BLAST# | BLAST# | GAL ® 402-8 |
| 132:BREQ | — | — |
| 115:HLDA | HLDA | GAL ® 408-6; GAL ® 413-10; GAL ® 412-14 |
| 97:PWT | — | — |
| 87:PCD | PCD | — |
| 48:FERR# | FERR# | Gate 462-4 |
| 24:VCC | VCC | VCC |
| 26:VCC | VCC | VCC |
| 28:VCC | VCC | VCC |
| 38:VCC | VCC | VCC |
| 39:VCC | VCC | VCC |
| 59:VCC | VCC | VCC |
| 62:VCC | VCC | VCC |
| 71:VCC | VCC | VCC |
| 74:VCC | VCC | VCC |
| 80:VCC | VCC | VCC |
| 82:VCC | VCC | VCC |
| 89:VCC | VCC | VCC |
| 92:VCC | VCC | VCC |
| 98:VCC | VCC | VCC |
| 101:VCC | VCC | VCC |
| 104:VCC | VCC | VCC |
| 116:VCC | VCC | VCC |
| 137:VCC | VCC | VCC |
| 140:VCC | VCC | VCC |
| 142:VCC | VCC | VCC |
| 143:VCC | VCC | VCC |
| 144:VCC | VCC | VCC |
| 145:VCC | VCC | VCC |
| 148:VCC | VCC | VCC |
| 7:GND | GND | GND |
| 9:GND | GND | GND |
| 11:GND | GND | GND |
| 20:GND | GND | GND |
| 21:GND | GND | GND |
| 22:GND | GND | GND |
| 58:GND | GND | GND |
| 63:GND | GND | GND |
| 70:GND | GND | GND |
| 75:GND | GND | GND |
| 76:GND | GND | GND |
| 81:GND | GND | GND |
| 88:GND | GND | GND |
| 93:GND | GND | GND |
| 94:GND | GND | GND |
| 99:GND | GND | GND |
| 100:GND | GND | GND |
| 105:GND | GND | GND |
| 117:GND | GND | GND |
| 119:GND | GND | GND |
| 138:GND | GND | GND |
| 157:GND | GND | GND |
| 159:GND | GND | GND |
| 160:GND | GND | GND |
| 161:GND | GND | GND |
| 162:GND | GND | GND |
| 163:GND | GND | GND |
| 165:GND | GND | GND |

APPENDIX A

GAL(R) Equations for First GAL(R) 206 (Figure A2)

```
                        Name
Partno      xxxxxx ;
Location    U1     ;
Revision    A      ;
Assembly    xxxxxx ;
Device      g16v8  ;
FORMAT      j      ;
Date        06/23/89;
Designer    N. HACK ;
Company     ALR    ;

/** Inputs **/
pin [1..9,11]  = [clk,reset,!ads,!ready,mio,dc,sclk,wr,!bhe,!oe];
pin 12         = !g ;
/** Outputs **/
pin [19..16]   = [!pipecyc,!buscyc,!mods1,!mods0];
pin [15..13]   = [!modbhe,!hltrdy,!na];

$define idle       'b'00
$define active     'b'10
$define pipelined  'b'11
$define notall     'b'01 memr = mio & !wr        ;
memw = mio &  wr        ; /* memory write or halt */
halt = mio &  wr & !dc  ;
ior  = !mio & !wr       ;
iow  = !mio &  wr       ;
inta = !mio & !wr & !dc ;
```

```
field busstate = ![buscyc,pipecyc] ;

sequence busstate {
present idle
   if    g & ads & sclk & !reset              next active    ;
   default                                    next idle      ;

present active
   if         reset                           next idle      ;
   if    !ads & sclk & !reset & ready         next idle      ;
   if    g & ads & sclk & !reset & !ready     next pipelined ;
   default                                    next active    ;

present pipelined
   if    ready & sclk & !reset                next active    ;
   if    reset                                next idle      ;
   default                                    next pipelined ;

present notall                                next idle      ;
} mods0.d = memw & busstate:idle       & ads & sclk           & !reset & g
        # memw & busstate:active     & ads & sclk & ready   & !reset & g
        # memw & busstate:pipelined        & sclk & ready   & !reset & g
        # halt & busstate:idle       & ads & sclk           & !reset & g
        # halt & busstate:active     & ads & sclk & ready   & !reset & g
        # halt & busstate:pipelined        & sclk & ready   & !reset & g
        # inta & busstate:idle       & ads & sclk           & !reset & g
        # inta & busstate:active     & ads & sclk & ready   & !reset & g
        # inta & busstate:pipelined        & sclk & ready   & !reset & g
        # iow  & busstate:idle       & ads & sclk           & !reset & g
        # iow  & busstate:active     & ads & sclk & ready   & !reset & g
        # iow  & busstate:pipelined        & sclk & ready   & !reset & g
        # mods0 & !sclk & !reset;
```

```
mods1.d  = memr & busstate:idle      & ads & sclk           & !reset & g
         # memr & busstate:active    & ads & sclk & ready & !reset & g
         # memr & busstate:pipelined       & sclk & ready & !reset & g
         # halt & busstate:idle      & ads & sclk           & !reset & g
         # halt & busstate:active    & ads & sclk & ready & !reset & g
         # halt & busstate:pipelined       & sclk & ready & !reset & g
         # inta & busstate:idle      & ads & sclk           & !reset & g
         # inta & busstate:active    & ads & sclk & ready & !reset & g
         # inta & busstate:pipelined       & sclk & ready & !reset & g
         # ior  & busstate:idle      & ads & sclk           & !reset & g
         # ior  & busstate:active    & ads & sclk & ready & !reset & g
         # ior  & busstate:pipelined       & sclk & ready & !reset & g
         # mods1 & !sclk & !reset ;

na.d     = busstate:[idle,active] & ads & sclk & !reset  & g
         # na & !sclk & !reset ;

hltrdy.d = mods1 & mods0 & mio & wr & !dc & sclk & !reset
         # hltrdy & !sclk & !reset ;

modbhe.d = bhe & busstate:idle      & ads & sclk           & !reset
         # bhe & busstate:active    & ads & sclk & ready & !reset
         # bhe & busstate:pipelined       & sclk & ready & !reset
         # modbhe & !ready & !reset
         # modbhe & !sclk  & !reset ;
```

APPENDIX B

GAL(R) Equations for Second GAL(R) 202 (Figure A2)

```
module MU81SX
FLAG '-R2'
title '387sx
Engineer : DT
Date     : 5/5/89
LOCATION : U81'

PU81SX              device 'P20V8R';

" inputs

CLK          PIN    1;     " 32 MHZ CLOCK
        CHOLD        PIN    2;
        RESET3       PIN    3;
        RESET4       PIN    4;
        OUTF0_       PIN    5;     "
        N9BUSY_      PIN    6;     "
        REFREQ       PIN    7;     "
        N9PEREQ      PIN    8;     "
        N9ERROR_     PIN    9;     "
        ERRLTCH      PIN    10;
        NPPRES_      PIN    11;
        NMIO         PIN    14;
        A23          PIN    23;
```

" OUTPUTS

```
        NBUSY_       PIN    15;
        PEREQ        PIN    16;
        NPRESET      PIN    17;
        SCLK         PIN    18;
        NRESET3      PIN    19;
        NHOLD        PIN    20;
        RSTERR_      PIN    21;
        G_           PIN    22;
```

EQUATIONS

```
    SCLK    := !SCLK;
    NRESET3 := !SCLK & RESET3
             # !SCLK & RESET4
             #  SCLK & NRESET3;
    NPRESET := !SCLK & RESET4
             #  SCLK & NPRESET;
    NBUSY_   = N9BUSY_
             # !ERRLTCH
             # NPPRES_ & REFREQ;
    NHOLD   := !SCLK & CHOLD
             #  SCLK & NHOLD;
    !RSTERR_ = RESET4
             # !OUTFO_;
    PEREQ    = N9PEREQ
             # N9BUSY_ & !ERRLTCH;
    !G_      = NPPRES_ # NMIO # !A23;
```

END MU81SX

```
/*****************************************************************/
/*                        APPENDIX C                              */
/*              GAL Equations for GAL  402                        */
/*                       (figure C3)                              */
/*****************************************************************/
Name            u2e     ;
Partno          XXXXXX;
Revision        01      ;
Date            7/23/89;
Designer        n.h.    ;
Company         a.l.r   ;
Location        xxxx    ;
Assembly        xxxx    ;
Device          p22v10;
Format          j       ;

/* inputs */
Pin 1        = clk       ;
Pin 2        = !lads     ;
Pin [3..5]   = [lmio,wrt,dc];
Pin [6,13,7] = ![be0,be1,be2];
Pin 8        = !blast    ;
Pin 9        = wait      ;
Pin 10       = cstate    ;
Pin 11       = resetcpu;
Pin 14       = !ready    ;
Pin 23       = !ken      ;
Pin 22       = !romce    ;

/* outputs */
Pin [16, 19]=[q1..0]  ;
Pin 18       = !rdy     ;
Pin 15       = !brdy    ;
Pin 20       = b2nd     ;
Pin [17,21]=![s0,s1]  ;

$define idle    'b'00
$define idl1    'b'01
$define str1    'b'11
$define rdyw    'b'10 field bstate= [q1..0];
field bsecond=b2nd ;

memr = lmio &!wrt ;
memw = lmio & wrt & dc ;
ior  =!lmio &!wrt & dc ;
inta =!lmio &!wrt &!dc ;
iow  =!lmio & wrt & dc ;
halt =!lmio & wrt &!dc & be2 ;
shdn =!lmio & wrt &!dc & be0 ;
spcl =!lmio & wrt &!dc &!be0 &!be2 sequence bstate {
present idle
   if lads                                       next idl1    ;
   default                                       next idle    ;
present idl1
   if !wait & cstate                              next str1    ;
   default                                       next idl1    ;
```

```
present str1
  if cstate                                              next rdyw   ;
  default                                                next str1   ;
present rdyw
  if (romce # ready)& cstate &!b2nd & ken & memr
   # (romce # ready)& cstate &!b2nd & be2 & (memr # memw # ior # iow # inta)
   # (romce # ready)& cstate & b2nd & ken & memr &!blast
                                                         next idl1   ;
  if (romce # ready)& cstate &!b2nd &!be2 & (!ken # memw # !lmio)
   # (romce # ready)& cstate & b2nd &!(ken & memr &!blast)
   # cstate & (halt # shdn # spcl)                       next idle   ;
  default                                                next rdyw   ;
} sequence bsecend {
present 'b'0
  if bstate:rdyw &(romce#ready)& be2 & cstate
   # bstate:rdyw &(romce#ready)& memr & ken & cstate
                                                         next 'b'1;
  default                                                next 'b'0;
present 'b'1
  if bstate:rdyw & brdy & cstate
   # bstate:idle & !lads                                 next 'b'0;
  default                                                next 'b'1;
}
append b2nd.d = bstate:idle & lads & !be0 &!be1 &!ken
              # bstate:idle & lads & !be0 &!be1 & ken & wrt ;

q0.ar = resetcpu;
q1.ar = resetcpu;
q2.ar = resetcpu;
b2nd.ar = resetcpu;

rdy  = bstate:rdyw & cstate &!b2nd &!be2 & (romce#ready) &(!ken # memw)
     # bstate:rdyw & cstate &!b2nd &!be2 &     ready &!lmio
     # bstate:rdyw & cstate & b2nd &      (romce#ready)&(!ken # memw # !lmio)
     # bstate:rdyw & cstate & b2nd &      (romce#ready) & ken & memr & blast
     # bstate:rdyw & cstate & (halt # shdn # spcl);

brdy = bstate:rdyw & cstate &!b2nd &!be2 & (romce#ready) & (!ken # memw)
     # bstate:rdyw & cstate &!b2nd &!be2 &     ready  & !lmio
     # bstate:rdyw & cstate & b2nd &      (romce#ready)
     # bstate:rdyw & cstate & (halt # shdn # spcl);

s0.d = bstate:idl1 & cstate &!wait & memw & !romce
     # bstate:idl1 & cstate &!wait & iow
     # bstate:idl1 & cstate &!wait & halt
     # bstate:idl1 & cstate &!wait & shdn
     # bstate:idl1 & cstate &!wait & inta
     # s0 & !cstate ;

s1.d = bstate:idl1 & cstate &!wait & memr & !romce
     # bstate:idl1 & cstate &!wait & ior
     # bstate:idl1 & cstate &!wait & halt
     # bstate:idl1 & cstate &!wait & shdn
     # bstate:idl1 & cstate &!wait & inta
     # s1 & !cstate ;
```

```
/*******************************************************************/
/*                        APPENDIX D                               */
/*              GAL® Equations for GAL® 408                        */
/*                        (Figure C3)                              */
/*******************************************************************/
Name        u8c     ;
Partno      XXXXXX  ;
Revision    01      ;
Date        7/23/89 ;
Designer    n.h.    ;
Company     a.l.r   ;
Location    xxxx    ;
Assembly    xxxx    ;
Device      g20v8ma ;
Format      j       ;

/* inputs */
pin [1..4]  = ![be0..3];
pin 5       =  lw_r   ;
pin 6       =  hlda   ;
pin 7       =  lm_io  ;
pin 8       =  ld_c   ;
pin 9       = !ken    ;
pin 10      =  q0     ;
Pin 11      =  q1     ;
pin 14      = !romce  ;
pin 19      = !ready  ;
Pin 13      =  cstate ;

/* outputs */
pin 22       = !bhe       ;
pin [21,20]  =  [a0,a1];
pin [17,16]  =![enlo,enhi];
pin 15       =  m_io      ;
pin 23       =  b2nd      ;

memr = lm_io & lw_r ;
memw = lm_io & !lw_r & ld_c ;
ior  =!lm_io & lw_r  & ld_c ;
inta =!lm_io & !lw_r & !ld_c ;
iow  =!lm_io & !lw_r & ld_c ;
halt =!lm_io & !lw_r & !ld_c & be2 ;
shdn =!lm_io & !lw_r & !ld_c & be0 ;
spcl =!lm_io & !lw_r & !ld_c & !be0 & !be2 ;

/* equations */ a1.oe = !hlda;
a1 = b2nd ;

a0.oe = !hlda;
a0  = !be0 & !b2nd &  ken & lw_r
    # !be0 & !b2nd & !ken
    # !be2 &  b2nd &  ken & lw_r
    # !be2 &  b2nd & !ken ;

bhe.oe = !hlda;
bhe = be3 & b2nd
```

```
    # be1 &!b2nd
    # kan &!lw_r ;

enlo = !hlda & (!b2nd & lw_r # !lw_r &!q0& q1& ready & cstate &!romce
                             # !lw_r &!q0& q1& cstate & romce);

enhi = !hlda & ( b2nd & lw_r # !lw_r &!q0& q1& ready & cstate &!romce
                             # !lw_r &!q0& q1& cstate & romce);

m_io = lm_io & !hlda # !lm_io & !ld_c & lw_r & !hlda ;
```

```
/***************************************************************/
/*                                                             */
/*                       APPENDIX E                            */
/*              GAL  Equations for GAL  413                    */
/*                       (figure C3)                           */
/***************************************************************/
Name        u13b    ;
Partno      XXXXXX;
Revision    01      ;
Date        7/23/89;
Designer    n.h.    ;
Company     a.l.r   ;
Location    xxxx    ;
Assembly    xxxx    ;
Device      g20v8   ;
Format      j       ;

/* inputs */
Pin 1        = clk      ;
Pin 2        = lmio     ;
Pin [3..9,17] =[la23..16];
Pin 10       = hlda     ;
Pin 11       =!ready    ;
Pin 14       =!slow     ;
Pin 23       = switch2  ;
Pin 13       =!oe       ;

/* outputs */
Pin 22       = !ken    ;
Pin 21       = !rom    ; /* rom write */
Pin 20       = cstate  ;
Pin 15       = wait    ;
Pin [19..18] = ![q0..1] ;
Pin 16       = !romce  ;

$define ats0    'b'111
$define ats1    'b'110
$define ats2    'b'100
$define ats3    'b'101

[K13..6] = [la23..16];
field KB = [K13..6]  ;
field count = [q1..0];

ken = KB:'d'[0000..0639] & lmio &!hlda & !slow
    # KB:'d'[1024..8191] & lmio &!hlda & !slow
    # KB:'d'[0960..1023] & lmio &!hlda & !switch2 & !slow
    # KB:'d'[0768..0791] & lmio &!hlda & !switch2 & !slow ;

rom = KB:'d'[0960..1023] & lmio &!hlda &!switch2 & !slow
    # KB:'d'[0768..0791] & lmio &!hlda &!switch2 & !slow ;

romce = KB:'d'[0960..1023] & lmio &!hlda
      # KB:'d'[16256..16383] & lmio &!hlda ;

cstate.d = !cstate ;

wait = !(count:ats0);

sequence count (
present ats0
```

```
   if (!lmio & ready & cstate )
                          next ats1 ;
   if (lmio & slow & ready & cstate )
                          next ats2 ;
   default                next ats0 ;
present ats1
   if cstate              next ats2 ;
   default                next ats1 ;
present ats2
   if cstate              next ats3 ;
   default                next ats2 ;
present ats3
   if cstate              next ats0 ;
   default                next ats3 ;
}
```

```
/********************************************************************
/*                         APPENDIX P
/*             GAL  Equations for GAL  412
/*                         (figure C3)
/********************************************************************
Name            u12a     ;
Partno          XXXXXX   ;
Revision        01       ;
Date            7/23/89  ;
Designer        n.h.     ;
Company         a.l.r    ;
Location        xxxx     ;
Assembly        xxxx     ;
Device          g20v8    ;
Format          j        ;

/* inputs */
pin 1       = clkb                          ;
pin [2..5]  = [sw2,!ken,lw/r#,!xmemw]       ;
pin [6,7]   = [reset3,reset4]               ;
pin 8       = !hold                         ;
pin 9       = cstate                        ;
pin 10      = lm_io                         ;
pin 11      = !qslow                        ;
pin 13      = !oe                           ;
pin 14      = hlda                          ;
pin 23      = !rom                          ;

/* outputs */
pin 22      = rescpu                        ;
pin 21      = !qqslow                       ;
pin 20      = !flush                        ;
pin 19      = hold486                       ;
pin 18      = !fq                           ;
pin 17      = nhlda                         ;
pin 16      = dt_r                          ;
pin 15      = !reset                        ;

field flushq = [flush,fq] ;
$define idle      'b'00
$define flsh      'b'10
$define flhend    'b'01
$define tmp       'b'11

/* equations */
sequence flushq {
present idle
   if qqslow & !qslow& !reset3 &!reset4
     # rom & lw/r# & !nhlda &!reset3 &!reset4
     # hlda & xmemw  &!reset3 &!reset4
                          next flsh ;
   default                next idle ;
present flsh              next flhend;
present flhend
   if hlda & xmemw  &!reset3 &!reset4
```

```
       # rom   & lw/r#   &!reset3 &!reset4
                              next flhend;
   default                 next idle  ;
present tmp                next idle  ;
} qqslow.d  = qslow    ;

rescpu    = reset3 # reset4;

reset     = rescpu # reset3 # reset4 ;

hold486   = hold ;

nhlda.d   = hold & hlda & cstate
          # nhlda & !cstate;

dt_r      = lw/r# ;
```

```
/***********************************************************************/
/*                                                                     */
/*                           APPENDIX G                                */
/*                    GAL  Equations for GAL  411                      */
/*                          (figure C6)                                */
/***********************************************************************/
Name            ulle    ;
Partno          XXXXXX  ;
Revision        01      ;
Date            7/23/89 ;
Designer        n.h.    ;
Company         a.l.r   ;
Location        xxxx    ;
Assembly        XXXX    ;
Device          g16v8   ;
Format          j       ;

/* inputs */
pin 1      =  clk      ;
pin 2      =  !rdy     ;
pin 3      =  lm_io    ;
pin 4      =  lw/r#    ;
pin 5      =  reset4   ;
pin 6      =  a20gate  ;
pin 7      =  ld25     ; /* dbit 25 */
pin 8      =  !d6f     ; /* data out 6f to XXX2 */
pin 9      =  x2       ; /* io decode x2 */
pin 11     =  !oe      ;
pin 19     =  2x       ; /* io decode 2x */
pin 18     =  a0       ;
pin 12     =  !slowi   ;

/* outputs */
pin 17     =   gatea20o;
pin 16     =  !lgate20 ;
pin 15     =  !lo6f    ;
pin 14     =  !qslow   ;

$define 16fto22  'b'1
$define lxxto22  'b'0

$define qslw     'b'0
$define qfst     'b'1 field qstate = lo6f ;
field slw    = qslow;

/* equations */
sequence qstate {
present lxxto22
  if rdy & d6f &!lm_io & lw/r# & x2 & 2x &!a0 & !reset4
                                                          next 16fto22;
  default                                                 next lxxto22;
present 16fto22
  if rdy &!d6f &!lm_io & lw/r# & x2 & 2x &!a0
  # rdy &      !lm_io &          x2 & 2x &  a0
  # reset4                                                next lxxto22;
  default                                                 next 16fto22;
}
```

```
qslow.d
   = rdy & slow1 & !reset4
   #!rdy & qslow & !reset4 ;

lgate20.d
   = qstate:16fto22 & rdy & !lm_io & x2 & 2x & a0 & lw/r# &!ld25
     & !reset4
   #!(qstate:16fto22 & rdy & !lm_io & x2 & 2x & a0 & lw/r# & ld25) &
   lgate20 & !reset4 ;

gatea20o = a20gate # lgate20 ;

/* end of U11e */
```

CONCLUSION

From the above, it is apparent that many modifications and variations of the present invention are possible in light of the above teachings. It is therefore to be understood that, within the scope of the appended claims, the invention may be practiced otherwise than as specifically described.

What is claimed is:

1. A computer system with externally accessible upgrade capability, the system comprising:
   a) an insertable, removable cartridge having a handle with a first slot, the handle being normally capable of relative movement with respect to a remainder of the cartridge;
   b) means for receiving the cartridge, the receiving means being in a predetermined portion of the computer system having an "on" power state and an "off" power state;
   c) means for ensuring that the cartridge cannot be inserted or removed when the predetermined portion of the system is in its "on" power state;
   d) a second slot in the computer system near the receiving means; and
   e) a lock mechanism including a first movable member and a second movable member which move integrally with respect to each other;
   wherein the first slot and the second slot are disposed at respective positions adjacent the lock mechanism when the cartridge is installed in the computer system so that, when the lock mechanism is in a "locked" position, the first movable member is contained within the first slot and the second movable member is contained within the second slot, so as to substantially prevent relative movement of the cartridge and remainder of the computer system and so as to substantially prevent relative movement of the handle and the remainder of the cartridge.

2. The system of claim 1, wherein:
   the receiving means is a connector adapted for receiving an edge of a circuit card; and
   the predetermined potion includes a circuit board on which the connector is mounted.

3. The system of claim 2, wherein:
   the receiving means is a bus connector adapted for receiving an edge of a printed circuit card which constitutes at least a portion of the cartridge; and
   the circuit board is a main system board of the computer system.

4. The system of claim 1, wherein the ensuring means includes:
   an electrically controlled blocking member which is positioned in a blocking position in response to the "on" power state and which is positioned in a non-blocking position in response to the "off" power state, the blocking and non-blocking positions respectively preventing and allowing insertion or removal of the cartridge.

5. The system of claim 4, wherein:
   the ensuring means includes a solenoid having an energized state in response to the "on" state of the predetermined portion and a de-energized state in response to the "off" state of the predetermined portion; and
   the blocking member has a position which is governed by the energization state of the solenoid.

6. The system of claim 5, wherein:
   the blocking member has an extended position in response to the energized state of the solenoid and a retracted position in response to the de-energized state of the solenoid.

7. The system of claim 4, wherein:
   the system further comprises an access door through which the cartridge is inserted or removed, the access door having a structure which is shaped and positioned to contact the blocking member in its blocking position so as to prevent the access door from being opened.

8. The system of claim 4, wherein:
   the blocking member is positioned with respect to the receiving means so that the blocking member in its blocking position physically blocks insertion or removal of the cartridge.

9. The system of claim 1, further comprising:
   a cabinet, substantially surrounding an interior of the computer system.

10. The system of claim 9, further comprising:
    an access door, disposed on the cabinet and constituting a small fraction of the surface area of the cabinet, and allowing insertion and removal therethrough of the cartridge into and out of the interior of the computer system.

11. The .system of claim 10, wherein the access door is located on a top face of the cabinet.

12. The system of claim 9, further comprising an adapter which is located in the cabinet in a position unobstructed from access from outside the cabinet, and shaped to receive the cartridge directly from outside the cabinet.

13. The system of claim 12, wherein the adapter is disposed in a disk drive bay in the cabinet.

14. The system of claim 9, further comprising:
    a system board having a first connector;
    a disk drive bay having a second connector and means for receiving the cartridge; and
    means, leading from the second connector to the first connector, for carrying signals between the cartridge and the system board when the cartridge is installed in the disk drive bay.

15. The system of claim 1, wherein:
    the cartridge includes (1) a cartridge processor and (2) means for generating an installation announcement signal; and
    the system further comprises means, responsive to the installation announcement signal, for allowing the cartridge processor to take control of the computer system.

16. The system of claim 15, further comprising:
    a first processor, disposed within the computer system outside the cartridge, the first processor having an input which, when activated by the installation announcement signal from the cartridge, causes the first processor not to interfere with the cartridge processor's control of the computer system.

17. A computer system with externally accessible upgrade capability, the system comprising:
    a computer cabinet;
    a cartridge, sized to be inserted and/or removed from the cabinet, the cartridge having a handle with a first slot and including (1) a cartridge processor capable of controlling the system and (2) means for generating an installation announcement signal whenever the cartridge is installed in the cabinet, the handle being normally capable of relative movement with respect 19 a remainder of the a first processor, disposed outside the cartridge, the first processor having an input which, when activated by the installation announcement signal, causes the first processor not to interfere with the cartridge processor's control of the computer system;

a connector for receiving the insertable, removable cartridge, the connector being in a predetermined portion of the computer system having an "on" power state and an "off" power state;

means for ensuring that the cartridge cannot be inserted or removed when the predetermined portion of the system is in its "on" power state, the ensuring means including a blocking member and means for controlling the position of the blocking member so as to be in a blocking position in response to the "on" power state and in a non-blocking position in response to the "off" power state;

a second slot in the computer system near the connector; and a lock mechanism including a first movable member and a second movable member which move integrally with respect to each other;

wherein the first slot and the second slot the disposed at respective positions adjacent the lock mechanism when the cartridge is installed in the computer system so that, when the lock mechanism is in a "locked" position, the first movable member is contained within the first slot and the second movable member is contained within the second slot, so as to substantially prevent relative movement of the cartridge and remainder of the computer system and so as to substantially prevent relative movement of the handle and the remainder of the cartridge.

* * * * *